United States Patent
Yu et al.

(10) Patent No.: US 12,231,029 B2
(45) Date of Patent: Feb. 18, 2025

(54) SOFT SWITCHING SUB-CIRCUIT

(71) Applicant: INTDEVICE LIMITED, Auckland (NZ)

(72) Inventors: Li Jun Yu, Auckland (NZ); Hao Hao, Auckland (NZ); Anton Van Vugt, Auckland (NZ)

(73) Assignee: INTDEVICE LIMITED, Auckland (NZ)

( * ) Notice: Subject to any disclaimer, the term of this patent is extended or adjusted under 35 U.S.C. 154(b) by 198 days.

(21) Appl. No.: 17/912,630

(22) PCT Filed: Mar. 15, 2021

(86) PCT No.: PCT/IB2021/052109
§ 371 (c)(1),
(2) Date: Sep. 19, 2022

(87) PCT Pub. No.: WO2021/186313
PCT Pub. Date: Sep. 23, 2021

(65) Prior Publication Data
US 2023/0188026 A1 Jun. 15, 2023

(30) Foreign Application Priority Data
Mar. 19, 2020 (NZ) ........................................ 762735

(51) Int. Cl.
H02M 3/335 (2006.01)
H02M 1/00 (2006.01)
H02M 7/5387 (2007.01)

(52) U.S. Cl.
CPC ..... *H02M 1/0058* (2021.05); *H02M 3/33569* (2013.01); *H02M 7/53871* (2013.01)

(58) Field of Classification Search
CPC ........... H02M 1/0058; H02M 3/33569; H02M 7/53871
See application file for complete search history.

(56) References Cited

U.S. PATENT DOCUMENTS

| | | |
|---|---|---|
| 6,172,882 B1 | 1/2001 | Tanaka et al. |
| 7,869,226 B2 | 1/2011 | Sirio et al. |
| 2007/0025125 A1 | 2/2007 | Nakahori et al. |
| 2014/0268932 A1 | 9/2014 | Gupta et al. |

(Continued)

FOREIGN PATENT DOCUMENTS

CN 105915059 A 8/2016

OTHER PUBLICATIONS

Dobi et al: "Overview of Soft-switching DC-DC Converters", International Journal of Power Electronics and Drive System (IJPEDS) vol. 9, No. 4, Dec. 2018, pp. 2006-2018.

(Continued)

*Primary Examiner* — Harry R Behm
(74) *Attorney, Agent, or Firm* — Studebaker & Brackett PC

(57) ABSTRACT

A soft switching sub-circuit forming part of or for use with a circuit. The soft switching sub-circuit comprises a bridge switching circuit. The soft switching sub-circuit is configured and operable to provide a varying current output that tracks output current from the bridge switching circuit to create a substantially zero current through at least one switch component of the bridge switching circuit to enable soft switching.

22 Claims, 39 Drawing Sheets

(56) References Cited

U.S. PATENT DOCUMENTS

2015/0236617 A1* 8/2015 Pahlevaninezhad ........................
H02M 7/5387
363/132
2015/0318794 A1* 11/2015 Hansson ................ H02M 1/12
327/552
2016/0329828 A1* 11/2016 Zhang .................... H02M 1/08

OTHER PUBLICATIONS

Kawaguchi et al, "Basic Study of a Phase-Shifted Soft Switching High-Frequency Inverter with Boost PFC Converter for Induction Heating", Journal of Power Electronics, vol. 8, No. 2, Apr. 2008, p. 192-199.
Geetha et al, "Operation of Current-fed Dual Active Bridge DC-DC Converters for Microgrid", International Journal of Recent Technology and Engineering (IJRTE) ISSN: 2277-3878, vol. 8 Issue-2, Jul. 2019, p. 3167-3175.
Maria D. Bellar et al, "A Review of Soft-Switched DC-AC Converters", IEEE Transactions on Industry Applications, vol. 34, No. 4, Jul./Aug. 1998, p. 847-860.
International Search Report issued in PCT/IB2021/052109; mailed May 11, 2021.
Written Opinion issued in PCT/IB2021/052109; mailed May 11, 2021.
Extended European Search Report issued by the European Patent Office on Mar. 22, 2024, which corresponds to EP 217708288-1202 and is related to U.S. Appl. No. 17/912,630.

* cited by examiner

Stage A

Stage B

Stage C

Stage D reverse recovery
current direction normal conduction direction anode    cathode

SOFT SWITCHING SUB-CIRCUIT

FIELD OF THE INVENTION

The present invention relates to switching circuits, either in standalone form or forming part of or for use with other circuits.

BACKGROUND OF THE INVENTION

MOSFET

Switching devices, such as MOSFET, IGBT and BJT, are used in power electronics circuits to convert a DC voltage to an AC voltage, with MOSFET being the preferred device for systems that switch at frequencies higher than 20 kHz. The following explanations will be based on the MOSFET switch, which is shown in FIG. 15 (showing its parasitic capacitance and body diode).

The MOSFET has terminals G (gate), D (drain) and S (source), a body diode and parasitic capacitances between its terminals, as shown in the left diagram of FIG. 15. The body diode is intrinsic to the device structure and cannot be removed. It allows current to flow from S to D regardless of whether the MOSFET is ON or OFF. When a MOSFET is turned on, current can flow in both directions between D and S.

MOSFET losses may occur during conduction, turn-on and turn-off. Conduction loss occurs when the MOSFET is in the ON state and depends on values of Rds and MOSFET current. Depending on the MOSFET current direction, the turn-on and turn-off switching losses can be categorized into hard and soft switching losses.

Hard Switching

Hard switching occurs where the MOSFET current flows from D to S during switching. Significant switching losses are generated due to overlap between Vds and MOSFET current, as illustrated by the dashed circles in FIG. 16, which shows typical switching waveforms for a hard turn off and a hard turn on. More particularly, FIG. 16 shows hard turn-off (left plot) and hard turn-on (right plot) (Vds=400V, MOSFET current=18 A). Top plot is Vgs. Middle plot is Vds and MOSFET current (D to S). Last plot (red) is the product of V(D,S) and MOSFET current or the instantaneous power loss of MOSFET. For both switching losses, current is flowing from drain to source right before switching, causing overlap between MOSFET voltage and current. As can be seen, the instantaneous switching loss can reach a few kiloWatts and last for a few hundred nanoseconds.

Both hard turn-on and hard turn off switching losses increase with higher Vds and/or higher MOSFET current. For the same Vds and MOSFET current, hard turn-on loss is significantly higher than hard turn-off loss. This is illustrated in FIG. 16, where the peak instantaneous losses for hard turn-on and hard turn-off reach 12 kW and 3.6 kW, respectively. In this case, the energy lost during a hard turn-on is over 3 times higher than that of a hard turn-off. This observation is further confirmed by a switch loss graph (FIG. 17, which shows total switching energy (Etotal=Eon+Eoff), turn-on (Eon) and turn-off (Eoff) energy for MOSFET C3M0065090D at 400V) from a MOSFET datasheet, where Eon and Eoff are the energy lost for hard turn-on and hard turn-off respectively and Etotal=Eon+Eoff.

Due to this reason, most systems are deliberately designed to avoid hard turn-on and allow for hard turn-off because it is difficult to avoid both hard turn-on and hard turn-off.

Diode Reverse Recovery

Another reason to avoid hard turn-on is to do with a phenomenon called diode reverse recovery, which occurs in a half bridge configuration operating under hard turn-on condition. Diode reverse recovery can significantly increase the hard turn-on loss and create electromagnetic interference (EMI) problem. It occurs in both discrete diodes and body diodes of MOSFETs.

A diode exhibits reverse recovery when it is abruptly reverse biased (turned off) while conducting current. Reverse recovery current flows from cathode to anode, as shown in FIG. 18 (which shows a diagrammatic version of a diode), and must find a path to return to the cathode. If the return path forms a large loop, reverse recovery current may cause electromagnetic interference (EMI). It is important to note that the peak reserve recovery current is larger if the diode is turned off faster (rate of current change higher during turn-off) and/or the diode current prior to turn-off is higher.

Diode reverse recovery is illustrated using a half bridge circuit in FIG. 19 (which shows a half bridge), where S1 and S2 are driven with complementary signals. Between t0 and t1, S1 is ON and S2 is OFF and output current through inductor L1 is assumed to be flowing from node C to B to A through D1 (body diode of S1). An inductor resists sudden changes in its current so I(out) cannot change abruptly. During this interval, voltage at node B is Vdc+Vd (Vdc is the DC input voltage and Vd is the voltage drop of diode D1). At t1, S1 turns off and S2 turns on, pulling voltage at node B to ground from Vdc+Vd and imposing a negative voltage across D1. State of D1 changes from forward conducting to reverse blocking abruptly, which generates a large reverse recovery current that flows from D1 cathode to D1 anode and into the drain of S2 as shown in FIG. 20 (which shows key waveforms for the circuit in FIG. 19). S2 experiences a hard turn-on because S2 turn-on current flows from drain to source and S2 Vds=Vdc+Vd prior to turn-on. During turn-on, S2 current is a sum of inductor current and D1 reverse recovery current, further increasing the turn-on loss. As can be seen, after S2 turns on I(D1) decreases from 20 A to 0 A and reverses direction to −12 A during reverse recovery. The negative diode current flows through S2 during turn-on, causing S2 peak current to be around 32 A (instead of the inductor current of 20 A) and significantly increases turn-on loss for S2. In addition, the reverse recovery process also generate significant losses in D1.

In FIG. 20, the peak diode reverse recovery current is very high at 12A. Such high current combined with a high di/dt during the recovery process is likely to lead to significant EMI problems. The peak reverse recovery current can be reduced if rate of current charge (di/dt) during the diode turn-off is slower and/or the diode forward current prior to diode turn-off is smaller. Practically, it is easier to slow down the di/dt of diode current during turn-off to reduce the diode reverse recovery effect.

From the background explained above, it is clear that for a half bridge configuration hard turn-on and diode reverse recovery occur simultaneously, leading to excessive turn-on losses and potentially EMI problems.

Soft Switching

As an alternative to hard switching, soft switching is another way switching on or off a MOSFET. Soft switching is preferred over hard switching as soft switching entails less power loss during MOSFET switching. One option of soft switching is zero voltage switching (ZVS). ZVS requires the MOSFET current to be flowing from source to drain during switching. In other words, the MOSFET current needs to be flowing through its body diode before it is turned on. For both ZVS turn-on and turn-off, MOSFET current can flow through its body diode, MOSFET channel from S to D or a combination of both during switching. The current distribution depends on the equivalent resistance of these paths. However, regardless of the current path, Vds is clamped to a small negative voltage during switching, which makes the switching power loss negligible. In addition, diode reverse recovery is avoided because no MOSFET body diode is abruptly turned off under ZVS.

Given the high switching loss and diode reverse recovery in a half bridge or full bridge associated with a hard turn-on, some systems are designed to ensure the turn on is ZVS, and allow hard turn-off.

Discussion now turns to prior art that turns MOSFET hard turn-on in a half bridge configuration into soft turn on with zero voltage switching. The auxiliary resonant commutated pole (taken from R. W. De Doncker and J. P. Lyons, "The auxiliary resonant commutated pole converter." *Conference record of the* 1990 *IEEE Industry Applications Society Annual Meeting*, Seattle, WA, USA, 1990, pp 1228-1235 vol 2) as shown in FIG. 21 is a well-known circuit that uses an auxiliary AC switch and an inductor Lr to obtain zero voltage turn-on for MOSFETs S1 and S2 in a half bridge configuration. The AC switch comprises switches S3, S4 and diodes D3, D4. Capacitors C1 and C2 can be external capacitors or switch parasitic capacitor Coss. Two series capacitors are used to generate Vdc/2 at node A.

Typical operating waveforms of resonant current I(Lr) and output current I(out) are shown in FIG. 22 (which shows a typical waveform of the ARCP). The output current I(out) is assumed to be constant due to a large inductor Lf and flowing into the load (positive direction).

Between t0 and t1 in FIG. 22, all switches are off, no current is flowing through Lr and output current I(out) is flowing through Lf towards the load and returning through D2, which causes voltage at node C to be one diode voltage drop (Vd) below ground. S1 voltage is therefore Vdc+Vd. Turning on S1 during this interval would result in hard turn-on and cause diode D2 reverse recovery current to flow through S1. This is similar to the scenario described earlier for the half bridge configuration with hard turn-on.

Instead, the ARCP solution proposes turning on S3 at t1 and keep S1 off until a later time. This causes current I(Lr) to increase linearly from zero between t1 and t2 at a constant slope of (Vdc/2+Vd)/Lr. This is because between t1 and t2, I(Lr)<I(out) and the extra output current is forced to flow through D2, which keeps node C voltage at −Vd. Therefore, inductor Lr voltage is Vdc/2+Vd during its interval.

At t2, I(Lr) catches up with I(out) and D2 turns off. After D2 turns off, voltage at node C is effectively 'floating' and Lr forms a resonant circuit with C1 and C2. The resonant circuit causes I(Lr) to keep increasing beyond I(out) and reach a peak current of I(out)+Ires, where Ires is:

$$I_{res} = \frac{V_{dc}}{2\sqrt{\frac{L_r}{C_1 + C_2}}}$$

Between t2 and t3, I(Lr) is larger than I(Lf), and the extra Lr current starts flowing through D1 and return through the top DC bus capacitor, S3 and D4. S1 turns on with zero voltage switching (ZVS). As a result, ARCP transforms hard turn-on into zero voltage turn-on.

The zero voltage turn-on window for S1 closes after t3, when I(Lr) drops below I(out) and voltage across S1 starts to increase due to D2 conducting. The window for S1 turning on with zero voltage maybe narrow and detection circuits are typically required to sense when to turn on S1 to achieve ZVS. Larger C1 and C2 capacitances maybe also be used to increase the time difference between t2 and t3 by making Ires larger.

The basic principle of ARCP is to create a small window of ZVS to achieve a soft switching. To capture the small ZVS window, an accurate detection circuit is required. There are other prior arts to improve different aspects of ARCP, however the principle of creating a ZVS window remains the same.

SUMMARY OF THE INVENTION

It is an object of the invention to provide improved soft switching.

In one aspect the present invention is a soft switching sub-circuit forming part of or for use with a circuit comprising a bridge switching circuit, the soft switching sub-circuit being configured and operable to provide a varying current output that tracks output current from the bridge switching circuit to create a substantially zero current through at least one switch component of the bridge switching circuit to enable soft switching.

Optionally the bridge switching circuit is: a half bridge switching circuit, or a full-bridge switching circuit.

Optionally the full-bridge switching circuit comprises two or more half bridge switching circuits, each half bridge switching circuit has soft switching enabled by the soft switching sub-circuit, and optionally by one or more additional soft switching sub-circuits.

Optionally the bridge switching circuit is connectable to a load, and at least a portion of the output current from the bridge switching circuit passes through the load.

Optionally the soft switching sub-circuit and the bridge switching circuit are energisable by a common power source, such as a DC power source with a reference voltage rating.

Optionally the soft switching sub-circuit comprises an inductive component and at least one switch component.

Optionally the soft switching sub-circuit comprises a first and a second switch component, the first switch component is for energising the first end of the inductive component with a voltage that is or is derived from the reference voltage, and the second switch component is for energising the first end of the inductive component with a voltage that is or is derived from zero voltage.

Optionally the first switch component connects between a node energisable by the reference voltage and the first end of the inductive component, and the second switch component connects between the first end of the inductive component and ground.

Optionally the first switch component of the soft switching sub-circuit is for soft switching of the first switch component of the bridge switching circuit, and the second switch component of the soft switching sub-circuit is for soft switching of the second switch component of the bridge switching circuit.

Optionally in the bridge switching circuit: the first switch component connects between a node energisable by the reference voltage and the node between the two switch components of the bridge switching circuit, and the second switch component connects between the node between the two switch components of the bridge switching circuit and ground.

Optionally the bridge switching circuit is a half bridge switching circuit, and the first and second switch components of the bridge switching circuit form the half bridge switching circuit.

Optionally the bridge switching circuit is a full bridge switching circuit comprising a first and a second half bridge switching circuit, and the first and second switch components of the bridge switching circuit form the first half bridge switching circuit.

Optionally the varying current output comprises: an accelerating current output when absolute value of the varying current output is less than absolute value of output current from the bridge switching circuit, and a decelerating current output when absolute value of the varying current output is greater than absolute value of output current from the bridge switching circuit.

Optionally the varying current output comprises alternation between the accelerating current output and the decelerating current output.

Optionally the inductive component has a first end connected to the at least one switch component of the soft switching sub-circuit and a second end for connection to a node between two switch components of the bridge switching circuit.

Optionally the varying current output is provided by operation of the inductive component by: when the output current from the bridge switching circuit overtakes the varying current output of the soft switching sub-circuit, the voltage difference applied across the inductive component is increased such that the current output of the soft switching sub-circuit overtakes the output current from the bridge switching circuit, and when the varying current output of the soft switching sub-circuit overtakes the output current from the bridge switching circuit, the voltage difference applied across the inductive component is decreased such that the output current from the bridge switching circuit overtakes the current output of the soft switching sub-circuit.

Optionally the soft switching sub-circuit comprises a switch component that connects to the first end of the inductive component, the switch component configured to provide the first end of the inductive component with a voltage that is or is derived from a reference voltage, the two switch components of the bridge switching circuit are: a first switch component comprising a diode that connects the node between the two switch components of the bridge switching circuit to a node energisable by the reference voltage, and a second switch component comprising a diode that connects ground to the node between the two switch components of the bridge switching circuit.

Optionally forward-bias conduction of the second switch component diode causes a decrease in voltage at the second end of the inductive component towards the voltage that is or derived from zero voltage so that the voltage difference applied across the inductive component is increased such that the current output of the soft switching sub-circuit overtakes the output current from the bridge switching circuit, and forward-bias conduction of the first switch component diode causes an increase in voltage at the second end of the inductive component towards the voltage that is or derived from a reference voltage so that the voltage difference applied across the inductive component is decreased such that the output current from the bridge switching circuit overtakes the current output of the soft switching sub-circuit.

Optionally the at least one switch component comprises a switch component that connects to the first end of the inductive component, the switch component configured to provide the first end of the inductive component with a voltage that is or is derived from zero voltage, the two switch components of the bridge switching circuit are: a first switch component comprising a diode that connects the node between the two switch components of the bridge switching circuit to a node energisable by a reference voltage, and a second switch component comprising a diode that connects ground to the node between the two switch components of the bridge switching circuit.

Optionally forward-bias conduction of the second switch component diode causes a decrease in voltage at the second end of the inductive component towards the voltage that is or derived from zero voltage so that the voltage difference applied across the inductive component is decreased such that the output current from the bridge switching circuit overtakes the current output of the soft switching sub-circuit, and forward-bias conduction of the first switch component diode causes an increase in voltage at the second end of the inductive component towards the voltage that is or derived from a reference voltage so that the voltage difference applied across the inductive component is increased such that the current output of the soft switching sub-circuit overtakes the output current from the bridge switching circuit.

Optionally the varying current output comprises an accelerating current output when absolute value of the varying current output is less than absolute value of output current from the bridge switching circuit, and a decelerating current output when absolute value of the varying current output is greater than absolute value of output current from the bridge switching circuit.

Optionally the varying current output comprises alternation between the accelerating current output and the decelerating current output.

Optionally alternation comprises switching from the accelerating current output to the decelerating current output when absolute value of the varying current output overtakes absolute value of output current from the bridge switching circuit, and switching from the decelerating current output to the accelerating current output when absolute value of output current from the bridge switching circuit overtakes absolute value of the varying current output.

Optionally the accelerating current output is produced by an increased voltage applied across the inductive component, and the decelerating current output is produced by a decreased voltage applied across the inductive component.

Optionally the soft switching sub-circuit comprises a switch component that connects to the first end of the inductive component, the switch component configured to provide the first end of the inductive component with a voltage that is or is derived from a reference voltage, the two switch components of the bridge switching circuit are: a first switch component comprising a diode that connects the node between the two switch components of the bridge switching circuit to a node energisable by the reference voltage, and a second switch component comprising a diode that connects ground to the node between the two switch components of the bridge switching circuit.

Optionally the diode of the first switch component and the diode of the second switch component are operable, such that: forward-bias conduction of the first switch component diode produces the decelerating current output by increasing voltage at the second end of the inductive component, such that the voltage difference applied across the inductive component decreases, and forward-bias conduction of the second switch component diode produces the accelerating current output by decreasing voltage at the second end of the inductive component, such that the voltage difference applied across the inductive component increases.

Optionally the soft switching sub-circuit comprises a switch component that connects to the first end of the inductive component, the switch component configured to provide the first end of the inductive component with a voltage that is or is derived from a zero voltage, the two switch components of the bridge switching circuit are: a first switch component comprising a diode that connects the node between the two switch components of the bridge switching circuit to a node energisable by the reference voltage, and a second switch component comprising a diode that connects ground to the node between the two switch components of the bridge switching circuit.

Optionally the diode of the first switch component and the diode of the second switch component are operable, such that: forward-bias conduction of the first switch component diode produces the accelerating current output by increasing voltage at the second end of the inductive component, such that the voltage difference applied across the inductive component decreases, and forward-bias conduction of the second switch component diode produces the decelerating current output by decreasing voltage at the second end of the inductive component, such that the voltage difference applied across the inductive component decreases.

Optionally the inductive component is adapted to reduce rate of change in current through the diodes of the first and second switch components of the bridge switching circuit such that the peak reverse recovery current of the diodes is reduced.

Optionally the reduced peak reverse recovery current reduces energy expended by the reverse recovery current such that electromagnetic interference is reduced and/or soft switching of the diodes is enabled.

Optionally the inductive component is or comprises an inductor.

Optionally a capacitor is connected in series with the inductor.

In another aspect the present invention is a circuit comprising a bridge switching circuit, and a soft switching sub-circuit according to any of the previous statements.

Optionally the bridge switching circuit is: a half bridge switching circuit, or a full-bridge switching circuit.

Optionally the full-bridge switching circuit comprises two or more half bridge switching circuits, each half bridge switching circuit has soft switching enabled by the soft switching sub-circuit, and optionally by one or more additional soft switching sub-circuits.

Optionally wherein the switch components are or comprise of transistors.

Optionally the switch components are, or comprise of, one or more of:
MOSFETs
BJTs
IGBTs Optionally enabling soft switching is or comprises soft switching on.

Optionally soft switching is enabled when absolute value of output current from the bridge switching circuit is increasing.

In another aspect the present invention is a soft switching sub-circuit or circuit as substantially described herein with reference to accompanying FIGS. 1-14, and FIGS. 23-26.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner. Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

In this specification where reference has been made to patent specifications, other external documents, or other sources of information, this is generally for the purpose of providing a context for discussing the features of the disclosure. Unless specifically stated otherwise, reference to such external documents is not to be construed as an admission that such documents, or such sources of information, in any jurisdiction, are prior art, or form part of the common general knowledge in the art.

The invention may also be said broadly to consist in the parts, elements and features referred to or indicated in the specification of the application, individually or collectively, in any or all combinations of two or more of said parts, elements or features. Where, in the foregoing description reference has been made to integers or components having known equivalents thereof, those integers are herein incorporated as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth. The invention consists in the foregoing and also envisages constructions of which the following gives examples only.

BRIEF DESCRIPTION OF THE DRAWINGS

Embodiments will be described with reference to the following Figures, of which.

DETAILED DESCRIPTION

The soft switching of some of the embodiments described herein relate to using zero current switching (ZCS). ZCS requires the current through the switch component (e.g. MOSFET) to be very close to 0 A during switching. It can also significantly reduce the switching loss because the instantaneous loss during switching is very low.

The soft switching of some of the embodiments described herein relate to using zero voltage switching (ZVS). ZVS requires the voltage across the switch component (e.g. MOSFET) to be very close to 0V during switching. It can also significantly reduce the switching loss because the instantaneous loss during switching is very low.

Given the high power losses from high switching loss and high diode reverse recovery current associated with a hard turn-on of a bridge switching circuit, the embodiments described herein are designed to be able to provide a soft switch on that is provided by ZCS and/or ZVS. In some of the embodiments described herein, a soft switch off can also be achieved but this is not essential. More generally, hard switch off can be tolerated in the described embodiments since the power loss from a hard switch off is often small compared with the power loss from a hard switch on.

Overview

Figure 1A:
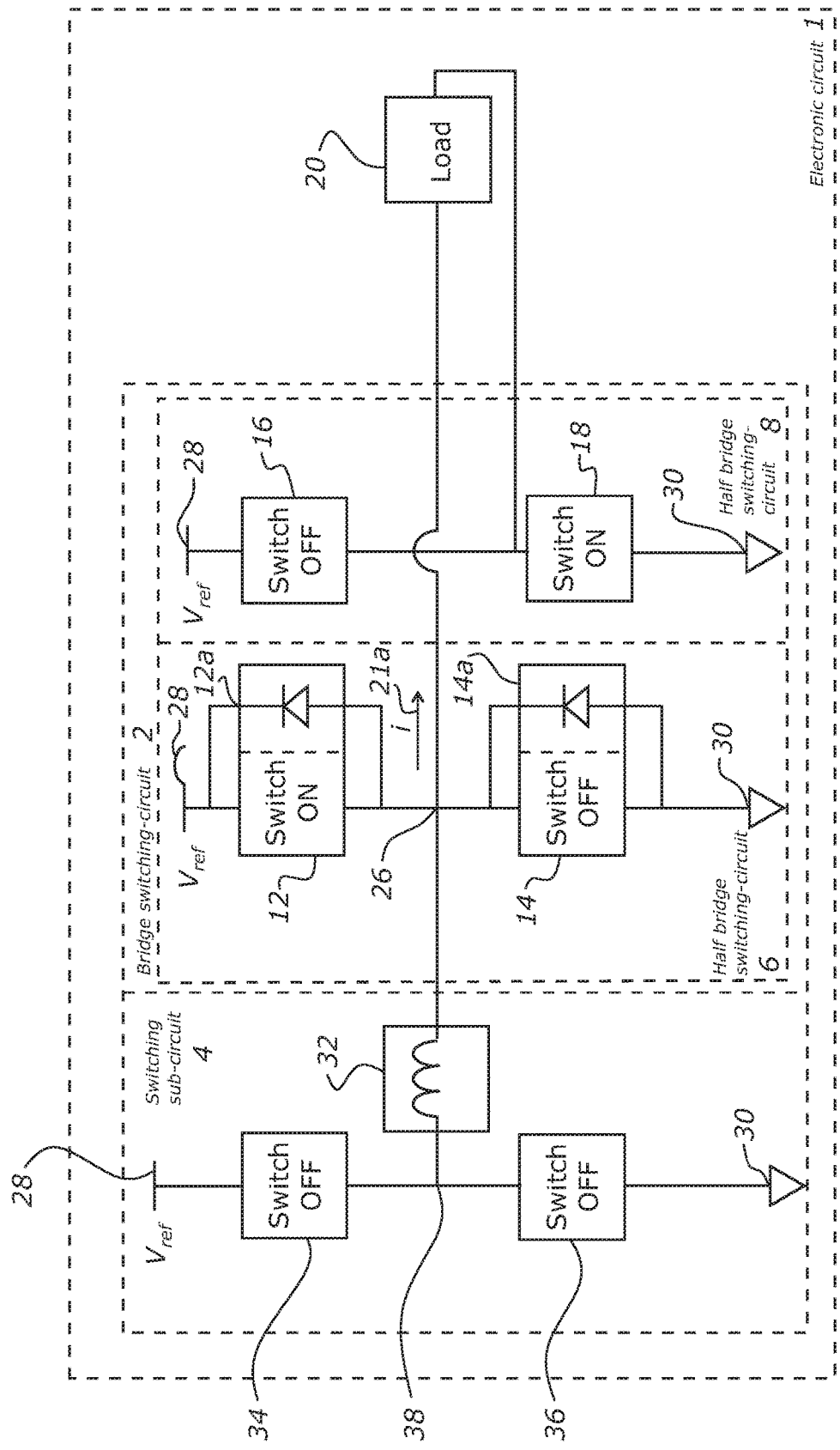
FIGS. 1A-B each show an electronic circuit showing the bridge switching circuit in operation.
Figure 1B:
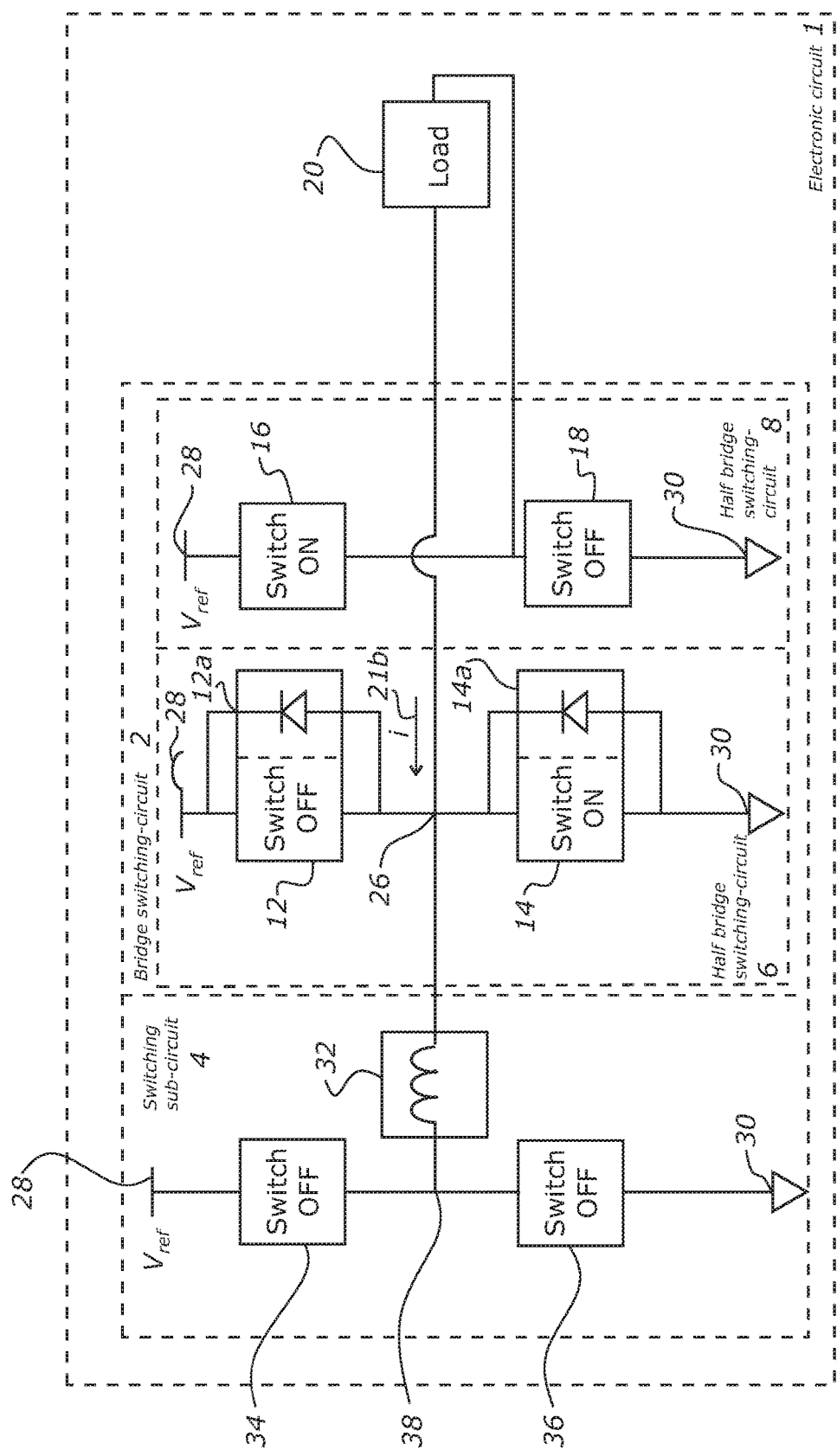

FIGS. 1A-B show an overview of an electronic circuit 1 comprising a bridge switching circuit 2 and a (soft) switching sub-circuit 4. The (soft) switching sub-circuit 4 is configured for use with the bridge switching circuit 2, and is used for reducing switching power loss experienced by the bridge switching circuit 2.

The bridge (switching) circuit 2 is depicted in FIGS. 1A-B as a (full) bridge circuit (H-bridge) that comprises two half-bridge switching circuits 6, 8. It comprises four switching components 12, 14, 16, 18. More specifically, half-bridge switching circuit 6 comprises switching components 12, 14, and half bridge switching circuit 8 comprises switching components 16, 18. The bridge (switching) circuit 2 is connectable to a load 20. The bridge switching circuit 2 can be operated by turning on switching components 12, 18 so that current 21 can pass through the load 20 from left to right shown as 21*a* on FIG. 1A, and by turning on components 14, 16 so that current 21*b* can pass through the load 20 from right to left shown as 21*b* on FIG. 1B.

Although the bridge (switching) circuit 2 is shown as a (full) bridge circuit comprising two half-bridges 6, 8 in this specification, it will be apparent to a skilled person that the bridge switching circuit may simply be a half-bridge switching circuit) for powering a load 20—that is, the bridge (switching) circuit is the half-bridge switching circuit 6 (such that only switch components 12, 14 are used) and half-bridge switching circuit 8 need not be used (such that switch component 16, 18 need not be used). For the avoidance of doubt, "switching component(s)" may be interchangeable with "switch component(s)" in this specification.

Although the specification and figures only refer to one switching sub-circuit 4 being used on one half 6 of a (full) bridge circuit 2, the switching sub-circuit 4 may also be used to softly switch the second half 8 of a (full) bridge circuit 2. Alternatively, a duplicate second switching sub-circuit may optionally be used on the other half (half-bridge switching circuit 8) of the (full) bridge circuit 2. Alternatively the other half 8 of the (full) bridge circuit 2 could be switched with a different soft switch mechanism, or alternatively be hard switched. More generally, if there is a (full) bridge circuit 2 comprising two or more half-bridge switching circuits, one switching sub-circuit 4 may be used with a first half-bridge switching circuit 6, and the remaining half-bridge switching circuits may each be switched using any combination of: the same switching sub-circuit 4 (already used for the first half-bridge switching circuit 6), a duplicate switching sub-circuit (separate to switching sub-circuit 4), a different soft switch mechanism, and/or be hard switched. The half-bridge switching circuits may be connected in series, in parallel, or a combination of both.

A skilled person would also recognise that while the bridge switching circuit 2 is being shown as a DC-AC inverter in this specification, the embodiment described could be used on any other types of bridge switching circuits, such as a DC-DC buck-boost converter, or other alternatives.

General Embodiment

A general embodiment of the present invention will now be described.

The switching sub-circuit 4 can be seen as a part of or for use with a circuit 1 comprising a bridge switching circuit 2, and is used for minimising power loss experienced by the bridge switching circuit 2. The bridge switching circuit 2 comprises two switching components 12, 14 and a node 26. The two switching components 12, 14 and load 20 all connect to each other through node 26. The switching component 12 connects between a node energisable by a reference voltage 28 and node 26. The switching component 12 also comprises a diode 12*a* that connects between nodes 26 and 28. The switching component 14 connects between node 26 and grounded node 30. The switching component 14 also comprises a diode 14*a* that connects between nodes 30 and 26. When switching component 12 is switched on and switching component 14 is turned off, current 21*a* is able to pass through the load 20 from left to right as shown in FIG. 1A. When switching component 12 is switched off and switching component 14 is switched on, current 21*b* is able to pass through the load 20 from right to left as shown in FIG. 1B.

The (soft) switching sub-circuit 4 may be integrated with the rest of the electronic circuit 1 or may be a standalone module that couples to the rest of the electronic circuit 1. The (soft) switching sub-circuit 4 comprises an inductive component 32, two switching components 34, 36 and a node 38. The inductive component 32 and switching components 34, 36 all connect to each other through node 38. The inductive component 32 is for connection between node 26 and node 38. Switching component 34 connects between a node energisable by a reference voltage 28 and node 38. Switching component 36 connects between node 38 and grounded node 30. It is possible to use either one of the switching components (either 34 or 36)—it is not essential to use both switching components 34, 36.

Figure 2A:
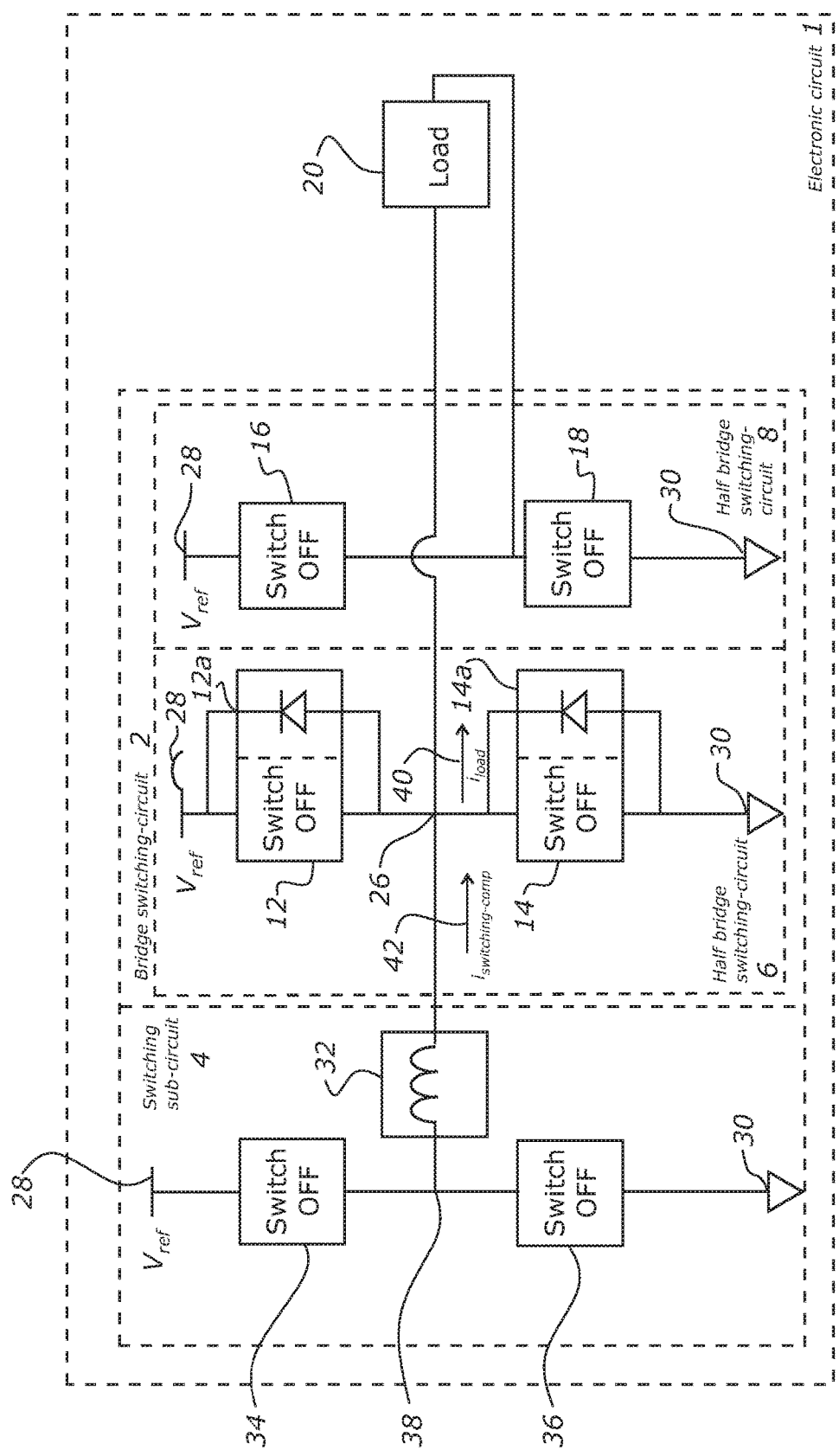
FIGS. 2A-C show an electronic circuit showing one general form of soft switching.
Figure 2B:
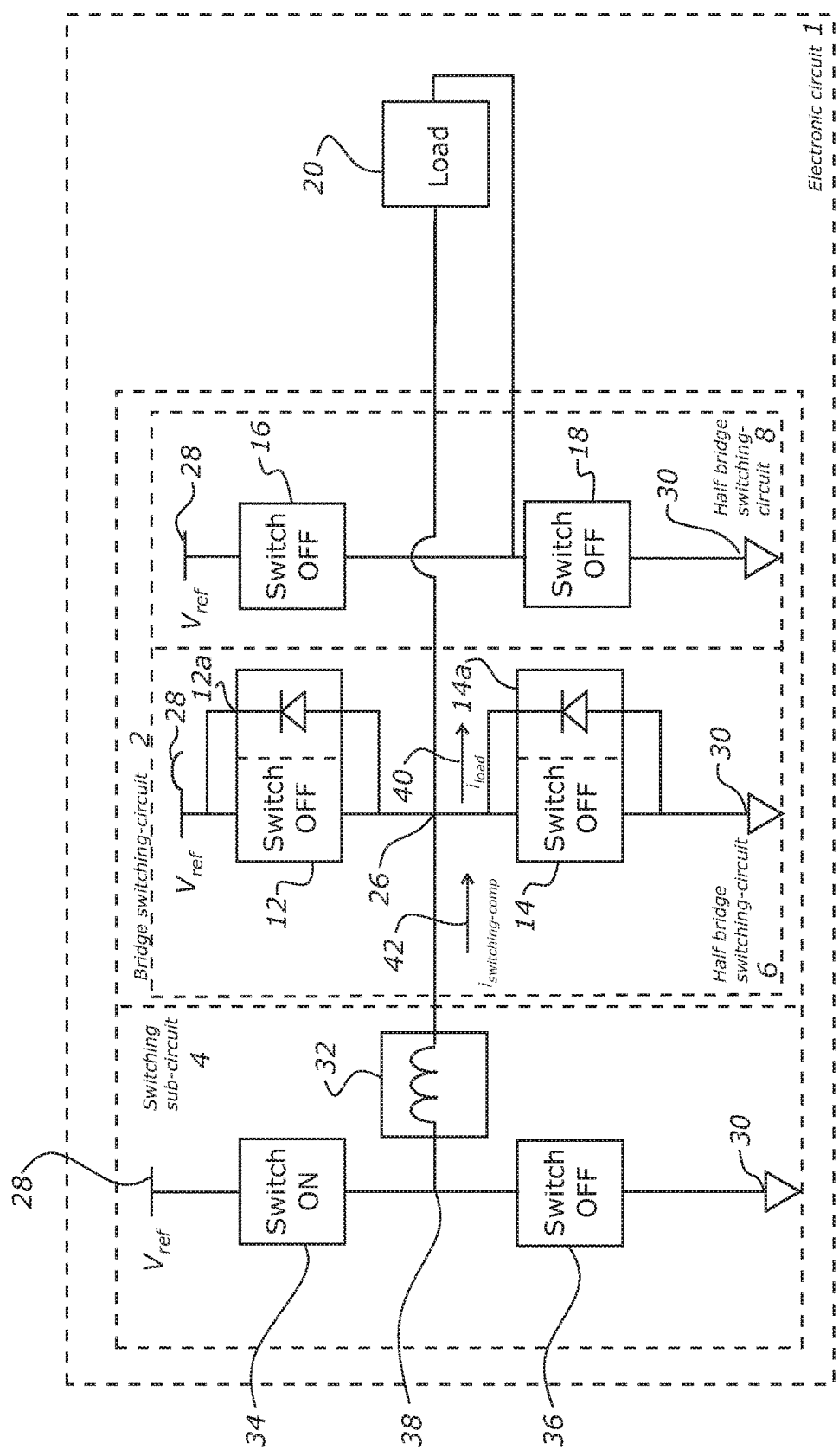
Figure 2C:
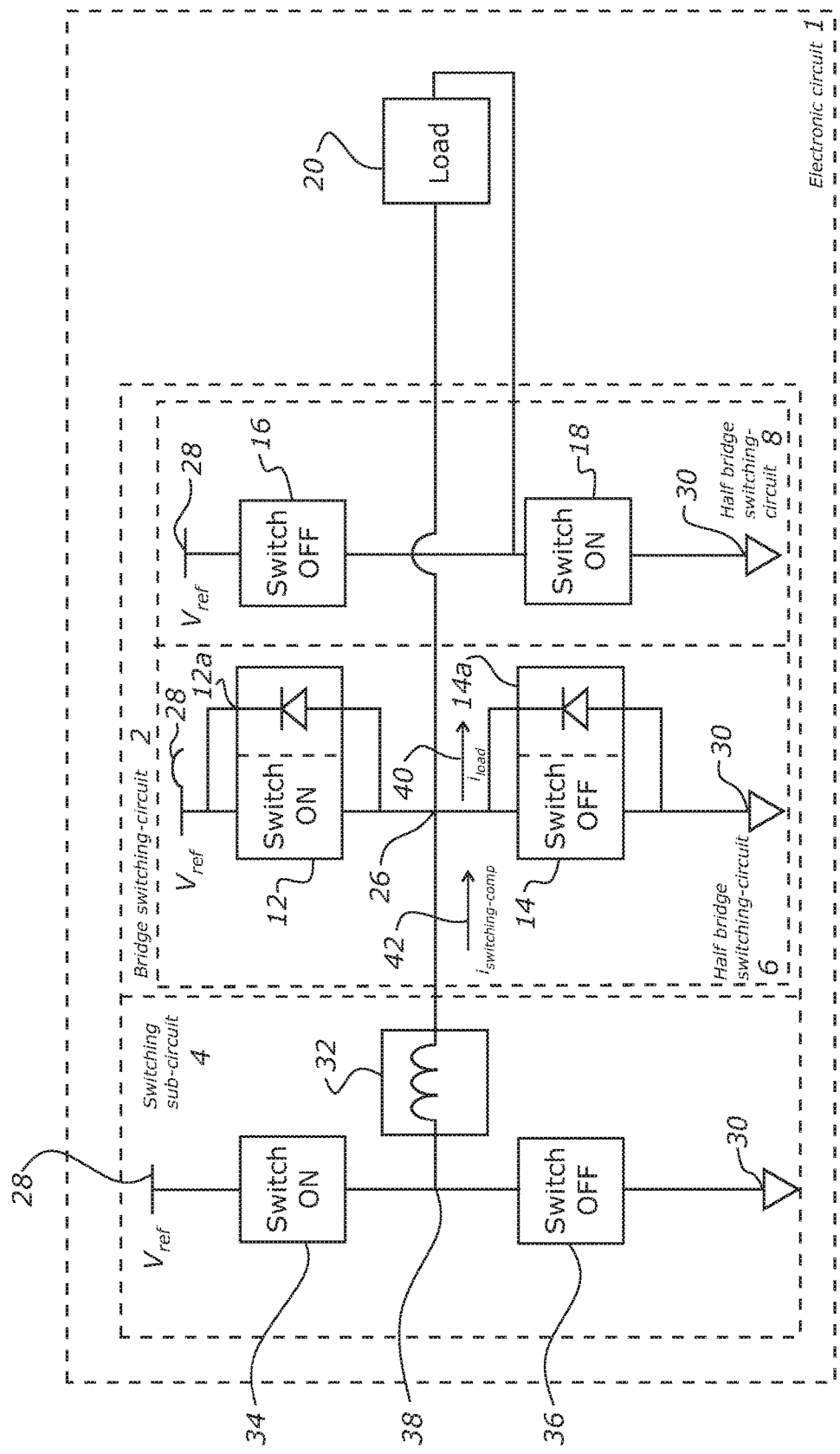
Figure 3A:
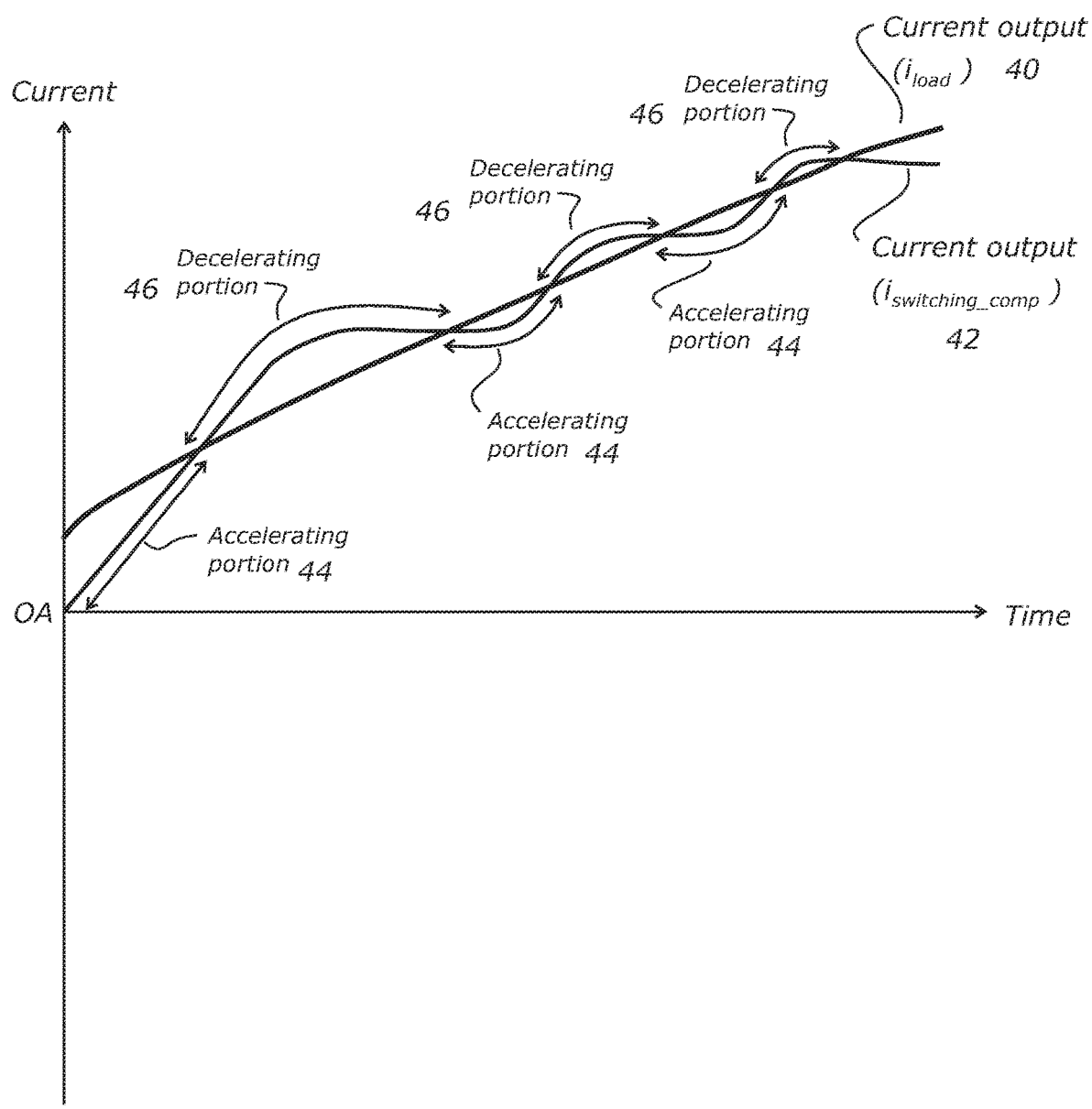
FIGS. 3A-B show "tracking" of current to enable soft switching.
Figure 3B:
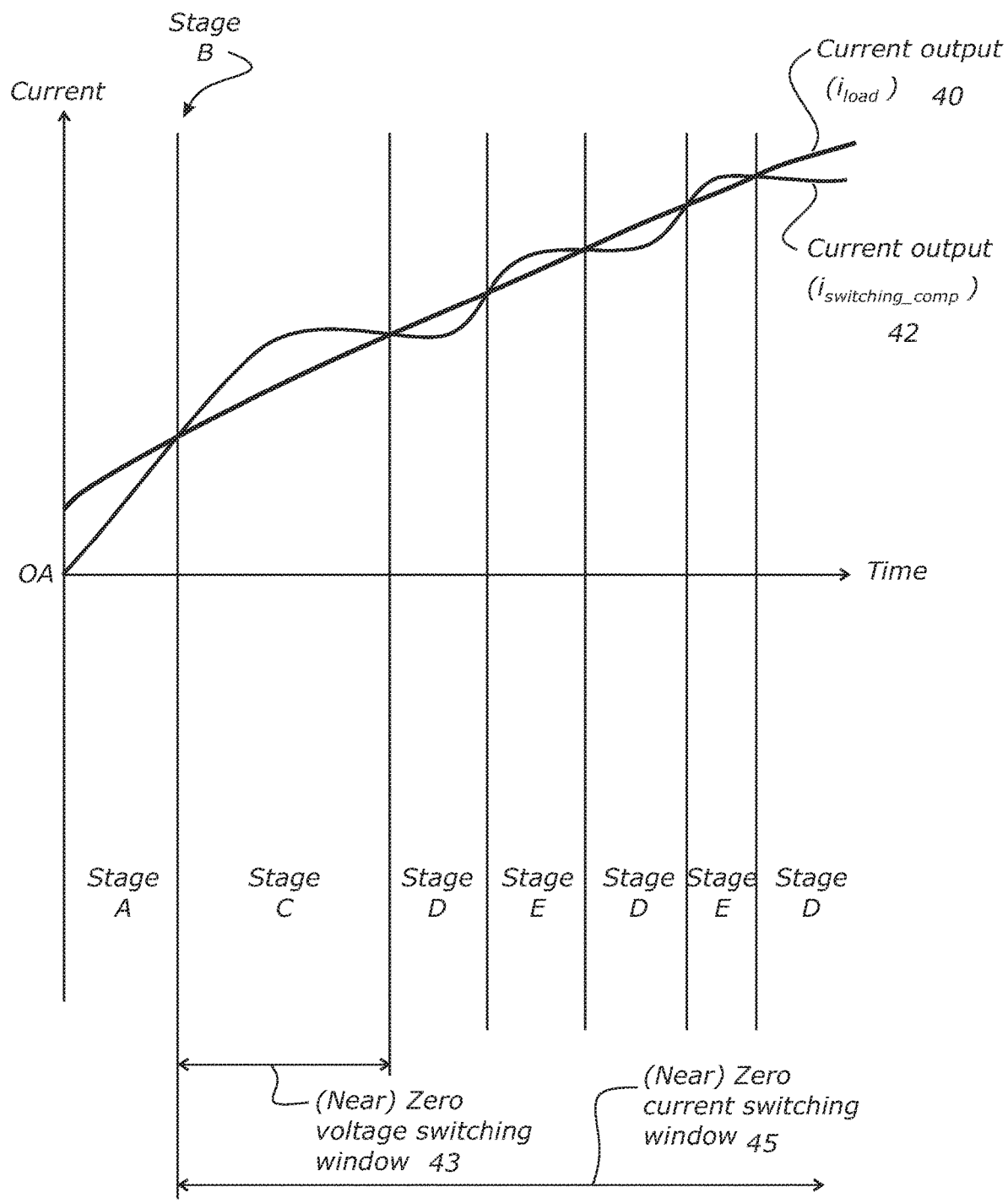
Figure 5A:
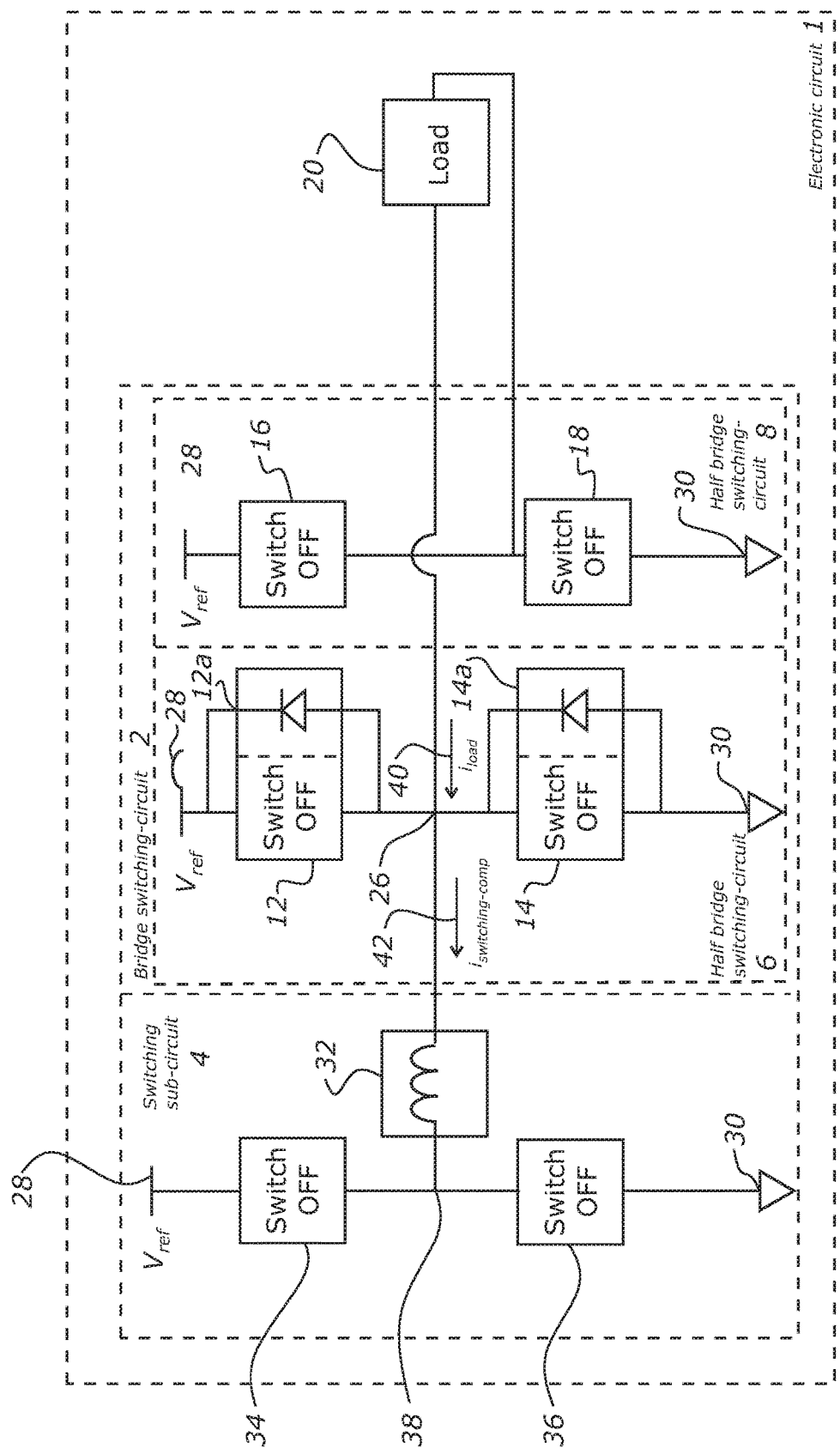
FIGS. 5A-C show an electronic circuit showing another general form of soft switching.
Figure 5B:
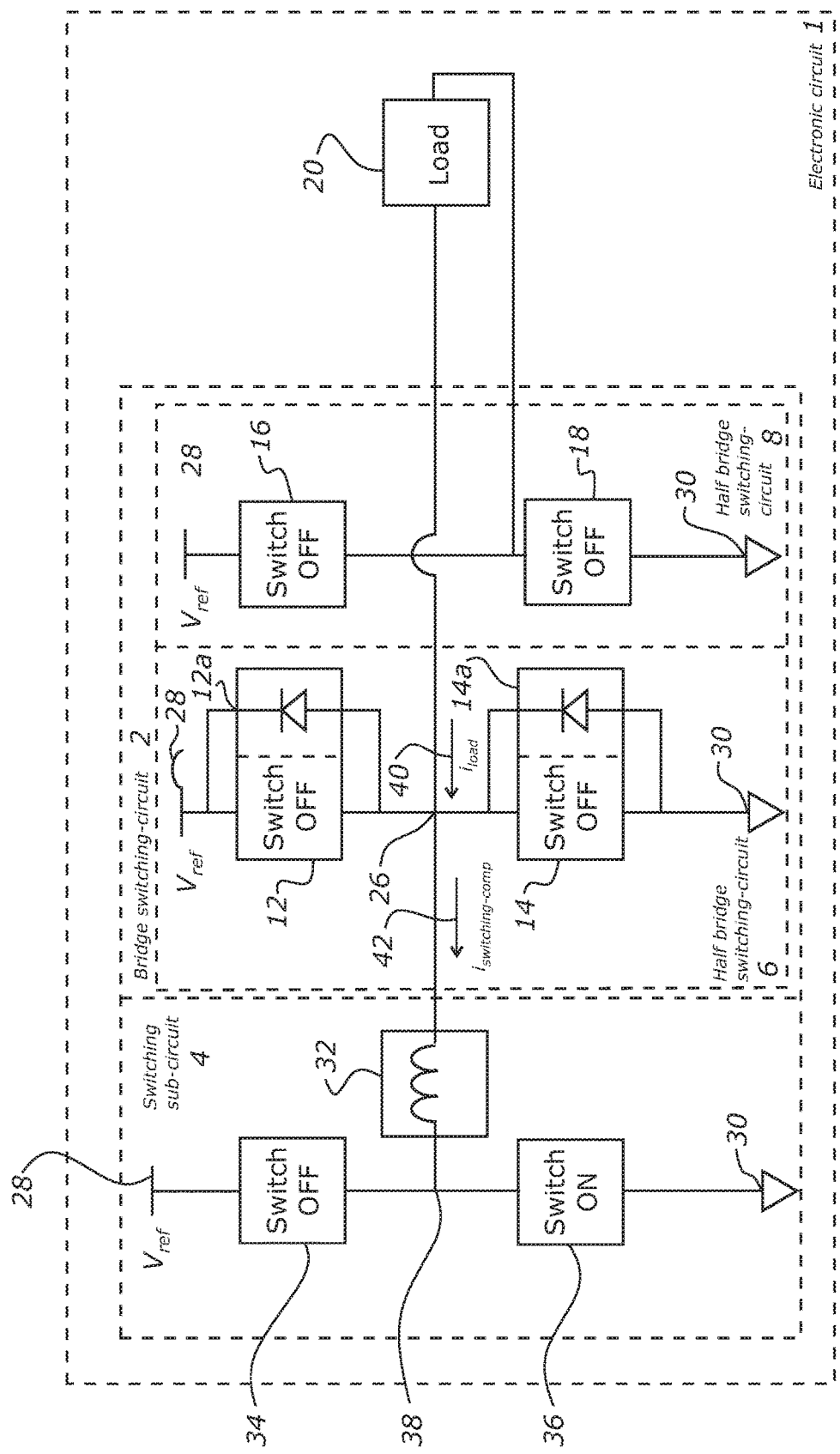
Figure 5C:
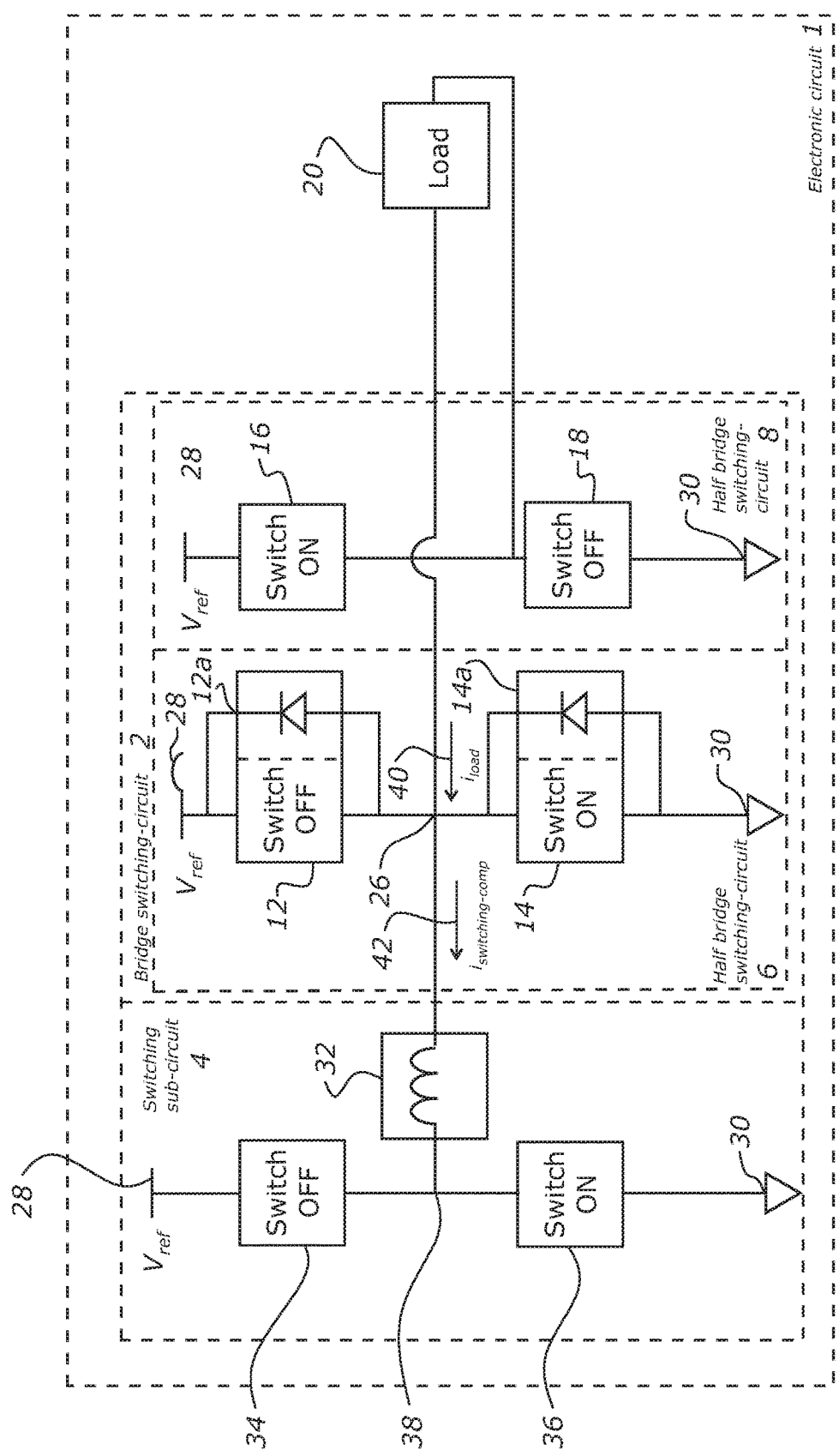
Figure 6A:
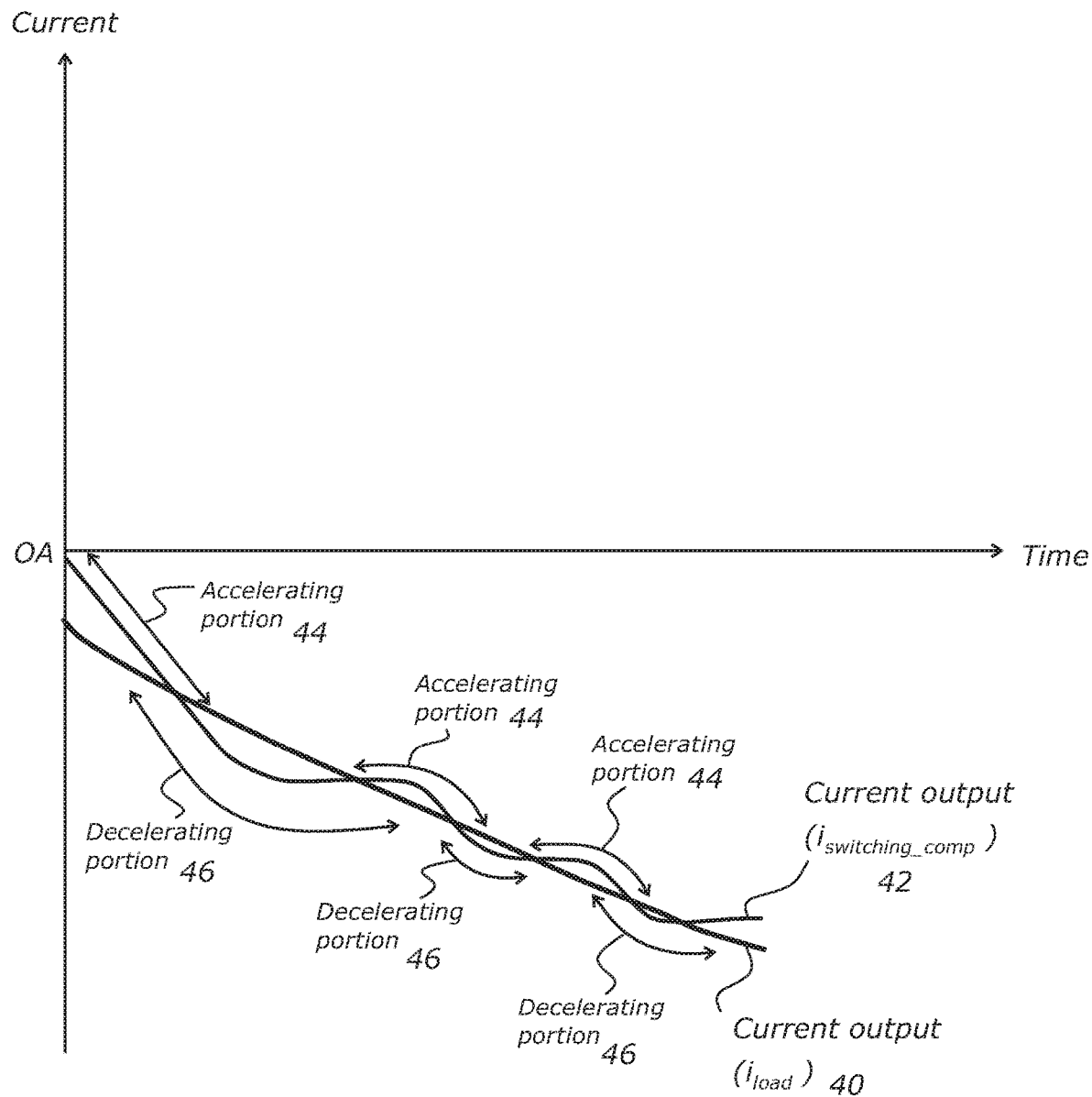
FIGS. 6A-B show "tracking" of current to enable soft switching.
Figure 6B:
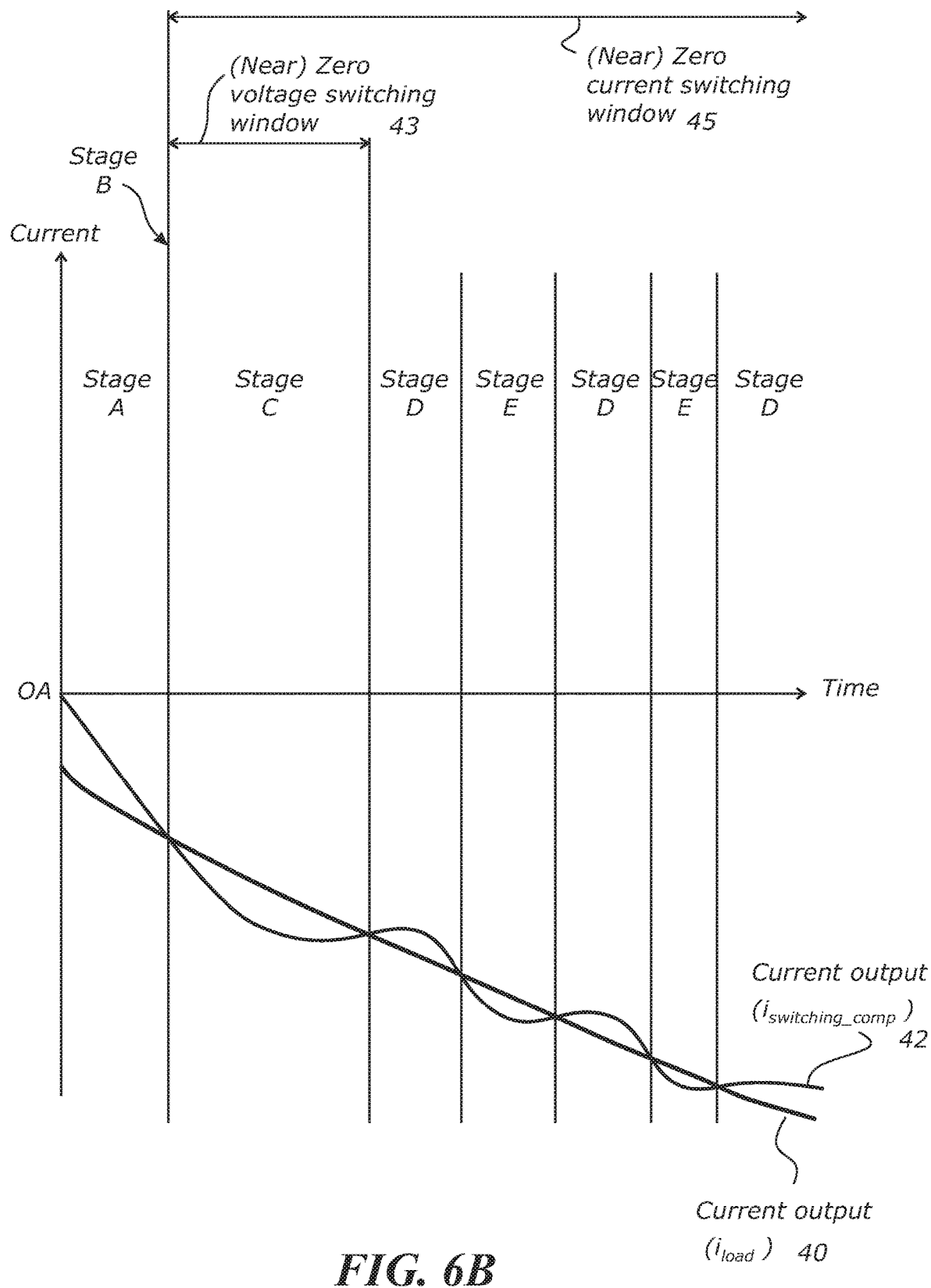

Referring to FIGS. 2A-2C and 5A-5C, the bridge switching circuit 2 is connectable to a load 20. The load 20 could be anything comprising an electrical impedance. The impedance of load 20 may comprise a resistance and/or a reactance that is inductive or capacitive. Examples of the load 20 could include, but not be limited to: an inductor, an LC (resonant) tank, or the like. The figures depict the load 20 as part of the electronic circuit 1, however this is not essential, and the load 20 could be part of a separate electronic circuit. The load 20 may optionally be part of the bridge switching circuit 2, but this is not essential. The load 20 provides a current output 40 of the bridge switching circuit 2, and for the rest of the detailed description, the current output 40 of the bridge switching circuit 2 may also be referred to one or more of: "the current 40 through the load 20" or "$i_{load}$" for simplification. In some embodiments, the current output 40 is varying. More specifically, the current output 40 may vary such that the absolute value of the current 40 is increasing. For example, FIGS. 3A-3B show a varying (positive) current 40 that flows from left to right in the circuit diagrams of FIGS. 2A-2C. FIGS. 6A-6B show a varying (negative) current 40, that flows from right to left in the circuit diagrams of FIGS. 5A-5C. Both FIGS. 3A-3B and 6A-6B show a varying current output 40. More specifically, both FIGS. 3A-3B and 6A-6B show a varying current output 40 that increases in absolute value.

The (soft) switching sub-circuit 4 should desirably be configured and operable to produce a varying current output ($i_{switching\_comp}$) 42 that tracks output current 40 (to load 20) from the bridge switching circuit 2 to create a substantially zero current through at least one switch component 12, 14 of the bridge switching circuit 2 to enable soft switching. More specifically, the switching sub-circuit component 4 should desirably produce a varying current output ($i_{switching\_comp}$) 42 comprising one or more accelerating portions 44 and one or more decelerating portions 46, which allows the varying current output 42 to "track" the varying current output 40 ($i_{load}$), as shown in FIGS. 3A and 6A to enable soft switching on. The accelerating portion 44 should change the current output ($i_{switching\_comp}$) 42 rapidly such that the current output 42 "overtakes" the current output 40. The accelerating portion 44 is generated by increasing the voltage difference applied across the inductive component 32. In this specification, the accelerating portion 44 may be interchanged with "accelerating (current) output", "accelerating (current) component", or "accelerating (current) mode". Likewise, the decelerating portion 46 should change the current output 40 slowly such that the current output 40 "overtakes" the current output 42. The decelerating portion 46 is generated by decreasing the voltage difference applied across the inductive component 32. In this specification, the decelerating portion 46 may be interchanged with "decelerating (current) output", "decelerating (current) component", or "decelerating (current) mode".

The alternation between the accelerating portion 44 and decelerating portion 46 means that the current output 42 ($i_{switching\_comp}$) substantially matches the current output 40 ($i_{load}$) out of the bridge switching circuit in absolute value and direction. When this happens, the current entering node 26 is substantially equal to the current exiting node 26 such that there is no or negligible (i.e. substantially zero) amount of current that passes through switching components 12, 14. When this happens, a (near) zero current condition ("(near) zero current window") 45 is created for switching components 12, 14, providing the condition needed for achieving a "soft turn on" for switching components 12, 14, thereby reducing power loss in the bridge switching circuit 2. As illustrated in FIGS. 3B and 6B, the (near) zero current window 45 is continues to remain open, which means it is possible to achieve soft switching without needing to use an accurate detection circuit to detect when the (near) zero current window 45 is open. Not needing to have an accurate detection circuit simplifies circuit manufacturing and operation.

Although FIGS. 2A-2C and 5A-5C show a switching sub-circuit 4 comprising two switch components 34, 36, it is not essential for the switching sub-circuits to have two switch components. That is, the switching sub-circuit 4 can have an inductive component 32 and just one switch component, i.e. the switching sub-circuit 4 can have either switch component 34 or switch component 36.

Two (near) zero current conditions for achieving a "soft turn on" will now be described. The first (near) zero current condition describes a situation in which the (soft) switching sub-circuit 4 produces a varying (positive) current output 42 that "tracks" current 40 passing out of the bridge switching circuit (i.e. "tracks" a positive current output 40), as shown in FIG. 3A. The second (near) zero current condition describes a situation in which the (soft) switching sub-circuit 4 produces a varying (negative) current output 42 that "tracks" current 40 passing out of the bridge switching circuit (i.e. "tracks" a negative current output 40), as shown in FIG. 6A.

First (Near) Zero Current Condition

Figure 4A:
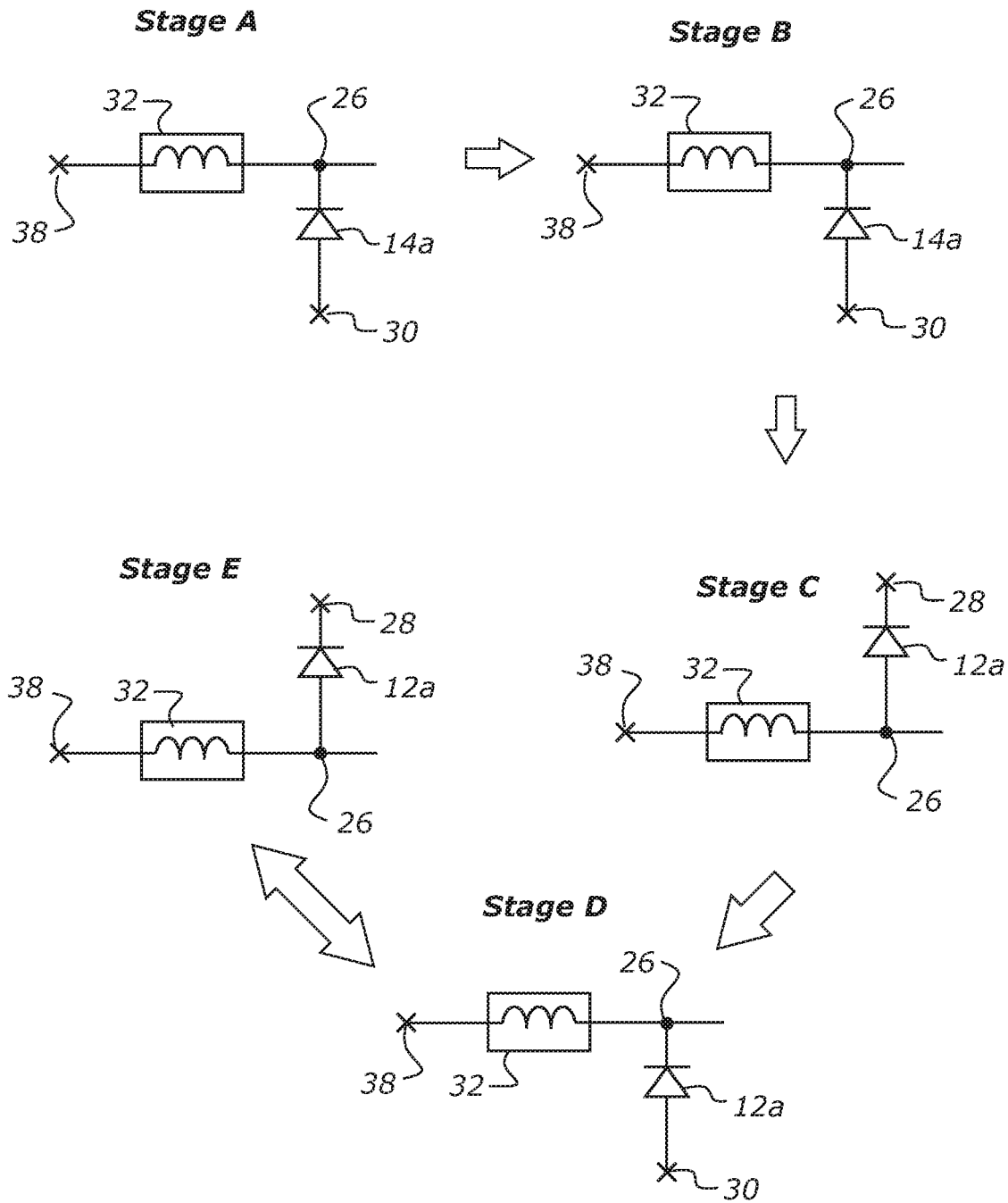
FIGS. 4A-F form a flow diagram showing changes in circuit operation to enable soft switching.

The first (near) zero current condition will be described with reference to FIGS. 2A-2C and 4A-4F. FIGS. 2A-2C show the order in which switching components 34 and 12 are switched on—that is, if all switching components are off (see FIG. 2A), switching component 34 is switched on first (see FIG. 2B) so that switching component 12 can "softly" switch on (see FIG. 2C). FIG. 4A shows a flow diagram of how the switching sub-circuit 4 interacts with the bridge switching circuit 2 when switching component 34 is switched on to create the (near) zero current condition for switching component 12 to turn on "softly", from stage A through to stage E. FIGS. 4B-4F expand on each of stages A-E respectively.

At FIG. 2A, all switch components 12, 14, 16, 18, 34 and 36 are off. The current output 42 is at zero, i.e. $i_{switching\_comp}$=0, and in this situation the current output 40 is positive and increasing in a sinusoidal manner. This means the current output 40 is greater than the current output 42, i.e. $i_{load}$>$i_{switching\_comp}$. The total current entering node 26 is equal to the total current leaving node 26 according to Kirchoff's current law. For node 26 to operate in accordance with Kirchoff's current law, the positive and increasing current output 40 places diode 14a into a forward-bias condition, such that current can pass through diode 14a from grounded node 30 to node 26, with current passing through diode 14a matching the absolute value and direction of the current output 40. That is, the current passing through diode 14a is also positive and increasing such that the current passing through diode 14a corresponds to the current output 40. The forward-bias conduction of diode 14a means that there a voltage drop of $V_{D2}$ such that the voltage at node 26 is $-V_{D2}$. Preferably, the voltage drop across diode 14a should be negligible such that the voltage at node 26 is at substantially zero volts (i.e. $-V_{D2}\approx0$).

Figure 4B:
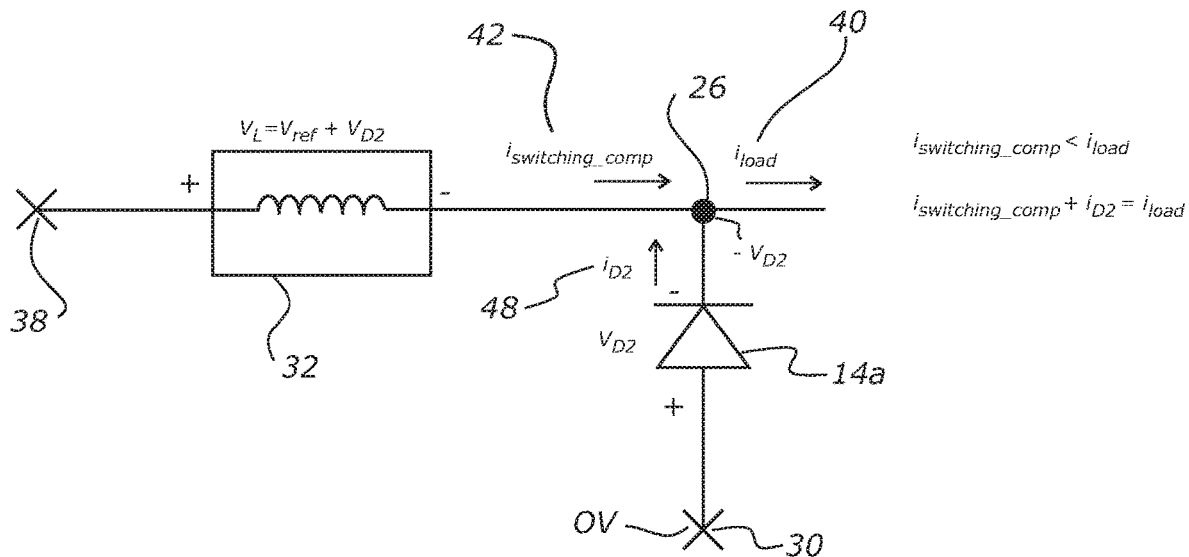

Stage A as shown in FIGS. 4A and 4B describes what happens once switch component 34 is switched on as shown in FIG. 2B. The switching on of switch component 34 allows conduction of current from node 28 through switch component 34 to node 38, and conduction of current from node 38 through inductive component 32 to node 26. As the voltage drop across switch component 34 is zero and the voltage at node 28 is at the reference voltage $V_{ref}$, the voltage at the node 38 is also at the reference voltage $V_{ref}$. As already established, the voltage at node 26 is $-V_{D1}$. This means that there is a (non-zero) voltage difference of $V_{ref}+V_{D2}$ applied across the inductive component 32. The (non-zero) voltage difference applied across the inductive component 32 induces a (linear) increase in current through the inductive component 34, which allows the switching sub-circuit 4 to produce an accelerating portion 44 of the positive current output 42, see FIG. 3A, and allows the positive current output 42 to increase at a greater rate than the rate that the current output 40 ($i_{load}$) is increasing at, see FIG. 3A. This means the current output 42 eventually "catches up" to the current output 40. While the current 42 through the inductive component 32 increases, the current 48 through the diode 14a correspondingly decreases at the same rate, and as current output 42 gets closer the current output 40, the current 48 through the diode 14a approaches zero. At this point, discussion turns to Stage B.

Figure 4C:
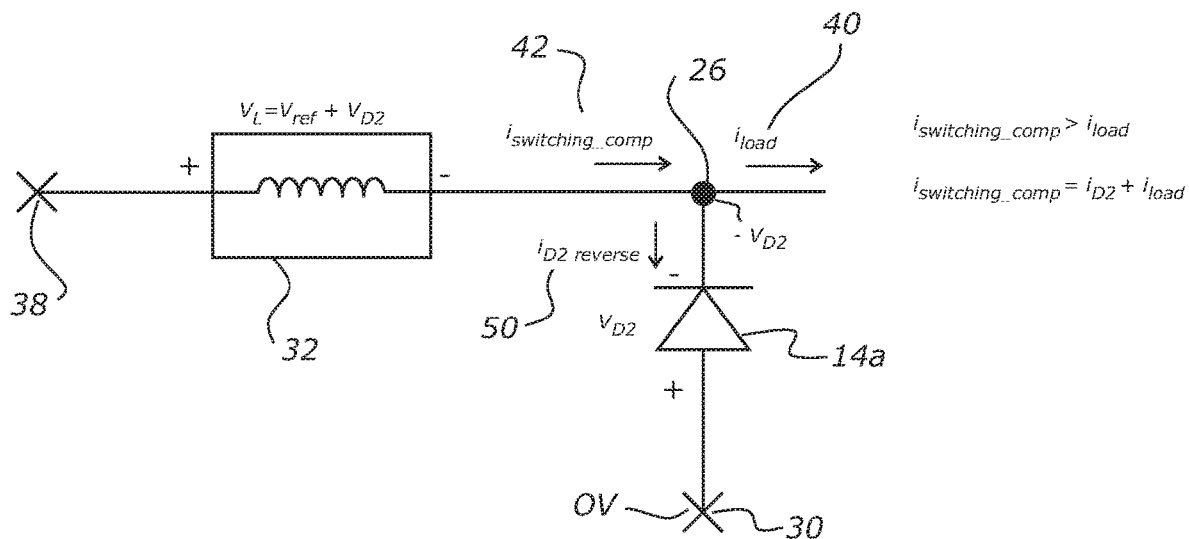

Stage B as shown in FIGS. 4A and 4C describes what happens after Stage A, once the current output 42 "catches up" to the current output 40. When current output 42 eventually "catches up" to the to the current output 40, the current 48 through diode 14a reaches zero and the diode 14a switches off, stopping forward-bias conduction of the diode 14a. The shutting off of the diode 14a induces a reverse recovery current 50 in which diode 14a momentarily conducts current from node 26 through to ground node 30. The reverse recovery current through diode 14a is compensated by an increase in current through the inductive component 32 so that total current entering node 26 is equal to the total current leaving node 26, in accordance with Kirchoff's current law. The increase in current through the inductive component 32 means the current output 42 of the switching sub-circuit 4 "overtakes" the current output 40 so that the current output 42 is more positive than the current output 40, as shown in FIGS. 3A and 3B.

Figure 26:
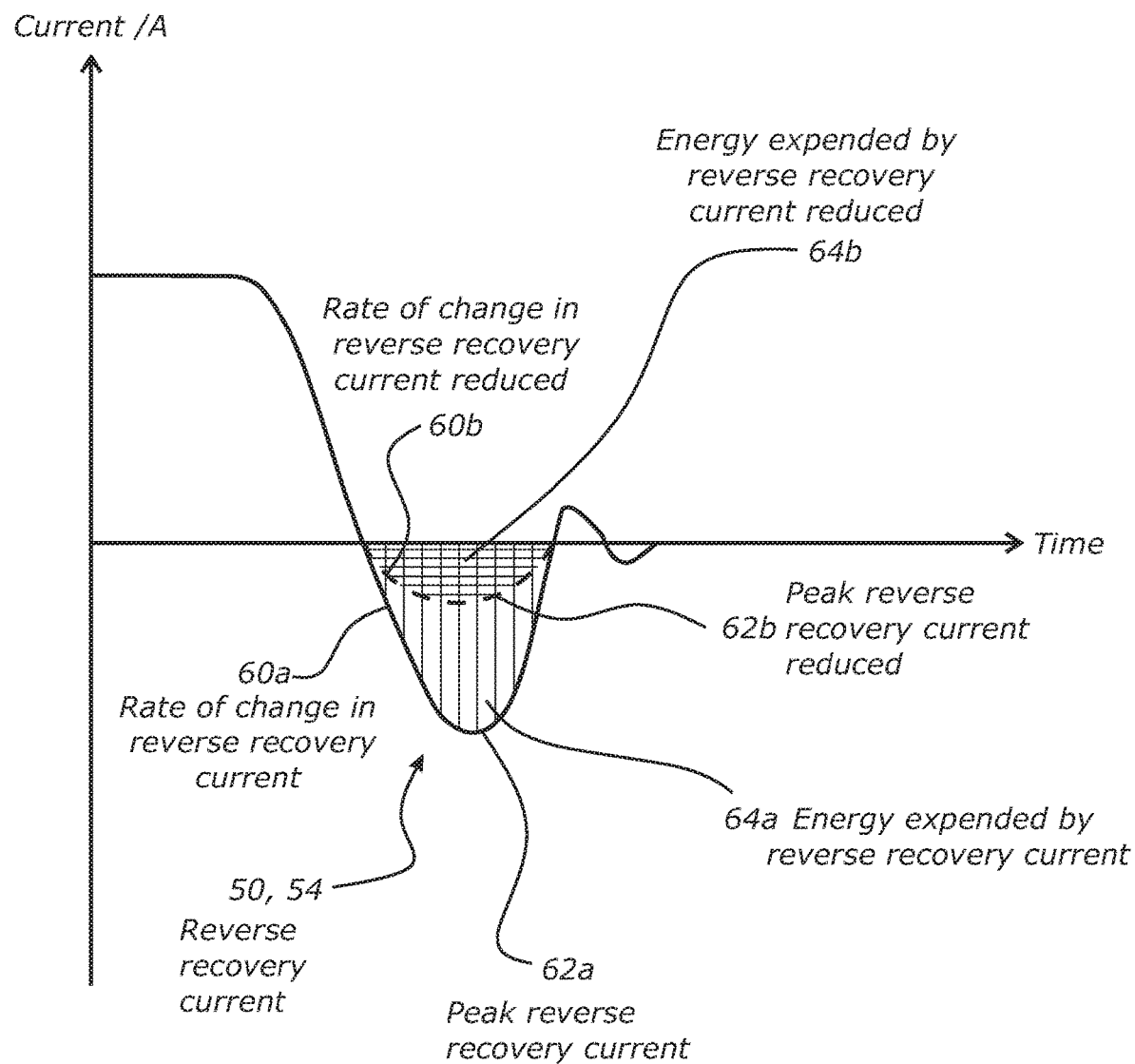
FIG. 26 is a line graph showing how soft switching of the switch component diode is achieved.

As discussed already, switching off the forward-bias conduction of diode 14a (from ground node 30 to node 26) induces a reverse recovery current 50 in which the diode 14a conducts current in a reverse-bias direction from node 26 through to ground node 30. The reverse recovery current 50 undesirably generates electromagnetic interference and undesirably results in a "hard" switch off for diode 14a (which happens if switch component 14 is turned on in a "hard" manner). The inductive component 32 helps reduce the undesired electromagnetic interference and/or achieve a "softer" switch off for diode 14a. This will now be explained. When there is a change in current through inductive component 32, the rate in change cannot change instantaneously (due to the nature of an inductive impedance). That is, the rate in change of current 42 through the inductive component 32 is limited to a finite value. This means at stage B, the current 42 through the inductive component 32 changes gradually (as opposed to instantaneously). The gradual rate of change in current 42 through the inductive component 32 reduces the rate of change 60a in reverse recovery current 50 to a gradual rate 60b also (in accordance with Kirchoff's current law), as shown in FIG. 26. By reducing the change in reverse recovery current 50 to a gradual rate 60a,b, the peak reverse recovery current 62a is also reduced 62b. The reduction in peak reverse recovery current 62a,b means the energy expended by the reverse recovery current 50 is reduced as represented visually by the reduced area 64a,b covered by the curve in FIG. 26. The reduction in energy 64a,b expended by the reverse recovery current 50 means less electromagnetic interference is generated, and a "softer" switch off for diode 14a is achieved.

Further, at Stage B, the current outputs 40, 42 are substantially matched. The substantial matching of current outputs means that there is (near) zero current passing through switch component 12, in accordance with Kirchoff's current law. The substantial matching of current outputs therefore creates a (near) zero current switching window 45 for switch component 12 to potentially be softly switched on at Stage B. As will be explained next in Stages C-E, the substantial matching of output current is maintained, which therefore maintains the (near) zero current switching window 45 for switch component 12 to potentially be softly switched on at Stages C-E also. That is, the (near) zero current switching window 45 for switch component 12 to potentially be softly switched on is provided from Stage B onwards. Discussion now turns to stage C.

Figure 4D:
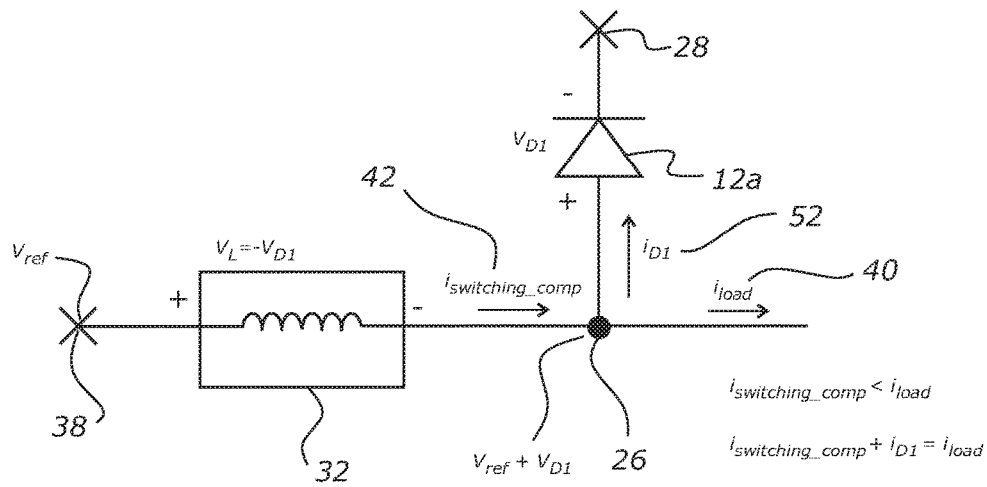

Stage C as shown in FIGS. 4A and 4D describes what happens after Stage B, once the current output 42 "overtakes" the current output 40. At this point, diode 12a is placed into forward-bias condition such that the excess current from the current output 42 is conducted through diode 12a to node 28 so that node 26 operates in accordance with Kirchoff's current law. The conduction of current through diode 12a from node 26 to node 28 means that there is a voltage drop of $V_{D1}$, which means that the voltage at node 26 now increases from $-V_{D2}$ to $V_{ref}+V_{D1}$. The increase in voltage at node 26 to $V_{ref}+V_{D1}$ means that the voltage drop across inductive component decreases from $V_{ref}+V_{D2}$ to $-V_{D1}$. Since it is desirable for diodes to be designed such that the voltage drop across a diode is negligible (i.e. substantially zero), it is reasonable for a skilled person to assume that the voltage drop across diode 12a ($-V_{D1}$) is (substantially) zero, which means the voltage drop across switch component 12 is also (substantially) zero. This means there is a (near) zero voltage switching window 43 for switch component 12 to be switched on "softly" during Stage C, see FIG. 3B. Further, the (substantially) zero voltage drop across diode 12a means the voltage drop across the inductive component is also (substantially) zero, which causes the current 42 through the inductive component 32 to "level" off and "flatten". This allows the switching sub-circuit 4 to produce a decelerating portion 46 of the positive current output 42, see FIG. 3A, and allows the current output 40 to increase at a greater rate than the rate that the current output 42 is increasing at, see FIG. 3B. The decelerating portion 46 prevents the current output 42 from diverging from the current output 40, such that the current outputs are still substantially matched. The substantial matching of current outputs provides a (near) zero current switching window 45 for switch component 12 to potentially be softly switched on during Stage C. Eventually, the current output 40 "catches up" to the to the current output 42, and "overtakes" the current output 42. At this point, discussion turns to Stage D.

Figure 4E:
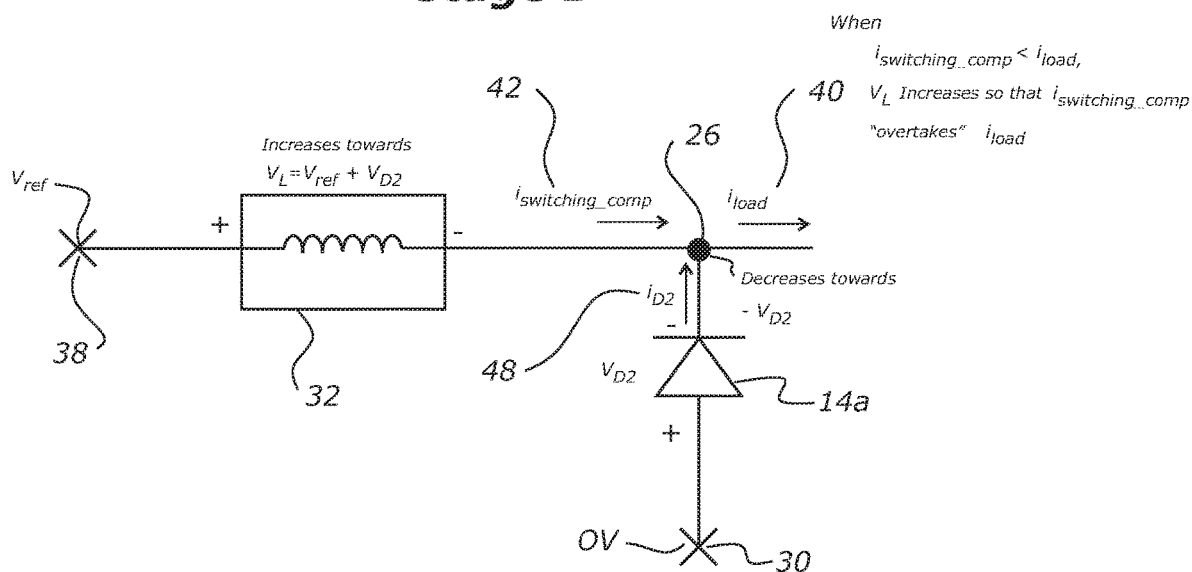

Stage D as shown in FIGS. 4A and 4E describes what happens after Stage C, once the current output 40 "overtakes" the current output 42. As the current output 40 exceeds the current output 42, diode 14a needs to be put into forward-bias conduction to provide additional current to match the current output 40. To place the diode 14a into forward-bias conduction, the voltage at node 26 needs to decrease from $V_{ref}+V_{D1}$ to $-V_{D2}$. However as soon as the voltage at node 26 begins decreasing to $-V_{D2}$, the voltage drop at node 26 means the voltage difference across the inductive component 32 begins to start increasing from $-V_{D1}$ towards $V_{ref}+V_{D2}$. The increase in voltage difference across the inductive component 32 causes the current 42 through the inductive component 32 to increase, which allows the switching sub-circuit 4 to produce an accelerating portion 44 of the positive current output 42, see FIG. 3A, and allows the positive current output 42 to increase at a greater rate than the rate that the current output 40 ($i_{load}$) is increasing at, see FIG. 3B. The accelerating portion 44 prevents the current output 40 from diverging from the current output 42, such that the current outputs are still substantially matched. The substantial matching of current outputs provides a (near) zero current switching window 45 for switch component 12 to potentially be softly switched on during Stage D. Eventually, the current output 42 "catches up" to the to the current output 40, and "overtakes" the current output 40. At this point, discussion turns to Stage E.

Figure 4F:
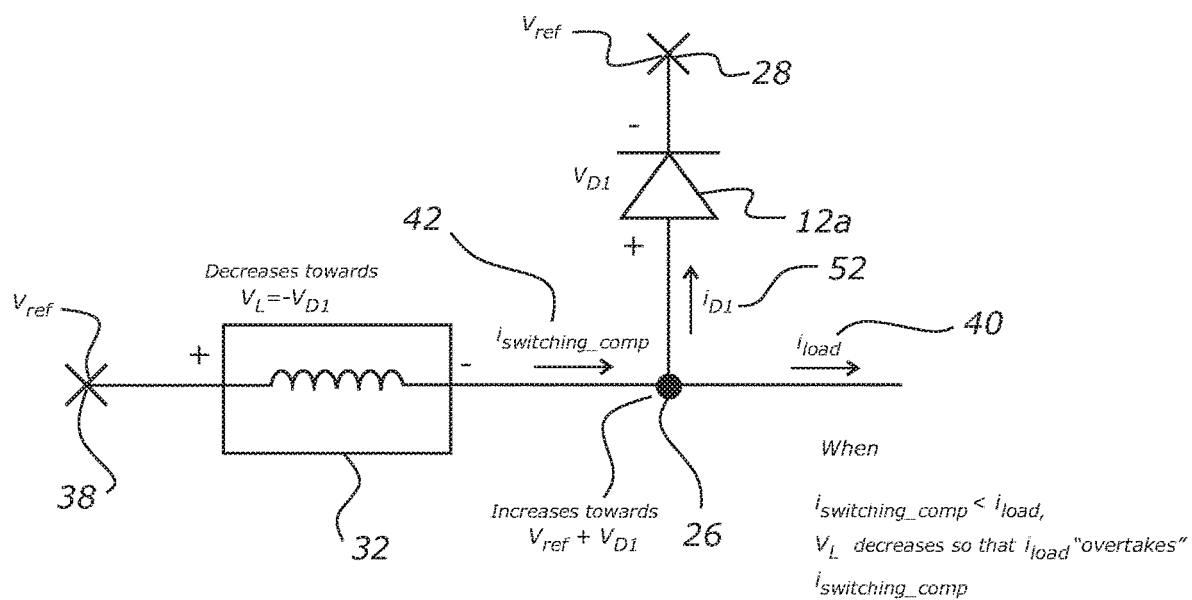

Stage E as shown in FIGS. 4A and 4F describes what happens after Stage D, once the current output 42 "overtakes" the current output 40. As the current output 42 exceeds the current output 40, diode 12a needs to be put into forward-bias conduction to provide additional current to match the current output 42. To place the diode 12a into forward-bias conduction, the voltage at node 26 needs to increase towards $V_{ref}+V_{D1}$. However as soon as the voltage at node 26 begins increasing towards $-V_{ref}+V_{D1}$, the voltage increase at node 26 means the voltage difference across the inductive component 32 begins to start decreasing from $V_{ref}+V_{D2}$ towards $-V_{D1}$. The decrease in voltage difference across the inductive component 32 causes the current 42 through the inductive component 32 to "flatten", which allows the switching sub-circuit 4 to produce a decelerating portion 46 of the positive current output 42, see FIG. 3A, and allows the current output 40 ($i_{load}$) to increase at a greater rate than the rate that the current output 42 is increasing at, see FIG. 3B. The decelerating portion 46 prevents the current output 42 from diverging from the current output 40, such that the current outputs are still substantially matched. The substantial matching of current outputs provides a (near) zero current switching window 45 for switch component 12 to potentially be softly switched on during Stage E. Eventually, the current output 42 "catches up" to the to the current output 40, and "overtakes" the current output 40. At this point, discussion turns back to Stage D, which has been described as above.

It is the alternation between the accelerating portions 44 (Stages A-C and E) and the decelerating portions 46 (Stage D) that ensures that the current output 42 of the switching sub-circuit 4 is able to "track" the current output 40 such that the difference between the current output 40 and current output 42 is substantially zero, see FIGS. 3A, 3B, and 4A. The "tracking" creates a (near) zero current window 45 as shown in FIG. 3B for switching component 12 to turn on "softly" with minimal power loss as shown in FIG. 2C.

Further, it is possible to achieve soft switch on without needing to use an accurate detection circuit to detect when the (near) zero current window 45 is open, since the (near) zero current window 45 continues to remain open through as shown in FIG. 3B.

It will be apparent to a skilled person that it is sufficient for the switching sub-circuit 4 to have an inductive component 32 and switch component 34. It is not essential for the switching sub-circuit 4 to also have switch component 36.

Second (Near) Zero Current Condition

Figure 7A:
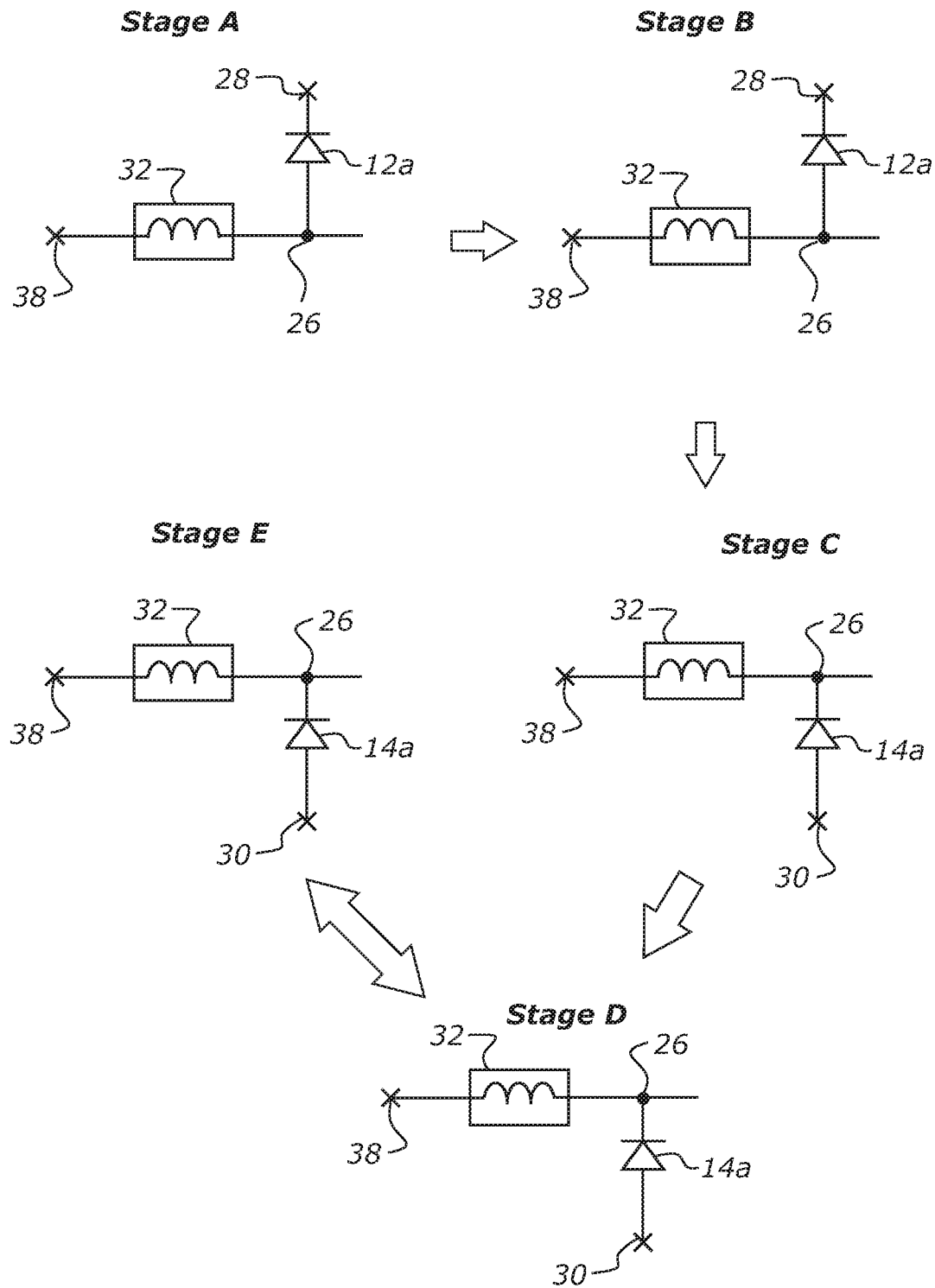
FIGS. 7A-F form a flow diagram showing changes in circuit operation to enable soft switching.

The second (near) zero current condition will be described with reference to FIGS. 5A-5C and 7A-7F. FIGS. 5A-5C show the order in which switching components 36 and 14 are switched on—that is, if all switching components are off (see FIG. 5A), switching component 36 is switched on first (see FIG. 5B) so that switching component 14 can "softly" switch on (see FIG. 5C). FIG. 7A shows a flow diagram of how the switching sub-circuit 4 interacts with the bridge switching circuit 2 when switching component 36 is switched on to create the (near) zero current condition for switching component 14 to turn on "softly", from stage A through to stage E. FIGS. 7B-7F expand on each of stages A-E respectively.

At FIG. 5A, all switch components 12, 14, 16, 18, 34 and 36 are off. The current output 42 is at zero, i.e. $i_{switching\_comp}=0$, and in this situation the current output 40 is negative (i.e. current 40 through the load 20 flows from right to left in FIG. 5A) and decreasing in a sinusoidal manner. That is, current output 40 is passing into node 26. This means the current output 40 is more negative than the current output 42, i.e. $i_{load}>i_{switching\_comp}$. The total current entering node 26 is equal to the total current leaving node 26 according to Kirchoff's current law. For node 26 to operate in accordance with Kirchoff's current law, the negative and decreasing current output 40 places diode 12a into a forward-bias condition, such that current can pass through diode 12a from node 26 to node 28, with current passing through diode 12a matching the absolute value and direction of the current output 40. That is, the current passing through diode 12a is also negative and decreasing such that the current passing through diode 12a corresponds to the current output 40. The forward-bias conduction of diode 12a means that there a voltage drop of $V_{D1}$ such that the voltage at node 26 is $V_{ref}+V_{D1}$. Preferably, the voltage drop across diode 14a should be negligible such that the voltage at node 26 is at substantially the reference voltage (i.e. $V_{ref}+V_{D1}\approx V_{ref}$).

Figure 7B:
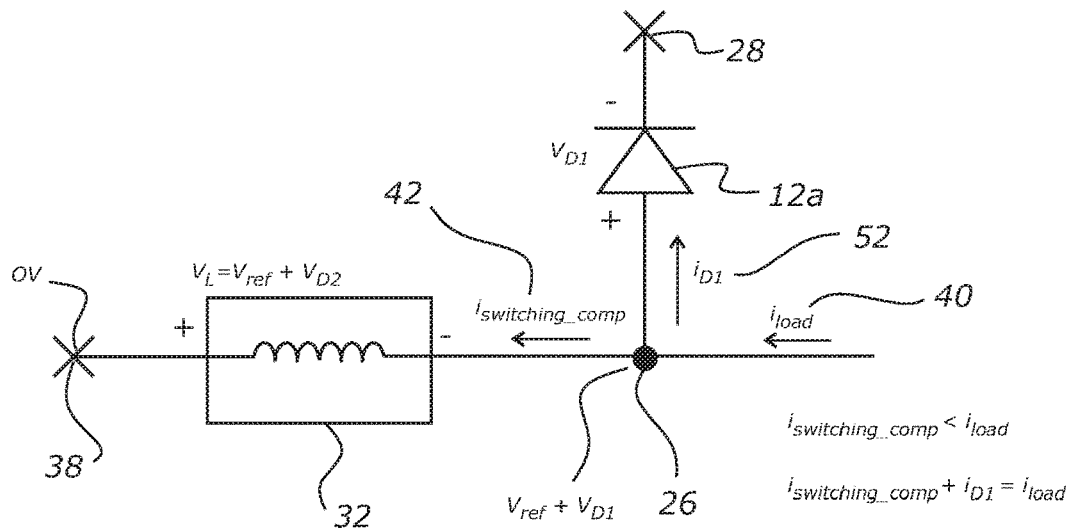

Stage A as shown in FIGS. 7A and 7B describes what happens once switch component 36 is switched on as shown in FIG. 5B. The switching on of switch component 36 allows conduction of current from node 26 through inductive component 32 to node 38, and conduction of current from node 38 through switch component 36 to grounded node 30. As the voltage drop across switch component 36 is zero and the voltage at grounded node 30 is at zero volts, the voltage at the node 38 is also at grounded at zero volts. As already established, the voltage at node 26 is $V_{ref}+V_{D1}$. This means that there is a (non-zero) voltage difference of $V_{ref}+V_{D1}$ applied across the inductive component 32. The (non-zero) voltage difference applied across the inductive component 32 induces a (linear) decrease in current through the inductive component 36, which allows the switching sub-circuit 4 to produce an accelerating portion 44 of the negative current output 42, see FIG. 6A, and allows the negative current output 42 to decrease at a greater rate than the rate that the current output 40 ($i_{load}$) is decreasing at, see FIG. 6B. This means the current output 42 eventually "catches up" to the current output 40. While the current 42 through the inductive component 32 decreases, the current 52 through the diode 12a correspondingly increases at the same rate, and as current output 42 gets closer to the current output 40, the current 52 through the diode 12a approaches zero. At this point, discussion turns to Stage B.

Figure 7C:
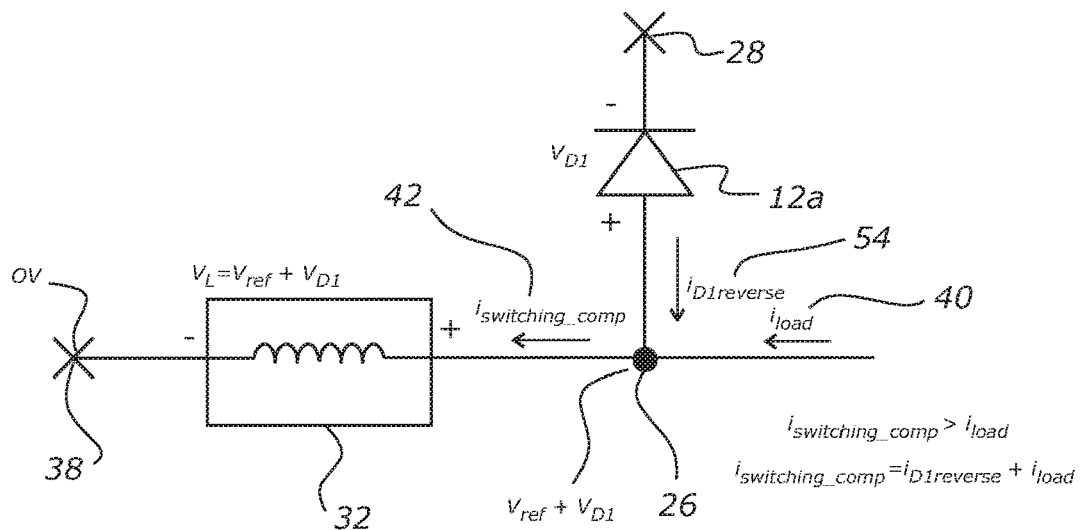

Stage B as shown in FIGS. 7A and 7C describes what happens after Stage A, once the current output 42 "catches up" to the current output 40. When current output 42 eventually "catches up" to the to the current output 40, the current 48 through diode 12a reaches zero and the diode 12a switches off, stopping forward-bias conduction of the diode 12a. The shutting off of the diode 12a induces a reverse recovery current 54 in which current momentarily conducts current from node 28 through to node 26. The reverse recovery current through diode 12a is compensated by an decrease in current through the inductive component 32 so that total current leaving node 26 is equal to the total current entering node 26, in accordance with Kirchoff's current law. The decrease in current through the inductive component 32 means the current output 42 of the switching sub-circuit 4 "overtakes" the current output 40 so that the current output 42 is more negative than the current output 40, as shown in FIGS. 6A and 6B.

As discussed already, switching off the forward-bias conduction of diode 12a (from node 26 to node 28) induces a reverse recovery current 54 in which the diode 12a conducts current in a reverse-bias direction from node 28 through to node 26. The reverse recovery current 54 undesirably generates electromagnetic interference and undesirably results in a "hard" switch off for diode 12a (which happens if switch component 12 is turned on in a "hard" manner). The inductive component 32 helps reduce the undesired electromagnetic interference and/or achieve a "softer" switch off for diode 12a. This will now be explained. When there is a change in current through inductive component 32, the rate in change cannot change instantaneously (due to the nature of an inductive impedance). That is, the rate in change of current 42 through the inductive component 32 is limited to a finite value. This means at stage B, the current 42 through the inductive component 32 changes gradually (as opposed to instantaneously). The gradual rate of change in current 42 through the inductive component 32 reduces the rate of change 60a in reverse recovery current 54 to a gradual rate 60b also (in accordance with Kirchoff's current law), as shown in FIG. 26. By reducing the change in reverse recovery current 54 to a gradual rate 60a,b, the peak reverse recovery current 62a is also reduced 62b. The reduction in peak reverse recovery current 62a,b means the energy expended by the reverse recovery current 54 is reduced as represented visually by the reduced area 64a,b covered by the curve in FIG. 26. The reduction in energy 64a,b expended by the reverse recovery current 54 means less electromagnetic interference is generated, and a "softer" switch off for diode 12a is achieved.

Further, at Stage B, the current outputs 40, 42 are substantially matched. The substantial matching of current outputs means that there is (near) zero current passing through switch component 14, in accordance with Kirchoff's current law. The substantial matching of current outputs therefore creates a (near) zero current switching window 45 for switch component 14 to potentially be softly switched on at Stage B. As will be explained next in Stages C-E, the substantial matching of output current is maintained, which therefore maintains the (near) zero current switching window 45 for switch component 14 to potentially be softly switched on at Stages C-E. That is, the (near) zero current switching window 45 for switch component 14 to potentially be softly switched on is provided from Stage B onwards. Discussion now turns to stage C.

Figure 7D:
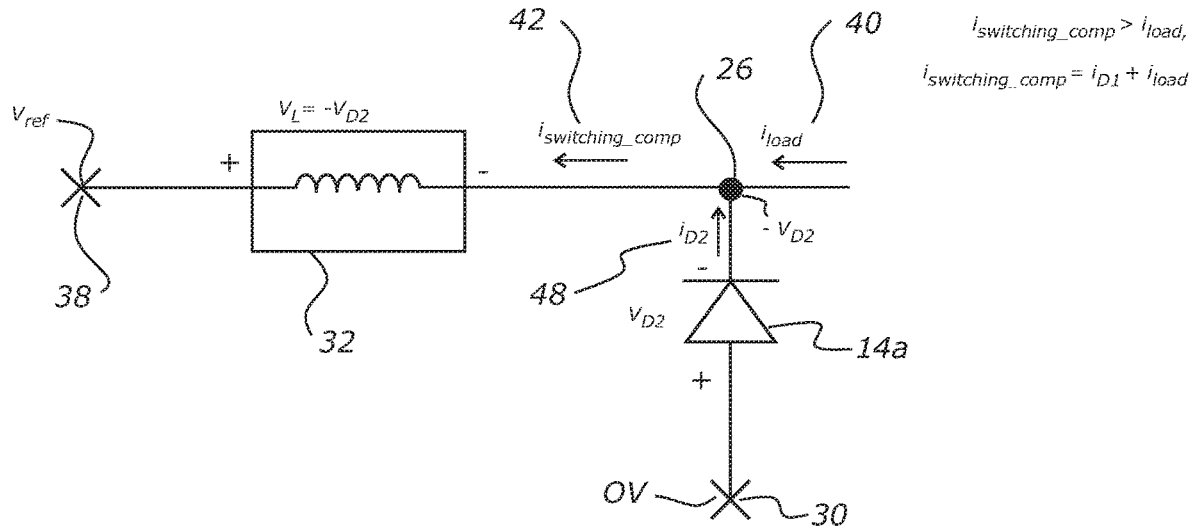

Stage C as shown in FIGS. 7A and 7D describes what happens after Stage B, once the current output 42 "overtakes" the current output 40. At this point, diode 14a is placed into forward-bias condition such that the excess current from the current output 42 is conducted through diode 14a from grounded node 30 so that node 26 operates in accordance with Kirchoff's current law. The conduction of current through diode 14a from grounded node 30 to node 26 means that there is a voltage drop of $V_{D2}$, which means that the voltage at node 26 now decreases from $V_{ref}+V_{D1}$ to $-V_{D2}$. The decrease in voltage at node 26 to $-V_{D2}$ means that the voltage drop across inductive component decreases from $V_{ref}+V_{D1}$ to $-V_{D2}$. Since it is desirable for diodes to be designed such that the voltage drop across a diode is negligible (i.e. substantially zero), it is reasonable for a skilled person to assume that the voltage drop across diode 14a ($-V_{D2}$) is (substantially zero), which means the voltage drop across switch component 14 is also (substantially) zero. This means there is a (near) zero voltage switching window 43 for switch component 14 to be switched on "softly" during Stage C, see FIG. 6B. Further, the (substantially) zero voltage drop across diode 14a means the voltage drop across the inductive component is also (substantially) zero, which causes the current 42 through the inductive component 32 to "level" off and "flatten". This allows the switching sub-circuit 4 to produce a decelerating portion 46 of the negative current output 42, see FIG. 6A, and allows the current output 40 to decrease at a greater rate than the rate that the current output 42 is decreasing at, see FIG. 6B. The decelerating portion 46 prevents the current output 42 from diverging from the current output 40, such that the current outputs are still substantially matched. The substantial matching of current outputs provides a (near) zero current switching window 45 for switch component 14 to potentially be softly switched on during Stage C. Eventually, the current output 40 "catches up" to the to the current output 42, and "overtakes" the current output 42. At this point, discussion turns to Stage D.

Figure 7E:
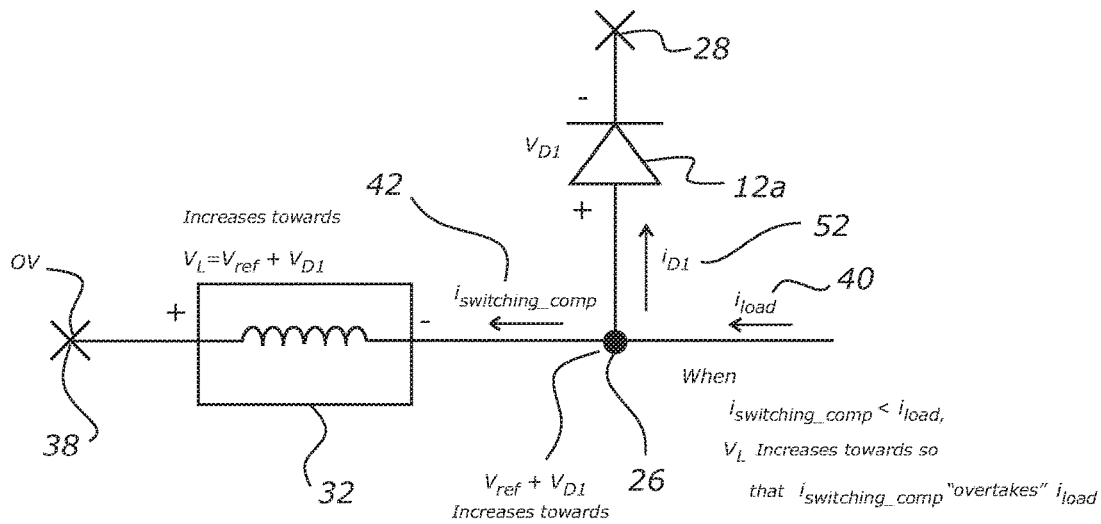
Figure 7F:
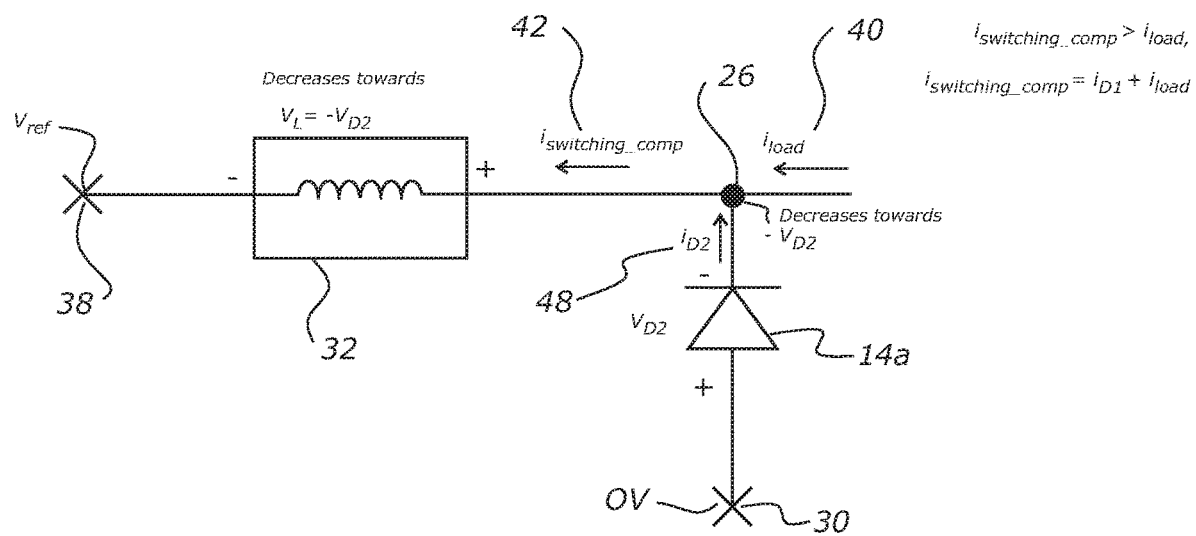

Stage D as shown in FIGS. 7A and 7E describes what happens after Stage C, once the current output 40 "overtakes" the current output 42. As the current output 40 exceeds the current output 42, diode 12a needs to be put into forward-bias conduction to provide additional current to match the current output 40. To place the diode 12a into forward-bias conduction, the voltage at node 26 needs to increase from $-V_{D2}$ to $V_{ref}+V_{D1}$. However as soon as the voltage at node 26 begins increasing to $V_{ref}+V_{D1}$, the voltage rise at node 26 means the voltage difference across the inductive component 32 begins to start increasing from $-V_{D2}$ towards $V_{ref}+V_{D1}$. The increase in voltage difference across the inductive component 32 causes the current 42 through the inductive component 32 to decrease, which allows the switching sub-circuit 4 to produce an accelerating portion 44 of the negative current output 42, see FIG. 6A, and allows the negative current output 42 to decrease at a greater rate than the rate that the current output 40 ($i_{load}$) is decreasing at, see FIG. 6B. The accelerating portion 44 prevents the current output 40 from diverging from the current output 42, such that the current outputs are still substantially matched. The substantial matching of current outputs provides a (near) zero current switching window 45 for switch component 14 to potentially be softly switched on during Stage D. Eventually, the current output 42 "catches up" to the to the current output 40, and "overtakes" the current output 40. At this point, discussion turns to Stage E.

Stage E as shown in FIGS. 4A and 4F describes what happens after Stage D, once the current output 42 "overtakes" the current output 40. As the current output 42 exceeds the current output 40, diode 14a needs to be put into forward-bias conduction to provide additional current to match the current output 42. To place the diode 14a into forward-bias conduction, the voltage at node 26 needs to decrease towards $-V_{D2}$. However as soon as the voltage at node 26 begins decreasing towards $-V_{D2}$, the voltage decrease at node 26 means the voltage difference across the inductive component 32 begins to start decreasing from $V_{ref}+V_{D1}$ towards $-V_{D2}$. The decrease in voltage difference across the inductive component 32 causes the current 42 through the inductive component 32 to "flatten", which allows the switching sub-circuit 4 to produce a decelerating portion 46 of the negative current output 42, see FIG. 6A, and allows the current output 40 ($i_{load}$) to decrease at a greater rate than the rate that the current output 42 is decreasing at, see FIG. 6B. The decelerating portion 46 prevents the current output 42 from diverging from the current output 40, such that the current outputs are still substantially matched. The substantial matching of current outputs provides a (near) zero current switching window 45 for switch component 14 to potentially be softly switched on during Stage E. Eventually, the current output 42 "catches up" to the to the current output 40, and "overtakes" the current output 40. At this point, discussion turns back to Stage D, which has been described as above.

It is the alternation between the accelerating portions 44 (Stages A-C, and E) and the decelerating portions (Stage D) that ensures that the current output 42 of the switching sub-circuit 4 is able to "track" the current output 40 such that the difference between the current output 40 and current output 42 is substantially zero, see FIGS. 6A, 6B, and 7A. The "tracking" creates a (near) zero current window 45 as shown in FIG. 6B for switching component 14 to turn on "softly" with minimal power loss as shown in FIG. 5C. Further, it is possible to achieve soft switch on without needing to use an accurate detection circuit to detect when the (near) zero current window 45 is open, since the (near) zero current window 45 continues to remain open as shown in FIG. 6B.

It will be apparent to a skilled person that it is sufficient for the switching sub-circuit 4 to have an inductive component 32 and switch component 36. It is not essential for the switching sub-circuit 4 to also have switch component 34.

Variations of the General Embodiment

Switch components 12, 16, 14, 18, 34, and 36 are preferably MOSFETs, although other types of switches may be used, and the use of MOSFETs is not essential. For example, BJTs and IGBTs may be used for any of switch components 12, 16, 14, 18, 34, and 36 can be used.

Although diodes 12a and 14a are described as intrinsic diodes of switch components 12 and 14 respectively, diodes 12a and 14a may also be taken by a skilled person to be a representation of a diodes external to the switch components. That is, diodes 12a and 14a could be diodes external to switch components 12 and 14 respectively. Preferably if diodes 12a and 14a are external, they are placed in parallel with switch components 12 and 14 respectively. A skilled person would recognise that BJTs do not have intrinsic body diodes and therefore if BJTs were selected as switch components 12 and 14, then diodes 12a and 14a would be external to BJT switches 12 and 14 respectively.

Inductive component 32 is preferably an inductor, although use of an inductor is not essential. For example, a skilled person would recognise that any other circuit components may be used as a substitute as long as it can be remodeled into an equivalent inductor. Further, any component/s capable of limiting the rate in change in current to a mathematically finite value may be considered to be an inductive component 32. That is, an inductive component 32 can be considered to be any component that, when operating as an individual component, prohibits an instantaneous change in current. An inductive component 32 can also be any group of components that, when operating collectively together, operates to prohibit an instantaneous change in current.

Specific Embodiments

Specific embodiments of the present invention will now be described. The specific embodiments cover two specific circuit arrangements ("circuit A" and "circuit B") and cover two different control methods ("control method A" and "control method B"), but all conform to the general principles mentioned in the general embodiment as described above of creating a (near) zero current condition to achieve "soft switch on" of switch components 12, 14. The specific embodiments differ from each other in terms of how the switch components 12, 14 are switched off.

Three specific embodiments will now be discussed:

First embodiment: This embodiment uses circuit A and control method A. In circuit A, a single inductor is used as the inductive component 32. In control method A, switch component 34 is turned off before switch component 12 is turned off, and switch component 36 is turned off before switch component 14 is turned off.

Second embodiment: This embodiment uses circuit A and control method B. This second embodiment is similar to the first embodiment, except this second embodiment uses a different control method. That is, the difference with this second embodiment is that switch components 12 and 34 are turned off (roughly) at the same time, and switch components 14 and 36 are turned off (roughly) at the same time.

Third embodiment: This embodiment uses circuit B and control method B. This third embodiment is similar to the second embodiment, except this third embodiment uses a different circuit. That is, the difference with this third embodiment is that a single capacitor placed in series with a single inductor (as the inductive component 32).

First Embodiment

This first embodiment will be described with reference to circuit A shown in FIG. 8, which comprises the following features:
  circuit 101, which corresponds to circuit 1
  bridge switching circuit 102, which corresponds to bridge switching circuit 2
  switching sub-circuit 104 (could be referred to as "auxiliary circuit"), which corresponds to switching sub-circuit 4
  left half-bridge 106, which corresponds to half-bridge circuit 6
  right half-bridge 108, which corresponds to half-bridge circuit 8
  MOSFETS 112 ("(main switch) S1"), 114 ("(main switch) S2"), 116 ("S3"), 118 ("S4"), 134 ("(auxiliary switch)

S5"), 136 ("(auxiliary switch) S6"), which respectively correspond to switching components 12, 14, 16, 18, 34, 36 diodes 112*a* ("(diode) D1"), 114*a* ("(diode) D2"), which respectively correspond to diodes 12*a*, 14*a* resonant tank 120, which corresponds to load 20 nodes 126 ("(node) M"), 128, 130, 138 ("(node) K"), which respectively correspond to nodes 26, 28, 30, 38

Inductor ("Ls") 132, which corresponds to inductive component 32

"I(Out)" current 140, which corresponds to output current 40

"I(Ls)" current 142, which corresponds to output current 42

"I(D2)" current 148, which corresponds to current 48

"I(D1)" current 152, which corresponds to current 52

Figure 8:
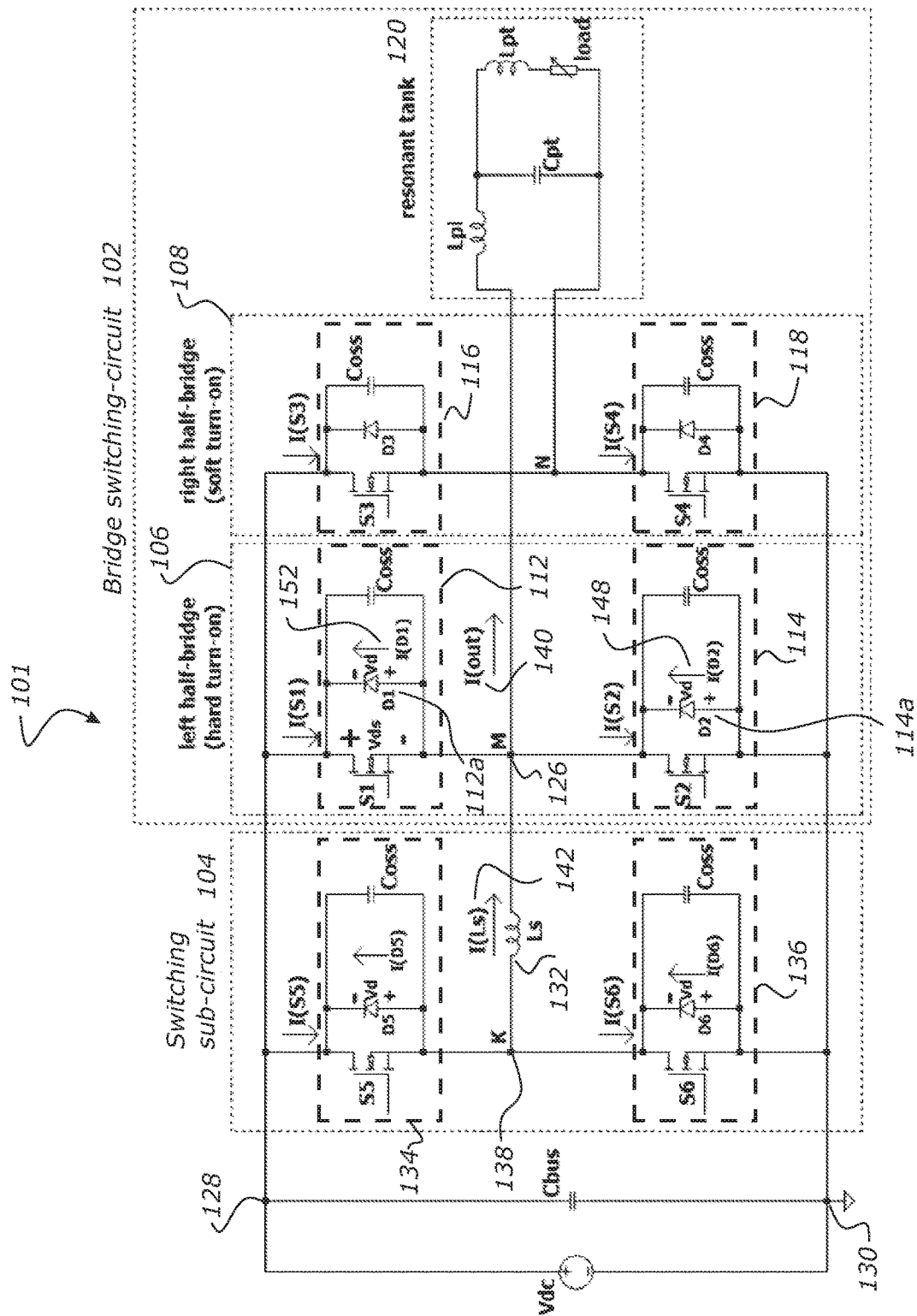
FIG. 8 is an electronic circuit showing one specific form of soft switching.

Adding an auxiliary circuit that comprises a half bridge (S5, S6) and an inductor Ls in parallel with the left half-bridge, as shown in FIG. 8, offers one or more of the following advantages:

1) It transforms the hard turn-on for the left half-bridge into near zero current turn-on.
2) Auxiliary switches (S5, S6) turns on softly with zero current.
3) It can partially lower the Vds of mains switches in the left half-bridge prior to turn-on, which helps to further lower the turn-on loss.
4) Its control algorithm is very simple and no sensor or feedback is required.
5) Conduction loss is distributed between the auxiliary and main switches for part of a resonant cycle, which helps to reduce maximum switch temperature.
6) It uses the shared inductor Ls to slow down the body diode turn-off current in the left half-bridge and therefore reduces the diode reverse recovery effects and improves EMI performance.

Figure 9:
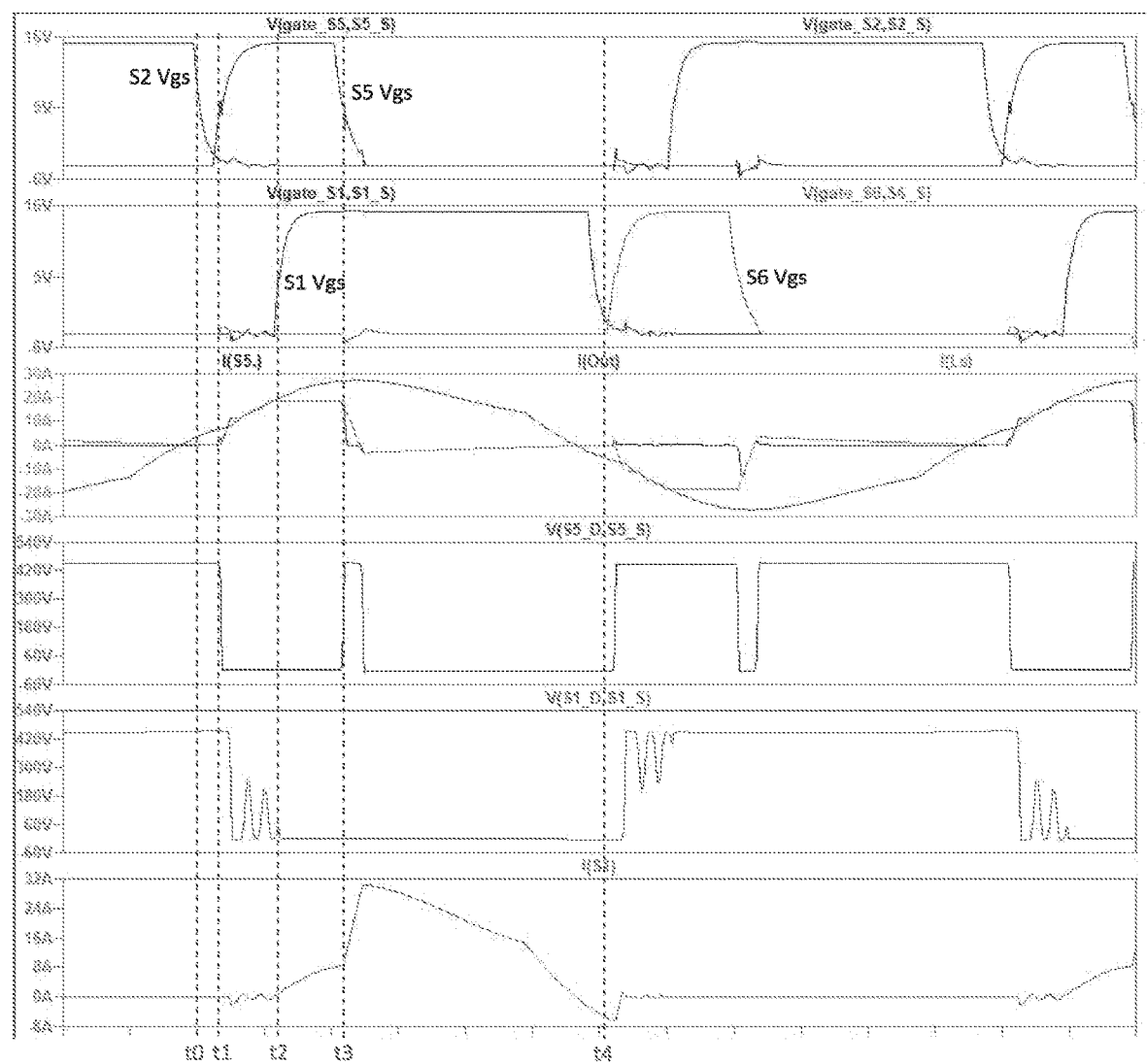
FIG. 9 shows line graphs of voltage and current waveforms observed during operation of the circuit.

The unique characteristics of this circuit 201 are due to a sinusoidal load current I(out). FIG. 9 shows key operating waveforms for circuit A with control method A, with Vdc=450V, and Ls=6 uH).

Before t0, S1, S5 and S6 are off, and S2 is on. Output current I(out), which is flowing towards resonant tank, can flow through both S2 (from S to D) and its body diode D2. The current distribution depends on the on-state resistance of MOSFET and D2 forward voltage drop.

At t0, S2 turns off. I(out), which is still flowing towards the resonant tank and increasing, is forced to flow through D2, which causes voltage at node M to be one diode drop below ground. As a result, Vds of S1 is at Vdc+Vd. S1 should not be turned on now as this will result in a hard turn-on for S1 and an aggressive diode reverse recovery for D2, leading to excessive turn-on loss for S1 and EMI problems.

Further explanation requires understanding of a relationship between the voltage and current of an inductor, which is described as:

$$v = L \times \frac{di}{dt}$$

Figure 10:
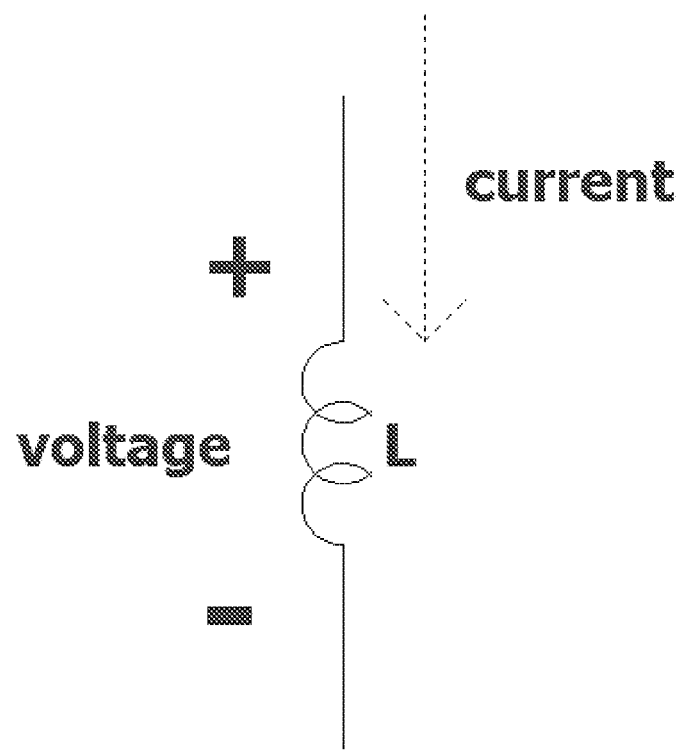
FIG. 10 shows an inductor.

The reference directions for the inductor voltage and current are shown in FIG. 10.

This equation states the rate of change for an inductor current is determined by v/L. For example, a positive inductor voltage causes its current to increase at a rate of v/L and the inductor current stays unchanged if its voltage is zero. This equation also implies that the inductor current cannot change instantaneously as it would result in an infinite inductor voltage, which is not possible.

At t1, S5 turns on. Its current I(S5), which is also the inductor current I(Ls), starts to ramp up linearly from zero at a constant rate of (Vdc+Vd)/Ls. Hence S5 turns on with zero current. The ramp rate is due to the fact that the left terminal voltage of Ls, V(K), is at Vdc when S5 is on and the right terminal voltage of Ls, V(M), is at −Vd due to D2 conducting. As a result, voltage of Ls, V(K,M), is Vdc+Vd and I(Ls) ramps up at (Vdc+Vd)/Ls according to equation.

Figure 11:
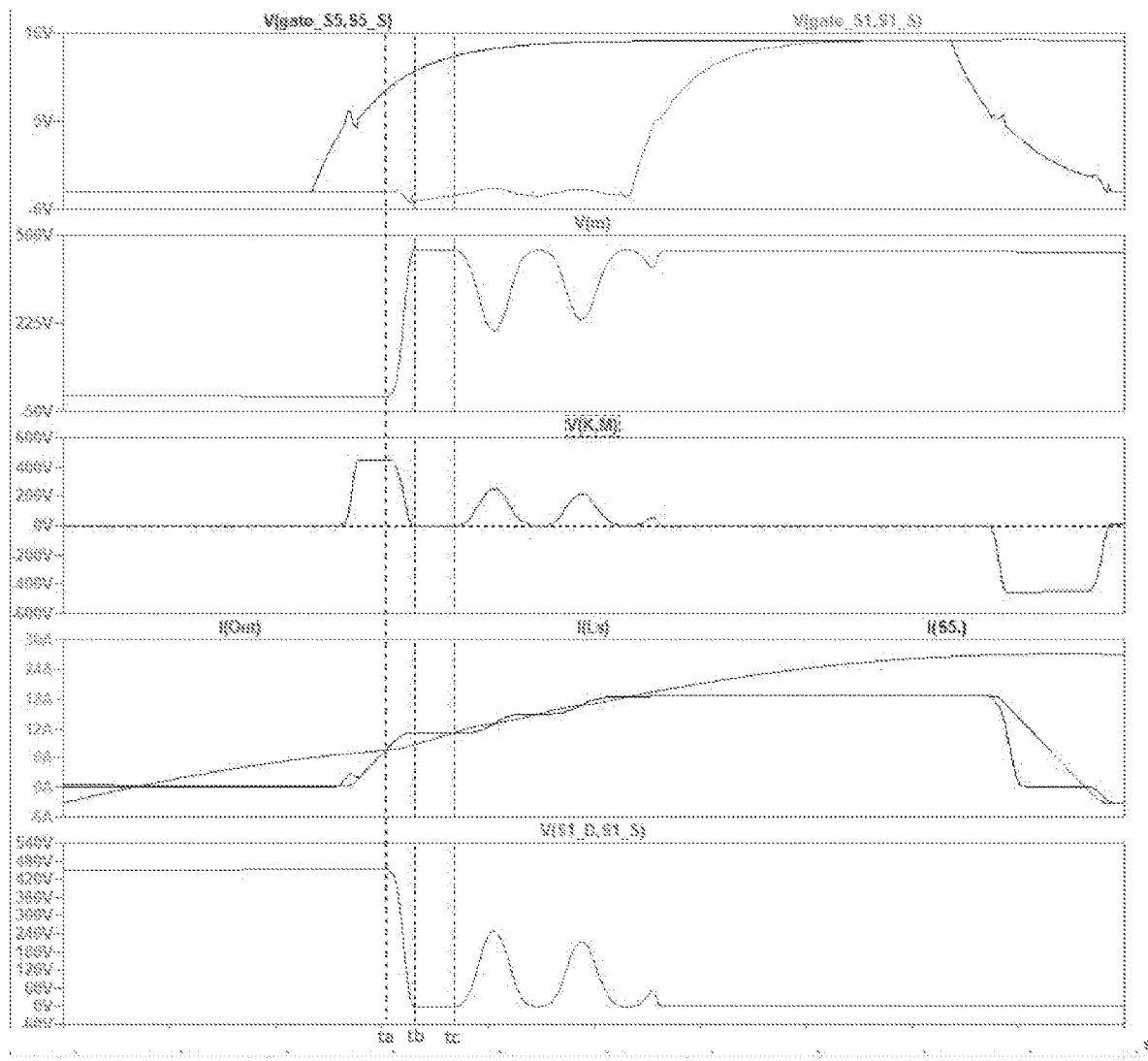
FIG. 11 shows magnified line graphs of voltage and current waveforms observed during operation of the circuit.

What happens between t1 and t2 explains the working of this embodiment and is enlarged and reproduced in FIG. 11, which shows a zoomed in view of FIG. 9.

At ta (FIG. 11), I(Ls)=I(out) and D2 current becomes zero and turns off softly due to the fact that D2 current decrease rate is controlled by and identical to I(Ls) increase rate, which is much slower than an abrupt diode turn-off in an hard turn-on scenario. Such a slow diode turn-off reduces the peak reverse recovery current of D2 to a small value and significantly improves the EMI performance.

The small reverse recovery current of D2 flows in the positive direction of I(S2) and through a loop consisting of D2, Cbus, S5 and Ls. As a result, it adds to the existing I(Ls), causing I(Ls) to increase beyond I(out) after ta (FIG. 11).

After ta, the inductor voltage, V(K,M), starts to decrease from Vdc+Vd towards 0V and reaches 0V at tb, which causes I(Ls) to stay constant after tb. Operation between ta and tb is explained as following. During this interval, inductor voltage decreases because the right inductor terminal voltage, V(M), is driven towards Vdc by the additional inductor current (due to diode reverse recovery) while voltage at the left terminal of the inductor, V(K), is fixed at Vdc (due to S5 turned on). V(M) is driven towards Vdc because the additional inductor current needs to flow through D1. When D1 conducts, V(M) is pulled towards Vdc. The slow rise of V(m) is due to charging of S2 Coss towards Vdc and discharging of S1 Coss towards to 0V.

Between tb and tc, the inductor current is still higher than output current and D1 is conducting. Theoretically, S1 could be turned on during this interval with zero voltage. However, practically, this zero voltage interval maybe too short for a MOSFET to turn on especially when the output current is rising fast. This point is illustrated in FIG. 11 by comparing this interval to the Vgs of S1 during its turn-on. As can be seen, the window between tb and tc is much shorter than the turn-on time of S1. So even if a detection circuit can sense when tb occurs, the MOSFET may still not be able to fully turn-on with zero voltage. In addition, the window maybe heavily dependent on how fast the output current is rising at ta, which is difficult to predict theoretically and may change significantly with operating condition. In conclusion, it is difficult to achieve zero voltage turn-on for this type of operation, where the output current is rising fast during MOSFET conduction time.

However, this type of operation provides near zero current turn-on for the main MOSFET (S1 and S2). This is explained by examining what happens after tc in FIG. 11.

After tc, the output current I(out) catches up and exceeds the constant inductor current. The only path for the additional output current is through D2 because S1 is still off. However, before the extra output current can flow through D2, V(M) needs to be pulled towards ground to forward bias D2. However, this cannot occur easily because 1) pulling V(M) towards ground requires discharging of Coss of S2 and charging Coss of S1, which takes time and energy. 2) as V(M) starts to decreases from Vdc, the inductor voltage starts to increase and subsequently causes I(Ls) to increase towards I(out) again. This reduces the difference between I(Ls) and I(out), which slows down the charging of S1 Coss, discharging of S2 Coss and V(m) moving towards ground. 3) once I(Ls) surpasses I(out) again, the extra I(Ls) current reverses this process by starting to charge Coss of S2 and discharge Coss of S1, moving V(m) towards Vdc. This mechanism behaves like a negative feedback, causing I(Ls) to track I(out) automatically and preventing V(m) from dropping to ground completely.

Due to this mechanism, the difference between I(Ls) and I(out) is automatically kept very small as long as I(out) is rising. Such a condition creates a very large window for S1 to be turned on with near zero current, and potentially eliminates the need for any sensing or control circuit. This large zero current window is illustrated in FIG. 9 between t1 and t2. In theory, the window can be extended approximately to t3 (FIG. 9) if S1 does not turn on before t3.

Due to the negative feedback mechanism, voltage of S1 at turn-on can also be very low, which helps to reduce its turn-on loss.

Back to FIG. 9, MOSFET S1 turns on at t2 with near zero current. Between t2 and t3, S5 and S1 are both on, and the voltage across Ls is zero, which causes its current to stay largely unchanged. Since the output current is still rising during this period, the extra output current starts to flow through S1. S5 and S1 now share the output current during this interval, which helps to distribute the conduction losses.

At t3, S5 turns off. The positive inductor current is forced to flow through D6 and it circulates in a loop comprising Ls, S1, Cbus and D6. This pulls voltage at node K towards −Vd and applies −Vdc−Vd across Ls. This forces I(Ls) to decrease at a negative slope of −(Vdc+Vd)/Ls towards zero.

At t4, main switch S1 turns off with zero voltage due to the fact that S1 current changed direction prior to turn-off and is flowing from S1 drain towards its source. As explained earlier, Vds of S1 is clamped by its body diode during turn-off. This zero voltage turn-off characteristic is due to resonant nature of the circuit in FIG. 8.

This completes a full cycle of operation. Because voltage and current waveforms for S2 and S6 are similar and operate on the same principle, they will not be described here. S2 and S6 also turn on with near zero current and S2 turns off with zero voltage.

Value of Ls is a critical parameter and needs to satisfy two conditions. 1) It needs to be large enough to suppress diode reverse recovery by slowing down the diode turn-off current. 2) It should be small enough to achieve a sufficiently large di/dt for Ls current so that I(Ls) can catch up with the output current, which is a required condition for zero current switching of main MOSFETs in the left half-bridge.

Second Embodiment

This second embodiment will be described with reference to circuit A shown in FIG. 8. This second embodiment is similar to the first embodiment, except this second embodiment uses a control method B instead of control method A. That is, the difference with this second embodiment is that switch components 12 and 34 are turned off (roughly) at the same time, and switch components 14 and 36 are turned off (roughly) at the same time. This difference will now be explained in more detail.

Another way (i.e. control method B) to control the circuit in FIG. 8 is to turn off the auxiliary switch at the same time as the main switch. This means S1 and S5 are turned off at (around) the same time, and S2 and S6 are turned off at (around) the same time.

The second control method is different from the first one in the following ways:
 1. The auxiliary switches can turn on with zero voltage, whereas control method A auxiliary switches turn on with zero current.
 2. This method also allows the output current to be shared between auxiliary and main MOSFETs for a longer period, compared to control method A.

Figure 12:
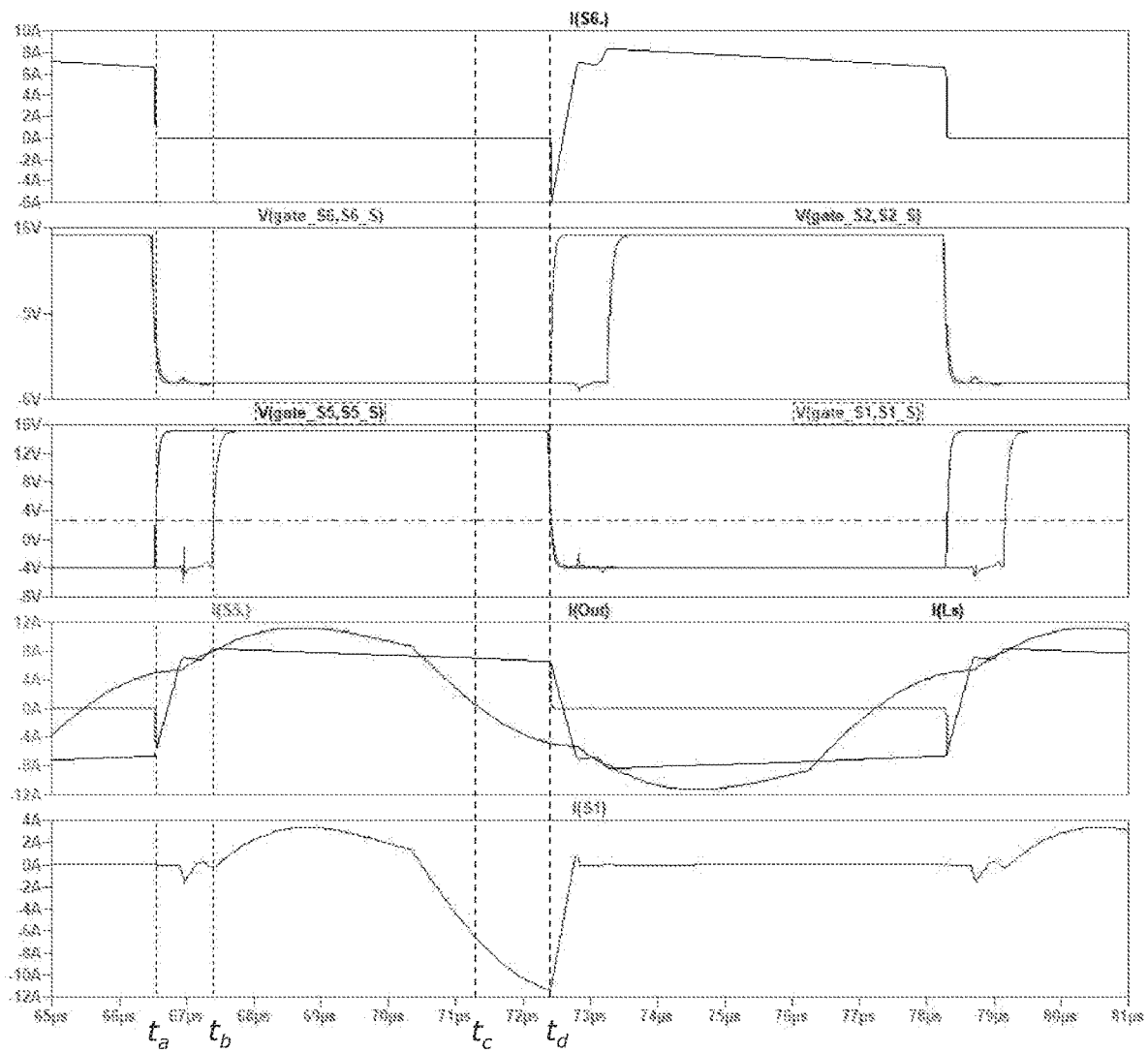
FIG. 12 is another line graph of voltage and current waveforms observed during operation of the circuit.

FIG. 12 illustrates some key operating waveforms for this control method.

Before ta, S2 and S6 are on. Inductor current I(Ls) is flowing in the negative direction towards node K and circulating in a loop comprising Ls, S6 and S2.

At ta, S2 and S6 turn off and auxiliary switch S5 turns on. Turning off S6 forces I(Ls) that is still flowing towards node K to flow through D5. Hence S5 turns on with zero voltage. Now I(Ls) still flows towards node K and circulates in a loop comprising S5, Cbus, D2 and Ls. Ls voltage, V(K,M), is at Vdc+Vd because V(K) is at Vdc and V(M) is at −Vd. This positive inductor voltage will cause I(Ls) to increase at a rate of (Vdc+Vd)/Ls.

After ta, I(Ls), which is the same as I(S5), starts to ramp linearly towards I(out) at a constant slope of (Vdc+Vd)/Ls. When I(Ls)=I(out), D2 turns off softly and a small D2 reverse recovery current causes I(Ls) to become slightly larger than I(out). From here, the negative feedback mechanism discussed earlier causes I(Ls) to track I(out), opening the near zero current turn-on window for main switch S1.

At tb, switch S1 turns on with near zero current. Because now both S5 and S1 are ON, voltage across Ls is zero. I(Ls) in theory should stay unchanged and starts to circulate in a loop comprising Ls, S1 and S5. However, the resistive losses in the loop cause I(Ls) to decrease slightly over time, as shown in FIG. 12, which shows waveforms associated with circuit A with control method B, where auxiliary switch is turned off at the same time as main switch, with Ls=6 uH.

At tc, I(out) changes direction from positive to negative. Between tb and tc, I(out) is shared between S5 and S1, which helps to distribute conduction losses. Compared to the first control method, I(out) is shared between auxiliary and main MOSFETs for much longer, leading to a more even distribution of conduction loss.

After tc, I(out) changes direction and starts to flow towards source of S1. Because I(Ls) is also flowing towards the source of S1, I(out) and I(Ls) now combine in the same direction, causing I(S1) to be larger than I(out) by I(Ls).

At td, S1 and S5 turn off simultaneously. Because I(Ls) still has to flow in the positive direction, it shifts from S5 to body diode of S6, opening the window for S6 zero voltage turn-on. S6 turns on shortly with zero voltage.

After td, I(Ls) circulates in a loop comprising D1, Cbus, S6/D6 and Ls, and a negative voltage (−Vdc−Vd) is applied across Ls, causing its current to ramp down at a constant rate of −(Vdc+Vd)/Ls until it catches up with a negative I(out), when D1 turns off softly due to the ramping of inductor current. The reverse recovery current of D1 flows in the same direction as I(S1) and causes I(Ls) to decrease slightly further and the negative feedback mechanism kicks in, opening the window for S2 zero current turn-on.

Third Embodiment

This third embodiment is similar to the second embodiment, except this third embodiment uses a circuit B instead of circuit A. That is, the difference with this third embodiment is that a single capacitor placed in series with a single inductor (as the inductive component 32). This difference will now be explained in more detail.

This third embodiment will be described with reference to circuit B shown in FIG. 13, which comprises the following features:
  circuit 201, which corresponds to circuit 1
  bridge switching circuit 202, which corresponds to bridge switching circuit 2
  switching sub-circuit 204 (could be referred to as "auxiliary circuit"), which corresponds to switching sub-circuit 4
  left half-bridge 206, which corresponds to half-bridge sub-circuit 6
  right half-bridge 208, which corresponds to half-bridge sub-circuit 8
  MOSFETS 212 ("(main switch) S1"), 214 ("(main switch) S2"), 216 ("S3"), 218 ("S4"), 234 ("(auxiliary switch) S5"), 236 ("(auxiliary switch) S6"), which respectively correspond to switching components 12, 14, 16, 18, 34, 36
  diodes 212a ("(diode) D1"), 214a ("(diode) D2"), which respectively correspond to diodes 12a, 14a
  resonant tank 220, which corresponds to load 20
  nodes 226 ("(node) M"), 228, 230, 238 ("(node) K"), which respectively correspond to nodes 26, 28, 30, 38
  Inductor ("Ls") 232, which corresponds to inductive component 32
  "I(Out)" current 240, which corresponds to output current 40
  "I(Ls)" current 242, which corresponds to output current 42
  "I(D2)" current 248, which corresponds to current 48
  "I(D1)" current 252, which corresponds to current 52

Figure 13:
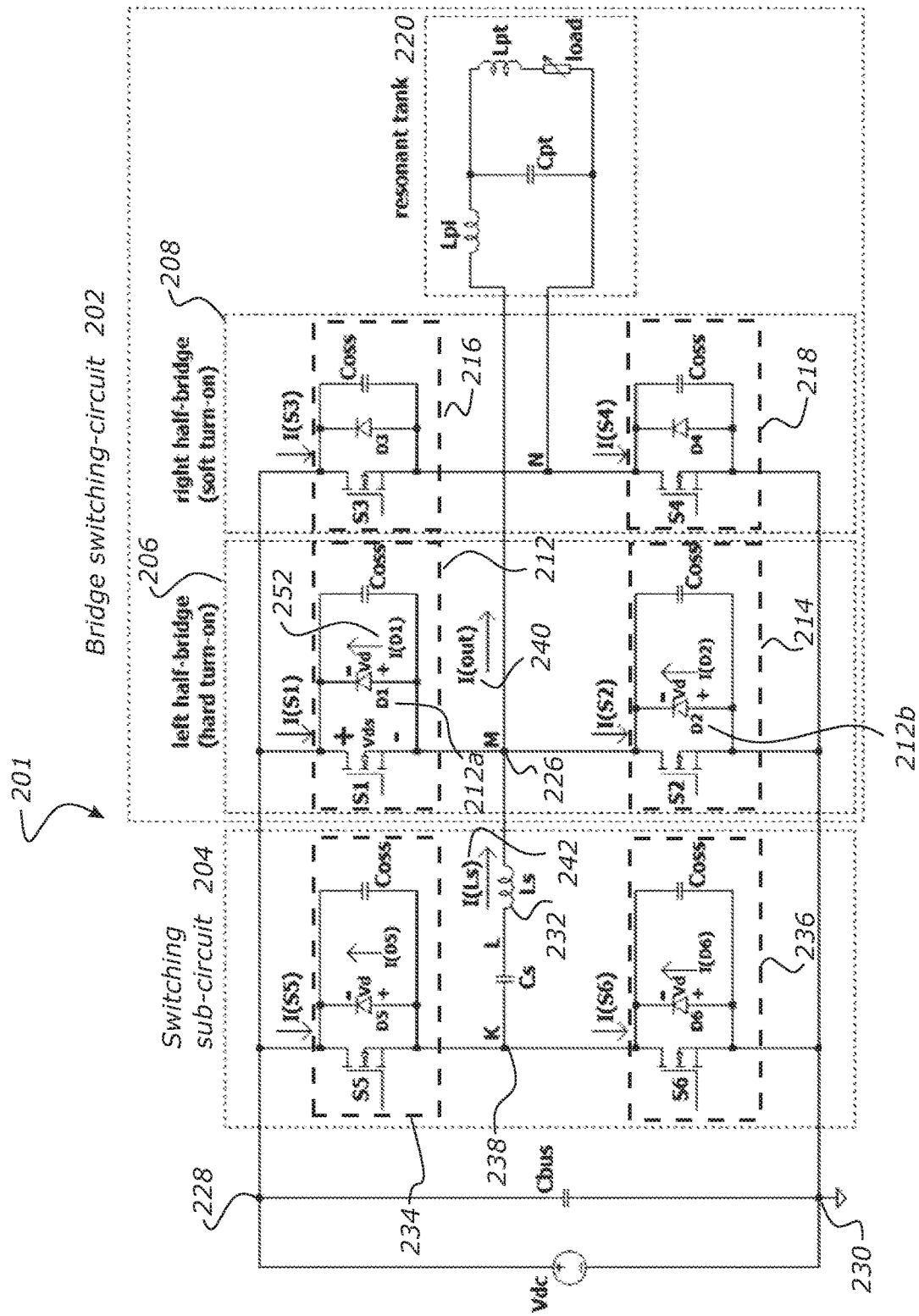
FIG. 13 is an electronic circuit showing another specific form of soft switching.

Compared to circuit A, circuit B adds a capacitor in series with the shared inductor Ls, as shown in FIG. 13.

One or more main advantages are:
1) zero voltage turn-on for auxiliary MOSFETs
2) zero current turn-on for main MOSFETs
3) Compared to the second embodiment (circuit A with control method B), this circuit B can reduce the high turn-off current of main switches.
4) Compared to circuit A, it can lessen turn-off current of auxiliary switches.
5) Allows output current to be shared between main and auxiliary MOSFETs.

This circuit B uses control method B; S1 and S5 turn off simultaneously and S2 and S6 turn off simultaneously. Inductor Ls and capacitor Cs form a series resonant network, causing inductor current I(Ls) to follow a sinusoidal trajectory. The resonant frequency fs of Ls and Cs is selected to be below the resonant frequency of the system.

$$f_s = \frac{1}{2\pi\sqrt{Ls \times Cs}}$$

Figure 14:
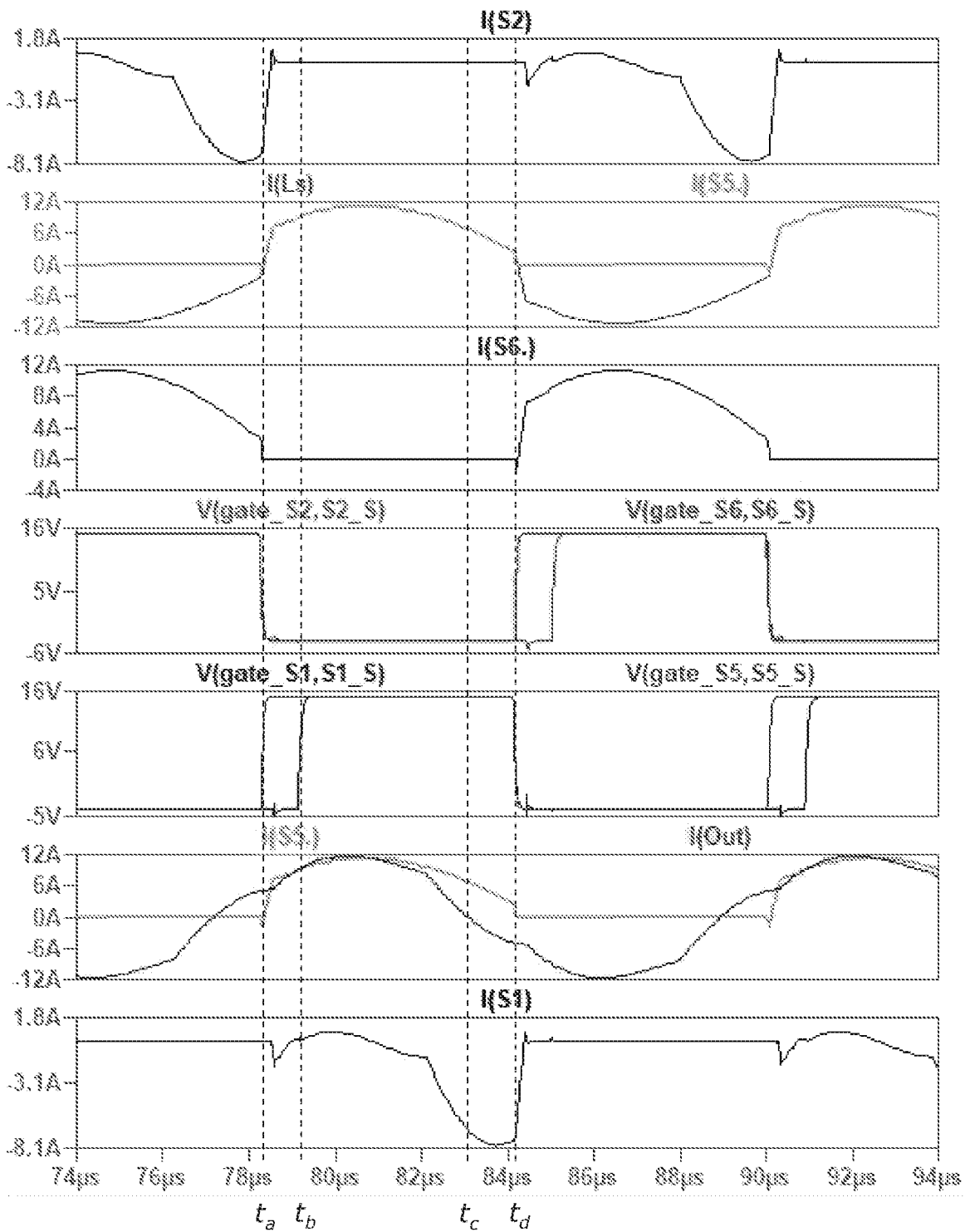
FIG. 14 shows lines graph of voltage and current waveforms observed during operation of the circuit.
Figure 15:
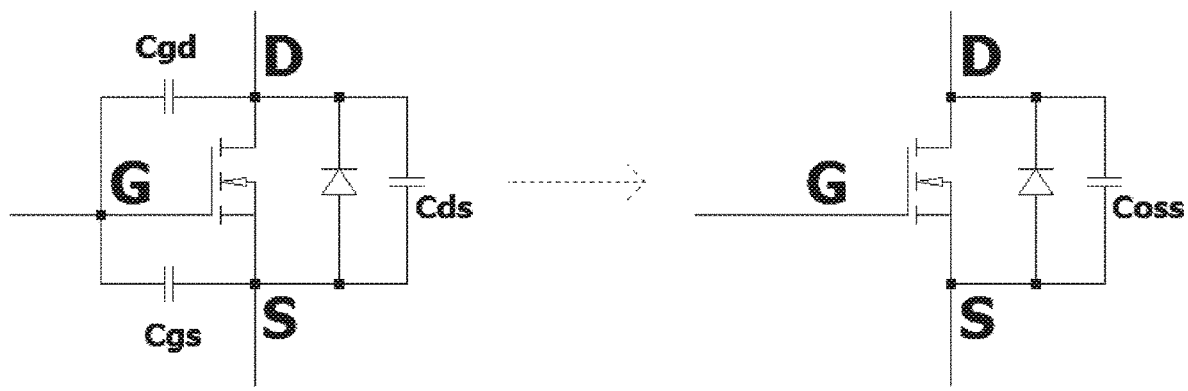
FIG. 15 shows a MOSFET switch.
Figure 16:
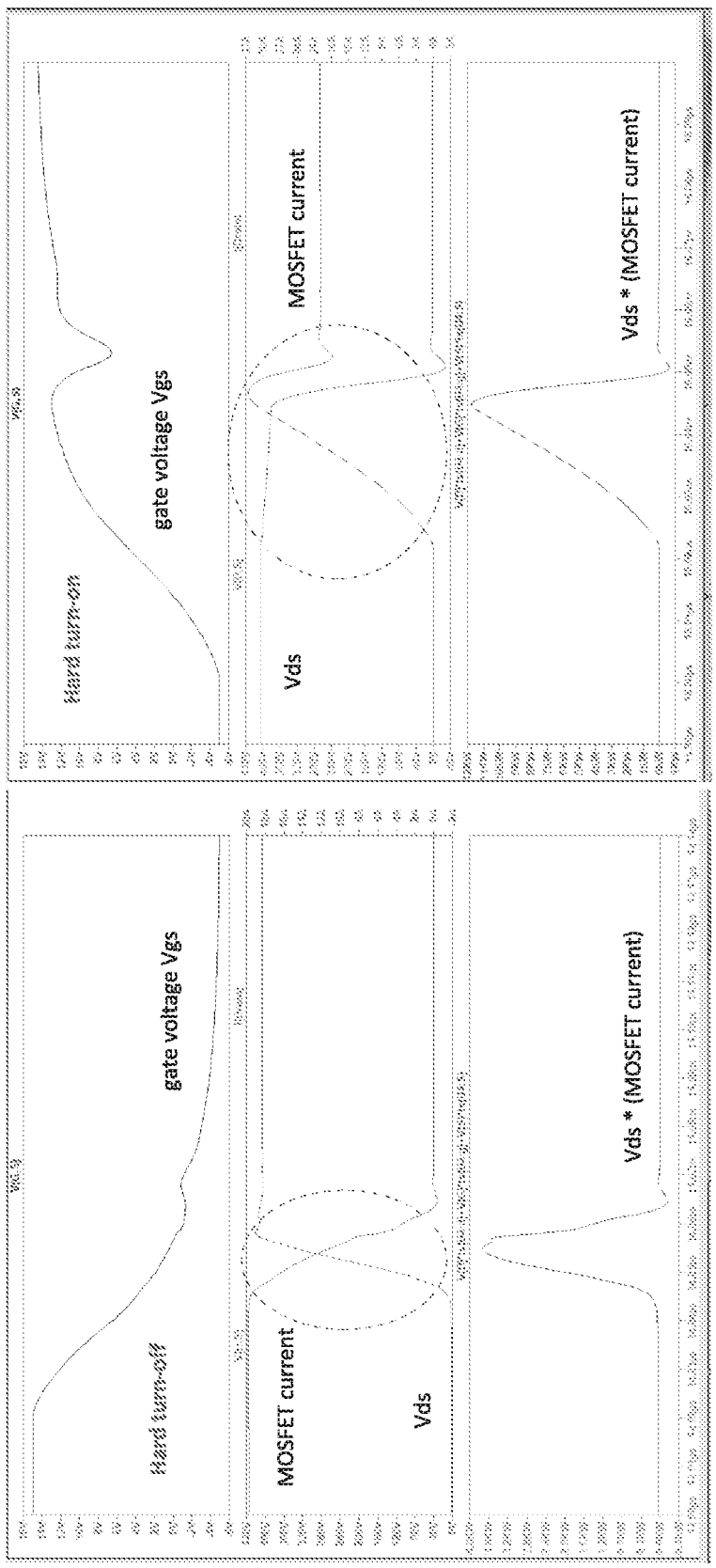
FIG. 16 shows lines graph of voltage and current waveforms observed when a diode is in reverse recovery.
Figures 17, 18:
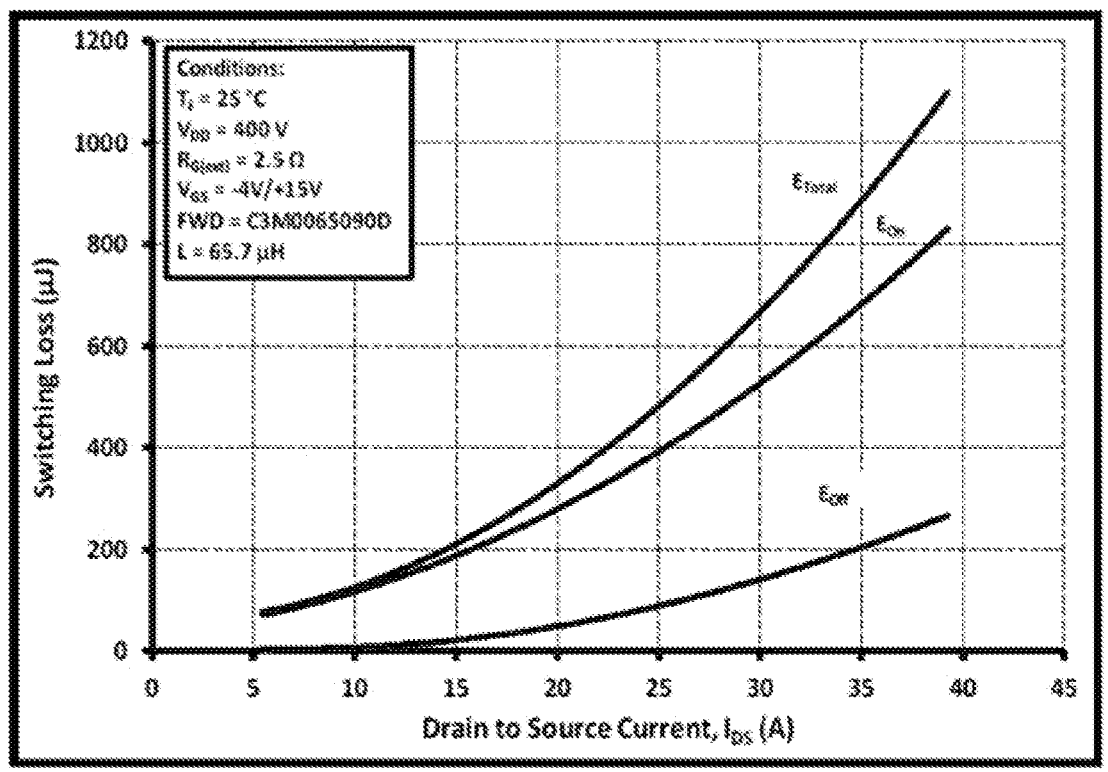
FIG. 17 is a line graph showing switching loss of a MOSFET switch.
FIG. 18 is a diode in reverse recovery.
Figure 19:
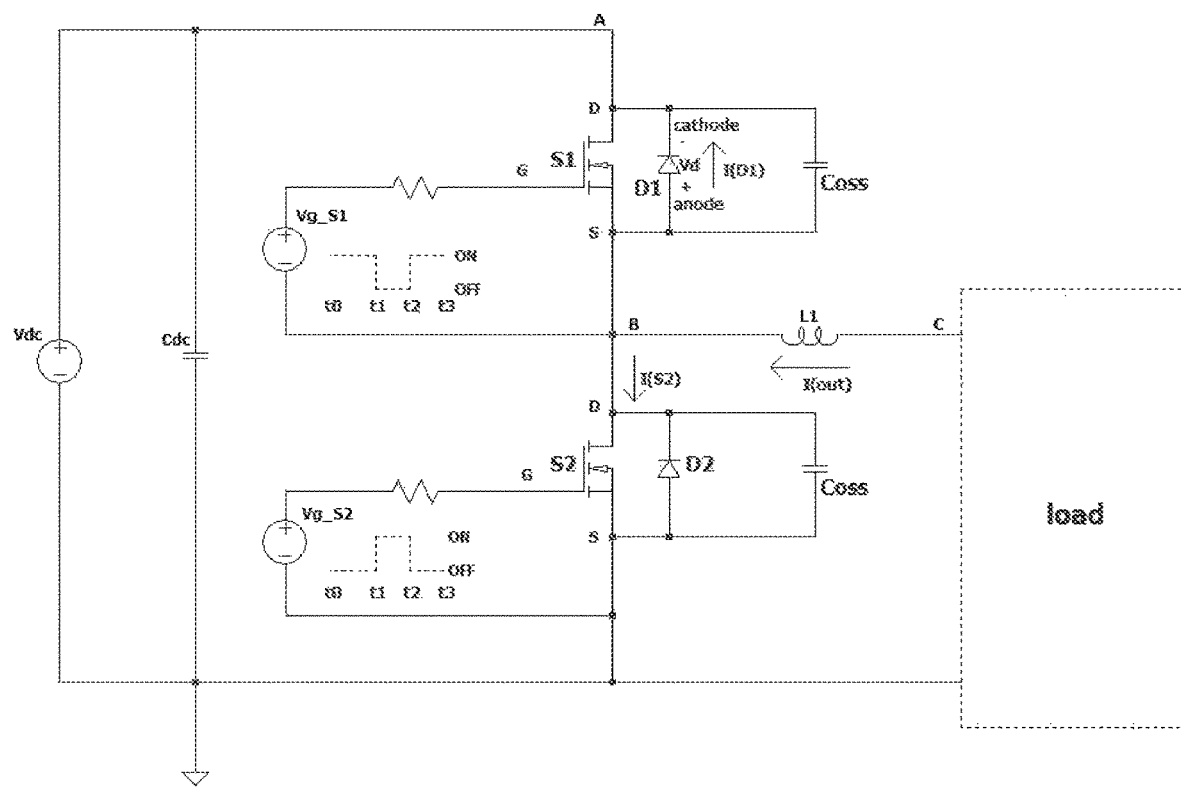
FIG. 19 is a circuit showing hard switching.
Figure 20:
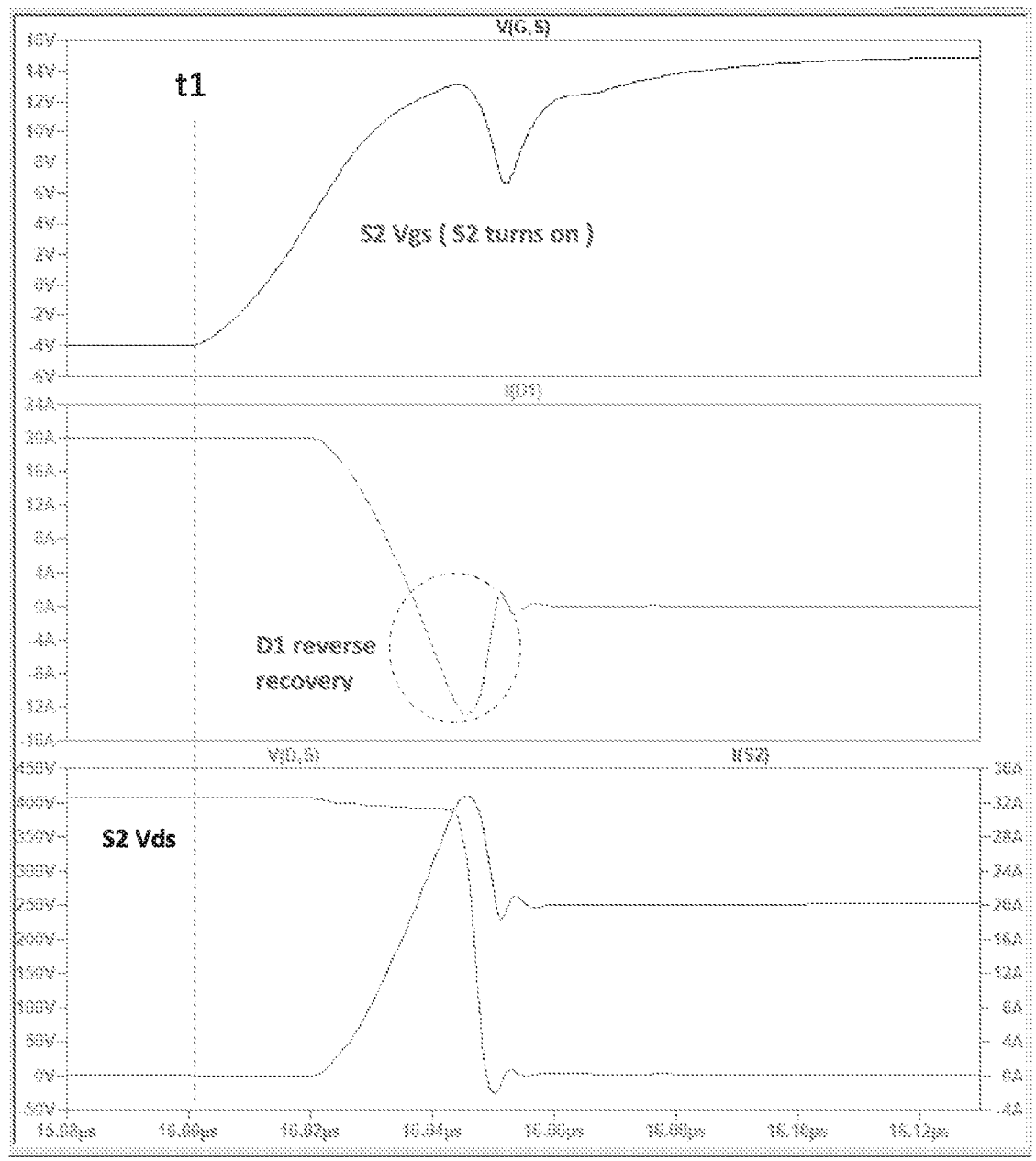
FIG. 20 is a line graph showing voltage and current waveforms observed during hard switching.
Figure 21:
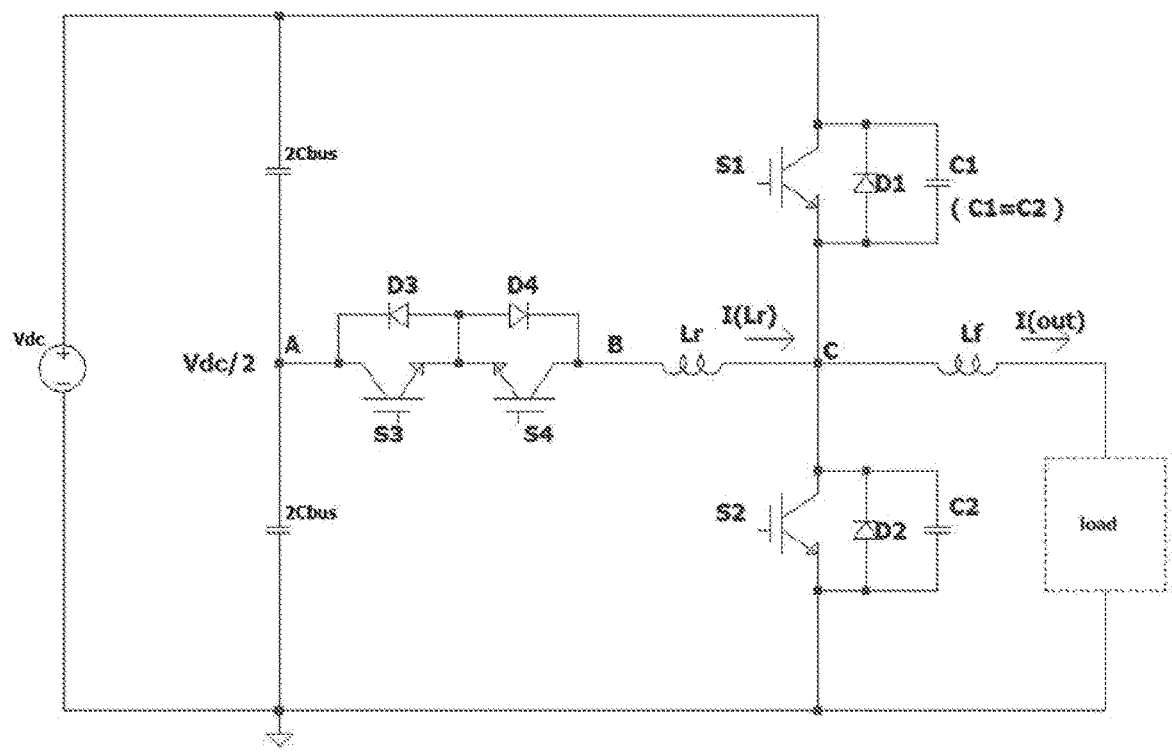
FIG. 21 is a circuit showing soft switching.
Figure 22:
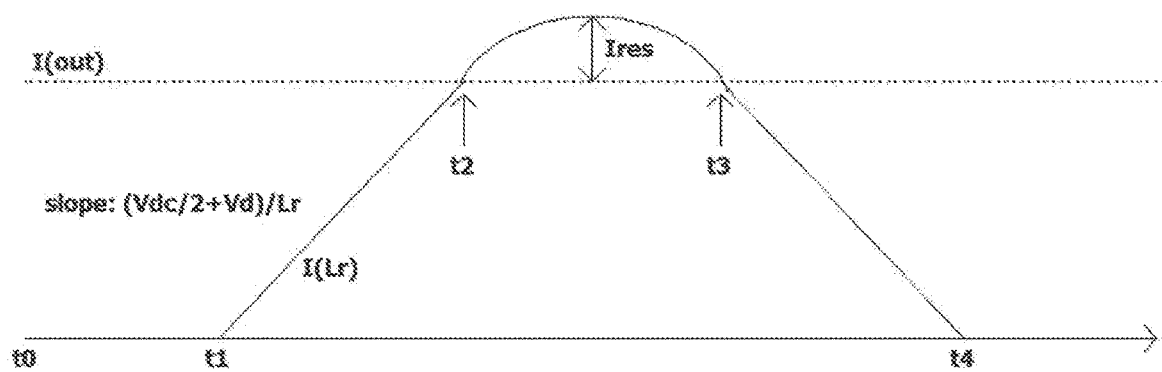
FIG. 22 is a line graph showing a form of soft switching.

FIG. 14 shows waveforms of an example design, where fs=63 kHz, Ls=6 uH, Cs=1 uF and system resonant frequency is 85 kHz. All the parameters of this design are deliberately chosen to be identical to those of circuit A with control method B for a direct comparison. Cs is the only addition. The purpose is to illustrate its effectiveness at reducing turn-off currents for both auxiliary and main MOSFETs.

As shown in FIG. 14, because fs is chosen to be lower than system resonant frequency, I(Ls), which is also I(S5) when S5 is on, drops slower than the output current I(out). The sinusoidal current shape of I(S5) allows S5 to turn off with a much smaller positive current, thus achieving zero voltage turn-on for auxiliary switches while minimizing turn-off current for auxiliary and main MOSFETs for lower turn-off losses. In FIG. 14, S5 turn-off current is approximately 2 A, which is significantly lower than the S5 turn-off current of 7 A in FIG. 12 of the second embodiment (circuit A with control method B).

Circuit operation is similar to that of the second embodiment (circuit A+ control method B), and is briefly explained below.

At ta, S2 and S6 turn off, and S5 turns on with zero voltage due to a small negative current in Ls.

After ta and before I(Ls)=I(out), I(Ls), which is also I(S5), starts ramping up linearly at a rate of (Vdc+Vd)/Ls due to S5 on and D2 conducting. When I(Ls)=I(out), diode D1 turns off softly and its small reverse recovery c"urrent causes I(Ls) to exceed I(out) slightly. I(Ls) start tracking I(out) due to the negative feedback mechanism discussed earlier.

At tb, main switch S1 turns on with zero current. Because S1 and S5 are now both on, the series resonant tank formed by Cs and Ls is effectively short circuited, which allows I(Ls) to start following a sinusoidal trajectory. In this example, the inductor current tracks the shape of I(out) closely and there is hardly any current through main MOSFET S1 for a large part of its conduction period. I(S1) starts to increase in the negative direction when I(out) falls faster than I(S5).

At tc, I(out) changes direction. I(out) and I(Ls) now add up and both flow towards source of S1. However, because I(S5) has already reduced considerably at tc, I(S1) is not significantly larger than I(out).

At td, S1 and S5 turn off simultaneously and a positive I(Ls) flows through D6, opening the zero voltage turn-on window for S6. S6 turns on with zero voltage shortly after.

Alternative Scenarios

Up until now, the detailed description has described a switching sub-circuit 4 that achieves soft switch on of switch components 12, 14, 16, 18 in a scenario where the absolute value of the current 40 through the load 20 is increasing. However, it is also possible to achieve a soft switch on of switch components in alternative scenarios in which the absolute value of current 40 through the load 20 may not necessarily be increasing. Such soft switch on of switch components 12, 14, 16, 18 in these alternative scenarios will now be discussed.

Soft Switching when Absolute Value of Current is Decreasing

It is possible to achieve soft switch on of switch components 12, 14, when the absolute value of current 40 through the load 20 is decreasing, (i.e. when the current 40 through the load is decreasing while positive, or increasing while negative). This is achieved by operating the switching sub-circuit 4 to induce a (near) zero voltage switch condition across switch component 12, which will be discussed with reference to FIGS. 2A-2C, FIG. 23, and FIGS. 25A-D. Switching sub-circuit 4 can also be operated to induce a (near) zero voltage switch condition across switch component 14, which will be discussed later with reference to FIGS. 5A-5C.

Figure 25A:
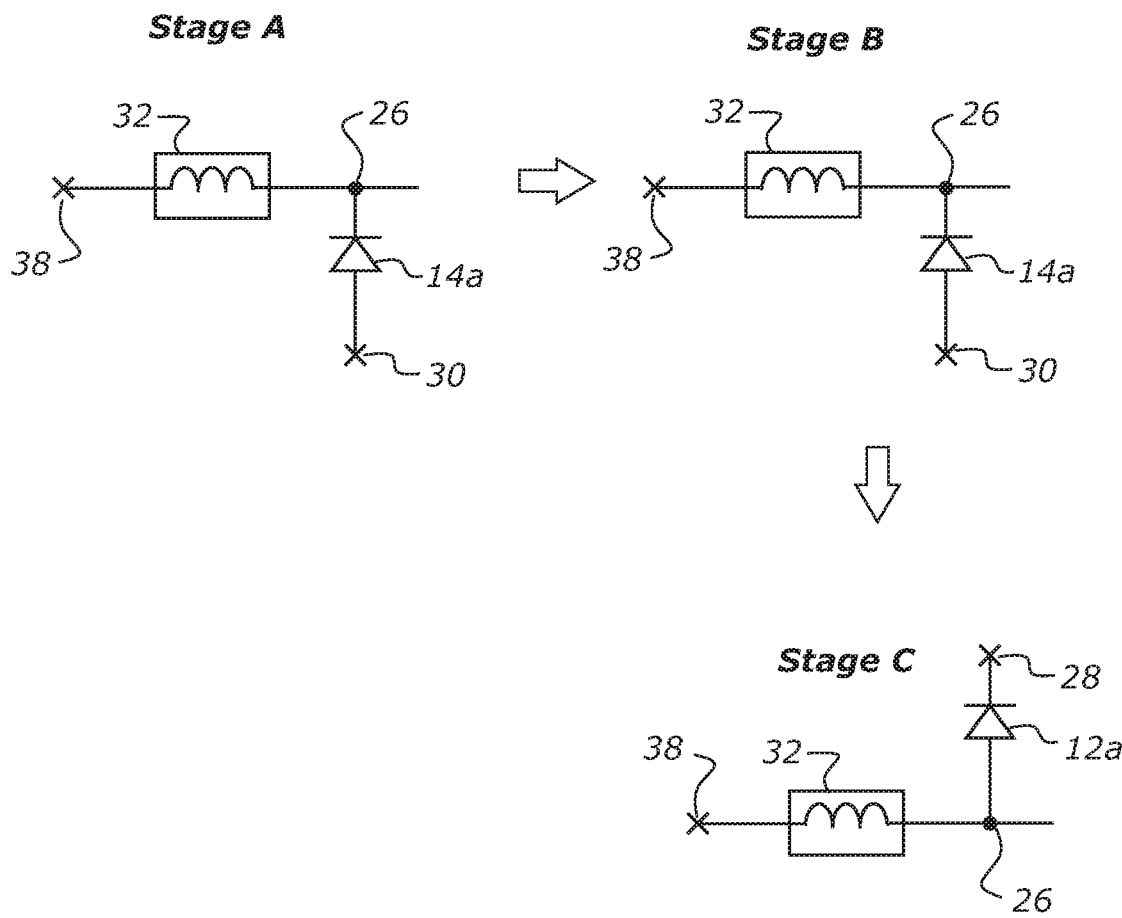
FIGS. 25A-D is a line graph showing changes in circuit operation to enable soft switching.
Figure 25B:
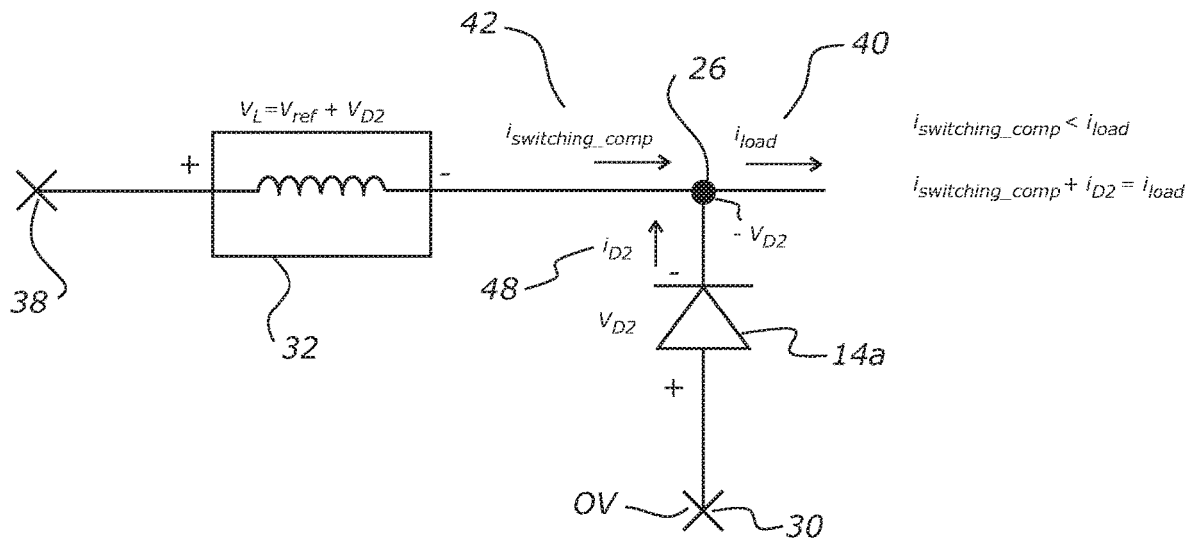
Figure 25C:
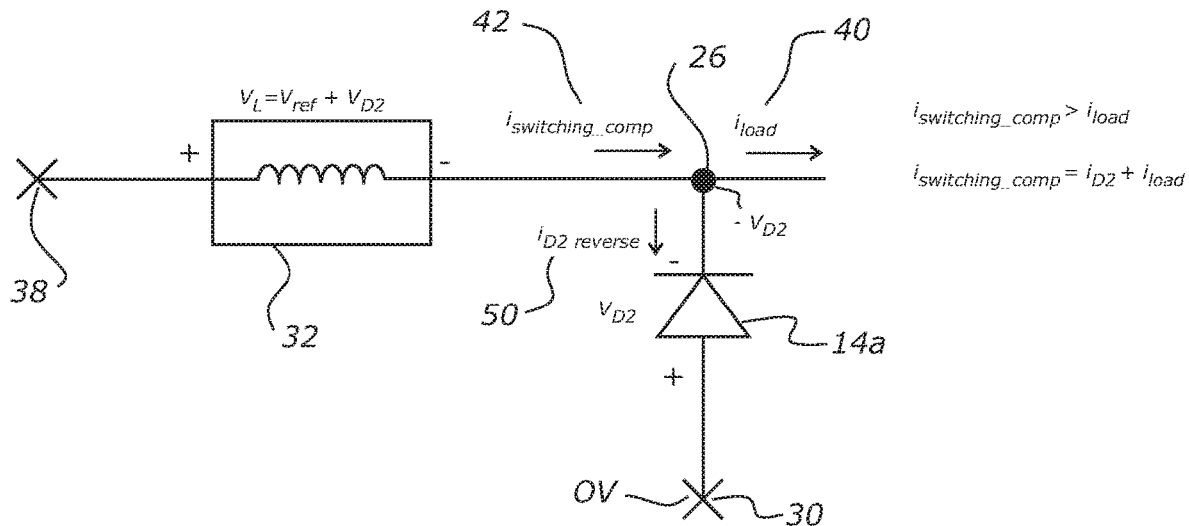
Figure 25D:
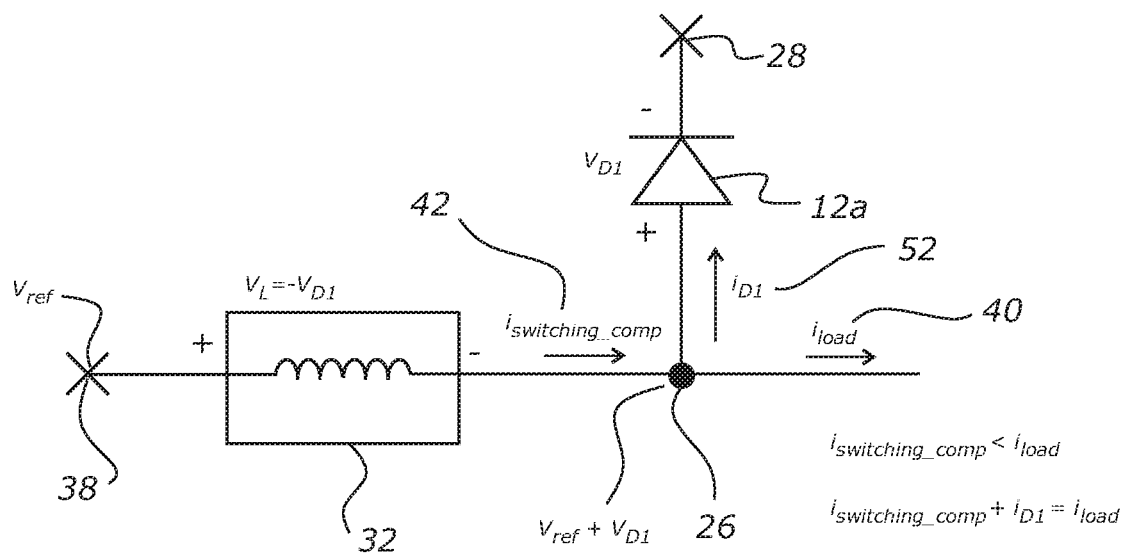

FIGS. 2A-2C show the order in which switching components 34 and 12 are switched on—that is, if all switching components are off (see FIG. 2A), switching component 34 is switched on first (see FIG. 2B) so that switching component 12 can "softly" switch on (see FIG. 2C). FIG. 25A shows a flow diagram of how the switching sub-circuit 4 interacts with the bridge switching circuit 2 when switching component 34 is switched on to create the zero voltage condition for switching component 12 to turn on "softly", from stage A through to stage C. FIGS. 25B-25D expand on each of stages A-C respectively.

At FIG. 2A, all switch components 12, 14, 16, 18, 34 and 36 are off. The current output 42 is at zero, i.e. $i_{switching\_comp}$=0, and in this situation the current output 40 is positive (flowing from left to right) and decreasing in a sinusoidal manner. This means the current output 40 is greater than the current output 42, i.e. $i_{load} > i_{switching\_comp}$. The total current entering node 26 is equal to the total current leaving node 26 according to Kirchoff's current law. For node 26 to operate in accordance with Kirchoff's current law, the positive and decreasing current output 40 places diode 14a into a forward-bias condition, such that current can pass through diode 14a from grounded node 30 to node 26, with current passing through diode 14a matching the absolute value and direction of the current output 40. That is, the current passing through diode 14a is also positive and decreasing such that the current passing through diode 14a corresponds to the current output 40. The forward-bias conduction of diode 14a means that there a voltage drop of $V_{D2}$ such that the voltage at node 26 is $-V_{D2}$. Preferably, the voltage drop across diode 14a should be negligible such that the voltage at node 26 is at substantially zero volts (i.e. $-V_{D2} \approx 0$).

Figure 23:
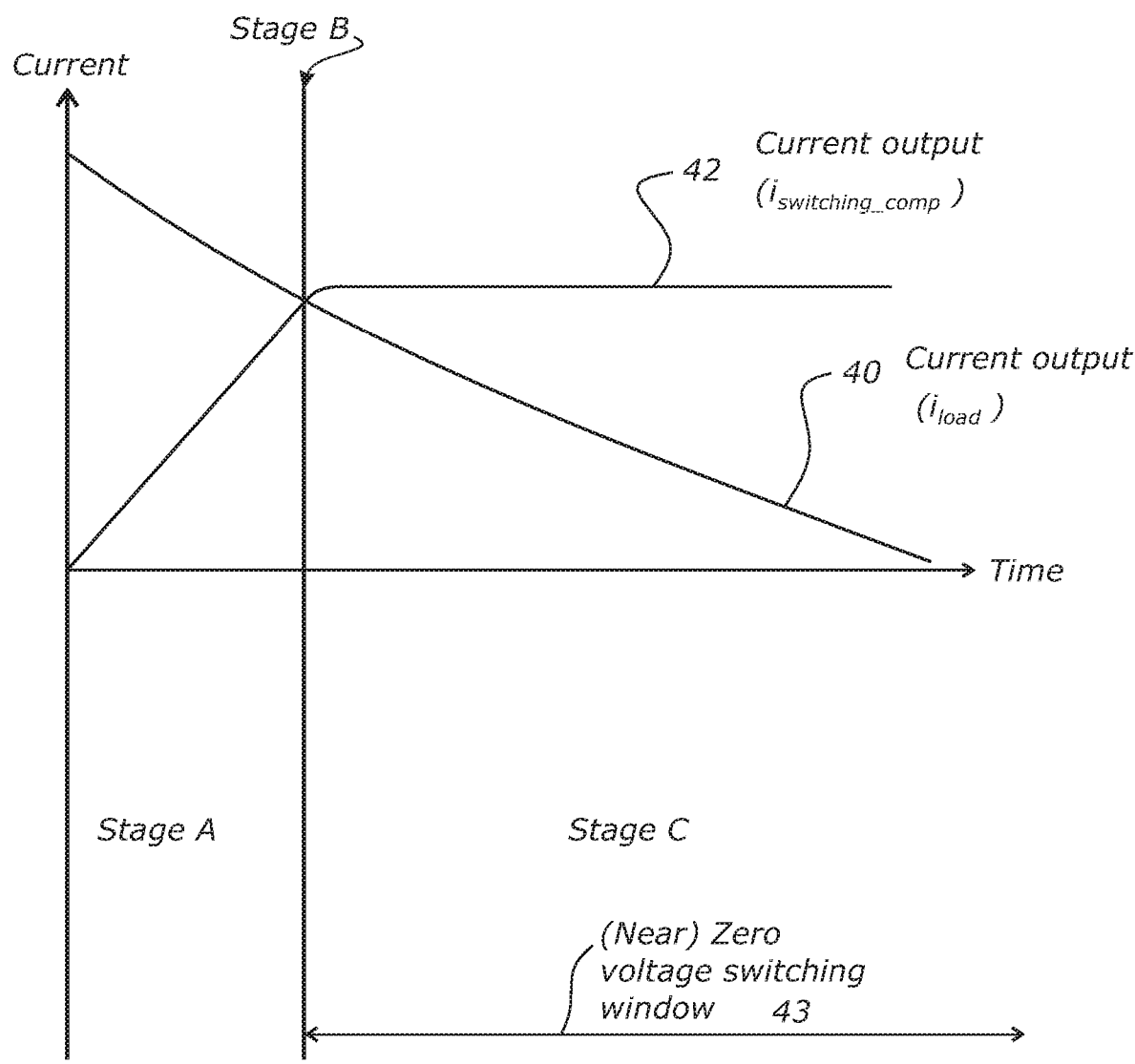
FIG. 23 is a line graph showing another form of soft switching.

Stage A as shown in FIGS. 25A and 25B describes what happens once switch component 34 is switched on as shown in FIG. 2B. The switching on of switch component 34 allows conduction of current from node 28 through switch component 34 to node 38, and conduction of current from node 38 through inductive component 32 to node 26. As the voltage drop across switch component 34 is zero and the voltage at node 28 is at the reference voltage $V_{ref}$, the voltage at the node 38 is also at the reference voltage $V_{ref}$. As already established, the voltage at node 26 is $-V_{D1}$. This means that there is a (non-zero) voltage difference of $V_{ref}+V_{D2}$ applied across the inductive component 32. The (non-zero) voltage difference applied across the inductive component 32 induces a (linear) increase in current through the switch component 34 as shown in FIG. 23. Referring to FIG. 4B, while the current 42 through the inductive component 32 increases (linearly), the current 48 through the diode 14a correspondingly decreases (linearly), and as current output 42 gets closer to the current output 40, the current 48 through the diode 14a approaches zero and turns off softly due to inductor 32, which helps to minimize diode reverse recovery energy by slowing down the diode turn off di/dt.

Stage B as shown in FIGS. 25A and 25C describes what happens after Stage A, once the current output 42 "catches up" to the current output 40. When current output 42 eventually "catches up" to the current output 40, the current 48 through diode 14a reaches zero and the diode 14a switches off, stopping forward-bias conduction of the diode 14a. The shutting off of the diode 14a induces a reverse recovery current 50 in which current momentarily conducts current from node 26 through to ground node 30. The reverse recovery current through diode 14a is compensated by an increase in current through the inductive component 32 so that total current entering node 26 is equal to the total current leaving node 26, in accordance with Kirchoff's current law. The increase in current through the inductive component 32 means the current output 42 of the switching sub-circuit 4 "overtakes" the current output 40 so that the current output 42 is more positive than the current output 40.

Stage C as shown in FIGS. 25A and 25D describes what happens after Stage B, once the current output 42 "overtakes" the decreasing current output 40, and the (near) zero voltage switch on window first opens. At this point, diode 12a is placed into forward-bias condition such that the current difference between currents 42 and 40 is conducted through diode 12a to node 28 so that node 26 operates in accordance with Kirchoff's current law. The conduction of current through diode 12a from node 26 to node 28 means that there is a voltage drop of $V_{D1}$, which means that the voltage at node 26 now increases from $-V_{D2}$ to $V_{ref}+V_{D1}$. The increase in voltage at node 26 to $V_{ref}+V_{D1}$ means that the voltage drop across inductive component decreases from $V_{ref}+V_{D2}$ to $-V_{D1}$ which causes the current 42 through the inductive component 32 to "level" off and "flatten", thus producing a substantially constant current 42 through the inductive component 32 as shown in FIG. 23. At this point, the voltage drop across switching component 12 is $-V_{D1}$, which is a (near) zero voltage drop, since the voltage at node 28 is $V_{ref}$ and the voltage at node 26 is $V_{ref}+V_{D1}$. This provides a (near) zero voltage condition 43 across switching component 12, enabling soft switching of switching component 12. As current output 40 continues to decreases further as seen in FIG. 23, the conduction current through diode 12a increases towards current 42. In the example shown in FIG. 23, the (near) zero voltage switching window 43 for switching component 12 (that enables soft switching of switching component 12) remains open as long as the current 42 through the inductive component 32 remains more positive than the current 40 though the load 20.

A skilled person would recognise that the same principle applies when "soft" switch on of switching component 14 is desired in a scenario in which current 40 through the load 20 is negative (i.e. current 40 through the load 20 flows from right to left in FIG. 5A) and increases in a sinusoidal manner so that absolute value of the current 40 decreases over time. Referring to, FIG. 5A, when switch components 12, 14, 16, 18, 34 and 36 are off, and current output 42 is at zero, i.e. $i_{switching\_comp}$=0, the switching component 36 can be switched on first (see FIG. 5B) to create a (near) zero voltage condition applied across switching component 14, which allows switching component 14 to be "softly" switched on (see FIG. 5C).

Soft Switching when Current is Constant

It is possible to achieve soft switch on of switch components 12, 14, when the absolute value of (positive or negative) current 40 through the load 20 is substantially constant. This is achieved by operating the switching sub-circuit 4 to (simultaneously) induce a (near) zero voltage switch condition across switch component 12 and a (near) zero current switch condition through switch component 12, which will be discussed with reference to FIGS. 2A-2C, FIG. 24, and FIGS. 25A-D. Switching sub-circuit 4 can also be operated to (simultaneously) induce a (near) zero voltage switch condition across switch component 14 and a (near) zero current switch condition through switch component 14, which will be discussed later with reference to FIGS. 5A-5C.

FIGS. 2A-2C show the order in which switching components 34 and 12 are switched on—that is, if all switching components are off (see FIG. 2A), switching component 34 is switched on first (see FIG. 2B) so that switching component 12 can "softly" switch on (see FIG. 2C). FIG. 25A shows a flow diagram of how the switching sub-circuit 4 interacts with the bridge switching circuit 2 when switching component 34 is switched on to create the zero voltage condition and zero current condition for switching component 12 to turn on "softly", from stage A through to stage C. FIGS. 25B-25D expand on each of stages A-C respectively.

At FIG. 2A, all switch components 12, 14, 16, 18, 34 and 36 are off. The current output 42 is at zero, i.e. $i_{switching\_comp}=0$, and in this situation the current output 40 is positive (flowing from left to right) and remains substantially constant. This means the current output 40 is greater than the current output 42, i.e. $i_{load} > i_{switching\_comp}$. The total current entering node 26 is equal to the total current leaving node 26 according to Kirchoff's current law. For node 26 to operate in accordance with Kirchoff's current law, the positive and constant current output 40 places diode 14a into a forward-bias condition, such that current can pass through diode 14a from grounded node 30 to node 26, with current passing through diode 14a matching the absolute value and direction of the current output 40. That is, the current passing through diode 14a is also positive and constant such that the current passing through diode 14a corresponds to the current output 40. The forward-bias conduction of diode 14a means that there a voltage drop of $V_{D2}$ such that the voltage at node 26 is $-V_{D2}$. Preferably, the voltage drop across diode 14a should be negligible such that the voltage at node 26 is at substantially zero volts (i.e. $-V_{D2} \approx 0$).

Figure 24:
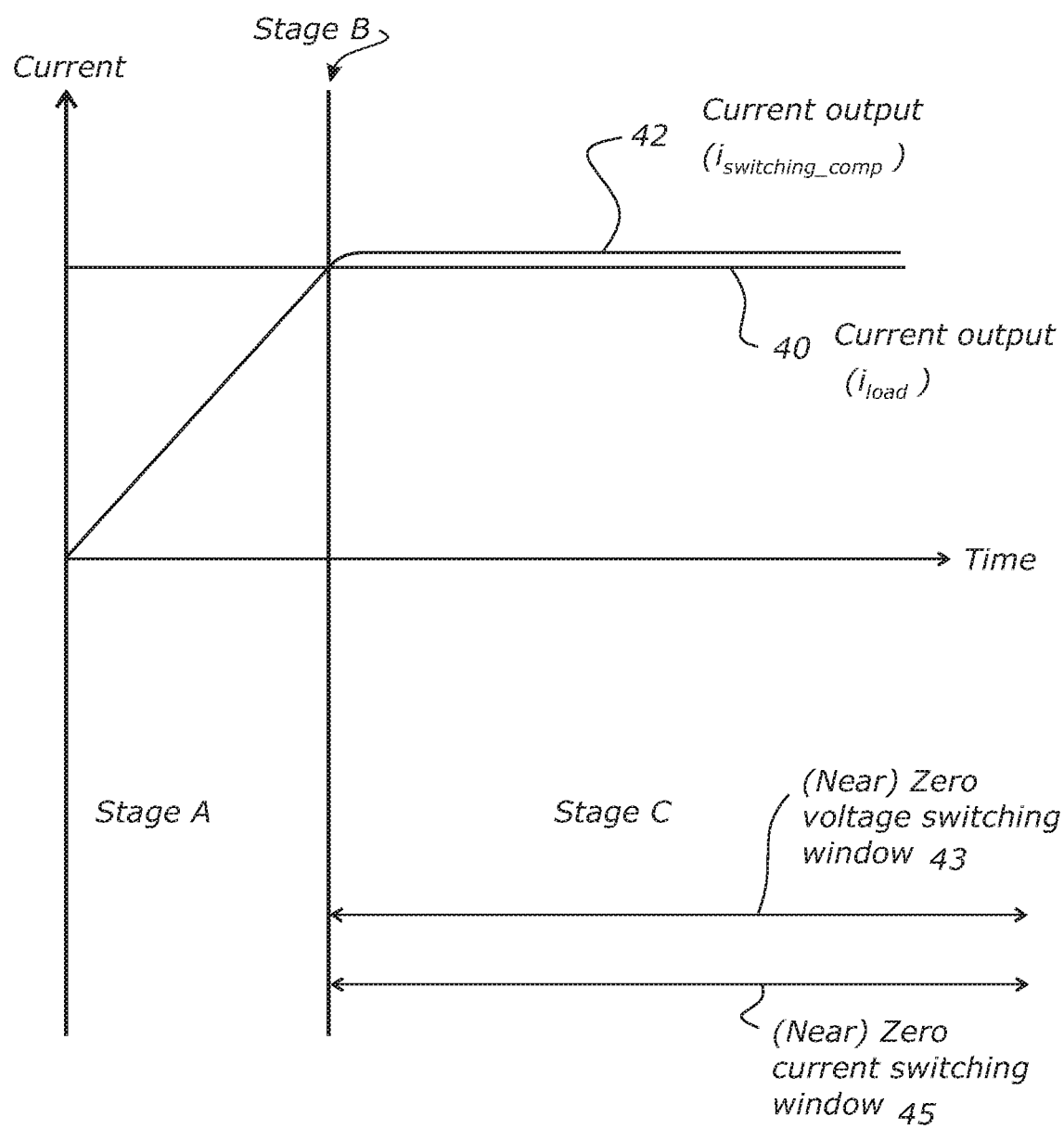
FIG. 24 is a line graph showing another form of soft switching.

Stage A as shown in FIGS. 25A and 25B describes what happens once switch component 34 is switched on as shown in FIG. 2B. The switching on of switch component 34 allows conduction of current from node 28 through switch component 34 to node 38, and conduction of current from node 38 through inductive component 32 to node 26. As the voltage drop across switch component 34 is zero and the voltage at node 28 is at the reference voltage $V_{ref}$, the voltage at the node 38 is also at the reference voltage $V_{ref}$. As already established, the voltage at node 26 is $-V_{D1}$. This means that there is a (non-zero) voltage difference of $V_{ref}+V_{D2}$ applied across the inductive component 32. The (non-zero) voltage difference applied across the inductive component 32 induces a (linear) increase in current through the switch component 34 as shown in FIG. 24. Referring to FIG. 4B, while the current 42 through the inductive component 32 increases (linearly), the current 48 through the diode 14a correspondingly decreases (linearly), and as current output 42 gets closer to the current output 40, the current 48 through the diode 14a approaches zero and turns off softly due to inductor 32, which helps to minimize diode reverse recovery energy by slowing down the diode turn off di/dt.

Stage B as shown in FIGS. 25A and 25C describes what happens after Stage A, once the current output 42 "catches up" to the current output 40. When current output 42 eventually "catches up" to the current output 40, the current 48 through diode 14a reaches zero and the diode 14a switches off, stopping forward-bias conduction of the diode 14a. The shutting off of the diode 14a induces a reverse recovery current 50 in which current momentarily conducts current from node 26 through to ground node 30. The reverse recovery current through diode 14a is compensated by an increase in current through the inductive component 32 so that total current entering node 26 is equal to the total current leaving node 26, in accordance with Kirchoff's current law. The increase in current through the inductive component 32 means the current output 42 of the switching sub-circuit 4 "overtakes" the current output 40 so that the current output 42 is more positive than the current output 40.

Stage C as shown in FIGS. 25A and 25D describes what happens after Stage B, once the current output 42 "overtakes" the decreasing current output 40, and the (near) zero voltage switch on window first opens. At this point, diode 12a is placed into forward-bias condition such that the current difference between currents 42 and 40 is conducted through diode 12a to node 28 so that node 26 operates in accordance with Kirchoff's current law. The conduction of current through diode 12a from node 26 to node 28 means that there is a voltage drop of $V_{D1}$, which means that the voltage at node 26 now increases from $-V_{D2}$ to $V_{ref}+V_{D1}$. The increase in voltage at node 26 to $V_{ref}+V_{D1}$ means that the voltage drop across inductive component decreases from $V_{ref}+V_{D2}$ to $-V_{D1}$ which causes the current 42 through the inductive component 32 to "level" off and "flatten", thus producing a substantially constant current 42 through the inductive component 32 as shown in FIG. 24. At this point, the voltage drop across switching component 12 is $-V_{D1}$, which is a (near) zero voltage drop, since the voltage at node 28 is $V_{ref}$ and the voltage at node 26 is $V_{ref}+V_{D1}$. This provides a (near) zero voltage condition 43 across switching component 12, enabling soft switching of switching component 12. In the example shown in FIG. 24, the (near) zero voltage switching window 43 for switching component 12 (that enables soft switching of switching component 12) remains open as long as the current 42 through the inductive component 32 remains more positive than the current 40 though the load 20. Further, since the current 40 through the load 20 is substantially the same (in absolute value and direction) as the current 42 through the inductive component 32, a (near) zero current condition through switching component 12 is also produced as there is (near) zero current passing through the switching component 12 at this point. The window for (near) zero current condition remains open as long as the current 40 through the load 20 is substantially the same (in absolute value and direction) as the current 42 through the inductive component 32.

At Stages B and C, the current outputs 40, 42 are substantially matched. The substantial matching of current outputs means that there is (near) zero current passing through switch component 12, in accordance with Kirchoff's current law. The substantial matching of current outputs therefore creates a (near) zero current switching window 45 for switch component 12 to potentially be softly switched from Stage B onwards, as shown in FIG. 24.

A skilled person would recognise that the same principle applies when "soft" switch on of switching component 14 is desired in a scenario in which current 40 through the load 20 is negative (i.e. current 40 through the load 20 flows from right to left in FIG. 5A) and constant so that absolute value of the current 40 substantially stays the same. Referring to, FIG. 5A, when switch components 12, 14, 16, 18, 34 and 36 are off, and current output 42 is at zero, i.e. $i_{switching\_comp}=0$, the switching component 36 can be switched on first (see FIG. 5B) to (simultaneously) create a (near) zero voltage condition applied across switching component 14 and a (near) zero current condition through switching component 14, which allows switching component 14 to be "softly" switched on (see FIG. 5C).

Various examples of soft switching have been described in the specification. Although these examples refer to soft switching on, soft switching off may also be achieved using at least some of the examples described above.

The invention claimed is:
1. A soft switching sub-circuit forming part of or for use with a circuit comprising a bridge switching circuit, the soft switching sub-circuit being configured and operable to provide a varying current output that tracks an output current from the bridge switching circuit to create a substantially zero current through at least one bridge switch component of the bridge switching circuit to enable soft switching, wherein the varying current output comprises:

an accelerating current output when a first absolute value of the varying current output is less than a second absolute value of the output current from the bridge switching circuit, and a decelerating current output when the first absolute value of the varying current output is greater than the second absolute value of the output current from the bridge switching circuit.

2. The soft switching sub-circuit according to claim 1, wherein the varying current output comprises alternation between the accelerating current output and the decelerating current output.

3. The soft switching sub-circuit according to claim 1, wherein the soft switching sub-circuit comprises an inductive component and at least one switch component.

4. The soft switching sub-circuit according to claim 3, wherein the soft switching sub-circuit comprises a first switching component and a second switch component, the first switch component is for energising a first end of the inductive component with a voltage that is or is derived from a reference voltage, and the second switch component is for energising the first end of the inductive component with a voltage that is or is derived from zero voltage or ground.

5. The soft switching sub-circuit according to claim 4, wherein the first switch component connects between a node energisable by the reference voltage and the first end of the inductive component, and the second switch component connects between the first end of the inductive component and the zero voltage or ground.

6. The soft switching sub-circuit according to claim 5, wherein the first switch component of the soft switching sub-circuit is for soft switching of a first bridge switch component of the bridge switching circuit, and the second switch component of the soft switching sub-circuit is for soft switching of a second bridge switch component of the bridge switching circuit, and wherein in the bridge switching circuit:

the first bridge switch component connects between a first node energisable by the reference voltage and a second node between the first bridge switch component and the second bridge switch component, and the second bridge switch component connects between the second node and zero voltage or ground.

7. The soft switching sub-circuit according to claim 3, wherein the inductive component has a first end connected to the at least one switch component of the soft switching sub-circuit and a second end for connection to a node between two bridge switch components of the bridge switching circuit.

8. The soft switching sub-circuit according to claim 7, wherein the varying current output is provided by operation of the inductive component by:

when the output current from the bridge switching circuit overtakes the varying current output of the soft switching sub-circuit, a voltage difference applied across the inductive component is increased such that the varying current output of the soft switching sub-circuit overtakes the output current from the bridge switching circuit, and when the varying current output of the soft switching sub-circuit overtakes the output current from the bridge switching circuit, the voltage difference applied across the inductive component is decreased such that the output current from the bridge switching circuit overtakes the varying current output of the soft switching sub-circuit.

9. The soft switching sub-circuit according to claim 8 wherein:

the soft switching sub-circuit comprises a switch component that connects to the first end of the inductive component, the switch component configured to provide the first end of the inductive component with a voltage that is or is derived from a reference voltage, the two bridge switch components of the bridge switching circuit are:

a first bridge switch component comprising a first diode that connects the node between the two bridge switch components of the bridge switching circuit to another node energisable by the reference voltage, and a second bridge switch component comprising a second diode that connects zero voltage or ground to the node between the two bridge switch components of the bridge switching circuit.

10. The soft switching sub-circuit according to claim 9, wherein:

forward-bias conduction of the second diode causes a decrease in voltage at the second end of the inductive component towards a first voltage that is or derived from the zero voltage or ground so that the voltage difference applied across the inductive component is increased such that the varying current output of the soft switching sub-circuit overtakes the output current from the bridge switching circuit, and forward-bias conduction of the first diode causes an increase in voltage at the second end of the inductive component towards a second voltage that is or derived from the reference voltage so that the voltage difference applied across the inductive component is decreased such that the output current from the bridge switching circuit overtakes the varying current output of the soft switching sub-circuit.

11. The soft switching sub-circuit according to claim 9, wherein the inductive component is adapted to reduce rate of change in current through the first and second diodes of the first and second bridge switch components of the bridge switching circuit such that a peak reverse recovery current of the first and second diodes is reduced.

12. The soft switching sub-circuit according to claim 8, wherein:

the at least one switch component of the soft switching sub-circuit comprises a switch component that connects to the first end of the inductive component, the switch component configured to provide the first end of the inductive component with a voltage that is or is derived from zero voltage or ground, the two bridge switch components of the bridge switching circuit are:

a first bridge switch component comprising a first diode that connects the node between the two bridge switch components of the bridge switching circuit to another node energisable by a reference voltage, and a second bridge switch component comprising a second diode that connects zero voltage or ground to the node between the two bridge switch components of the bridge switching circuit.

13. The soft switching sub-circuit according to claim 12, wherein:

forward-bias conduction of the second diode causes a decrease in voltage at the second end of the inductive component towards a first voltage that is or derived from the zero voltage or ground so that the voltage difference applied across the inductive component is decreased such that the output current from the bridge switching circuit overtakes the varying current output of the soft switching sub-circuit, and forward-bias conduction of the first diode causes an increase in voltage at the second end of the inductive component towards a second voltage that is or derived from the reference voltage so that the voltage difference applied across the inductive component is increased such that the varying current output of the soft switching sub-circuit overtakes the output current from the bridge switching circuit.

14. The soft switching sub-circuit according to claim 7, wherein the varying current output comprises alternation between the accelerating current output and the decelerating current output.

15. The soft switching sub-circuit according to claim 14, wherein alternation comprises:
changing from the accelerating current output to the decelerating current output when the first absolute value of the varying current output overtakes the second absolute value of the output current from the bridge switching circuit, and
changing from the decelerating current output to the accelerating current output when the second absolute value of the output current from the bridge switching circuit overtakes the first absolute value of the varying current output.

16. The soft switching sub-circuit according to claim 7, wherein:
the soft switching sub-circuit comprises a switch component that connects to the first end of the inductive component, the switch component configured to provide the first end of the inductive component with a voltage that is or is derived from a reference voltage,
the two bridge switch components of the bridge switching circuit are:
a first bridge switch component comprising a first diode that connects the node between the two bridge switch components of the bridge switching circuit to another node energisable by a reference voltage, and
a second bridge switch component comprising a second diode that connects zero voltage or ground to the node between the two bridge switch components of the bridge switching circuit.

17. The soft switching sub-circuit according to claim 16, wherein the first diode of the first bridge switch component and the second diode of the second bridge switch component are operable, such that:
forward-bias conduction of the first diode produces the decelerating current output by increasing voltage at the second end of the inductive component, such that a voltage difference applied across the inductive component decreases, and
forward-bias conduction of the second diode produces the accelerating current output by decreasing voltage at the second end of the inductive component, such that the voltage difference applied across the inductive component increases.

18. The soft switching sub-circuit according to claim 17, wherein the inductive component is or comprises an inductor, and
wherein a capacitor is connected in series with the inductor.

19. The soft switching sub-circuit according to claim 7, wherein:
the soft switching sub-circuit comprises a switch component that connects to the first end of the inductive component, the switch component configured to provide the first end of the inductive component with a voltage that is or is derived from a zero voltage or ground,
the two switch components of the bridge switching circuit are:
a first bridge switch component comprising a first diode that connects the node between the two bridge switch components of the bridge switching circuit to another node energisable by a reference voltage, and
a second bridge switch component comprising a second diode that connects zero voltage or ground to the node between the two bridge switch components of the bridge switching circuit.

20. The soft switching sub-circuit according to claim 19, wherein the first diode of the first bridge switch component and the second diode of the second bridge switch component are operable, such that:
forward-bias conduction of the first diode produces the accelerating current output by increasing voltage at the second end of the inductive component, such that a voltage difference applied across the inductive component increases, and
forward-bias conduction of the second diode produces the decelerating current output by decreasing voltage at the second end of the inductive component, such that the voltage difference applied across the inductive component decreases.

21. A soft switching sub-circuit forming part of or for use with a circuit comprising a bridge switching circuit, the soft switching sub-circuit being configured and operable to provide a varying current output that tracks output current from the bridge switching circuit to create a substantially zero current through at least one bridge switch component of the bridge switching circuit to enable soft switching,
wherein the soft switching sub-circuit comprises an inductive component and at least one switch component,
wherein the inductive component has a first end connected to the at least one switch component of the soft switching sub-circuit and a second end for connection to a node between two bridge switch components of the bridge switching circuit, and
wherein the varying current output is provided by operation of the inductive component by:
when the output current from the bridge switching circuit overtakes the varying current output of the soft switching sub-circuit, a voltage difference applied across the inductive component is increased such that the varying current output of the soft switching sub-circuit overtakes the output current from the bridge switching circuit, and
when the varying current output of the soft switching sub-circuit overtakes the output current from the bridge switching circuit, the voltage difference applied across the inductive component is decreased such that the output current from the bridge switching circuit overtakes the varying current output of the soft switching sub-circuit.

22. A soft switching sub-circuit forming part of or for use with a circuit comprising a bridge switching circuit, the soft switching sub-circuit being configured and operable to provide a varying current output that tracks output current from the bridge switching circuit to create a substantially zero current through at least one bridge switch component of the bridge switching circuit to enable soft switching,
- wherein the soft switching sub-circuit comprises an inductive component and at least one switch component,
- wherein the inductive component has a first end connected to the at least one switch component of the soft switching sub-circuit and a second end for connection to a node between two bridge switch components of the bridge switching circuit,
- wherein the varying current output comprises:
- an accelerating current output when a first absolute value of the varying current output is less than a second absolute value of the output current from the bridge switching circuit, and
- a decelerating current output when the first absolute value of the varying current output is greater than the second absolute value of the output current from the bridge switching circuit,
- wherein the accelerating current output is produced by an increased voltage applied across the inductive component, and the decelerating current output is produced by a decreased voltage applied across the inductive component.

* * * * *